United States Patent
Ebisui et al.

(10) Patent No.: US 9,395,573 B2
(45) Date of Patent: Jul. 19, 2016

(54) ILLUMINATION UNIT INCLUDING LIGHT MODULATION LAYER AND DISPLAY UNIT

(71) Applicant: Sony Corporation, Tokyo (JP)

(72) Inventors: Akira Ebisui, Kanagawa (JP); Harumi Sato, Miyagi (JP); Kentaro Okuyama, Kanagawa (JP); Shogo Shinkai, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/236,576

(22) PCT Filed: Apr. 30, 2013

(86) PCT No.: PCT/JP2013/062635
§ 371 (c)(1),
(2) Date: Jan. 31, 2014

(87) PCT Pub. No.: WO2013/168639
PCT Pub. Date: Nov. 14, 2013

(65) Prior Publication Data
US 2015/0055055 A1 Feb. 26, 2015

(30) Foreign Application Priority Data

May 11, 2012 (JP) ................................ 2012-109523

(51) Int. Cl.
| | | |
|---|---|---|
| G02F 1/1333 | (2006.01) | |
| G02F 1/1334 | (2006.01) | |
| G02F 1/1335 | (2006.01) | |
| G02F 1/1337 | (2006.01) | |
| G02F 1/137 | (2006.01) | |

(52) U.S. Cl.
CPC .............. *G02F 1/1334* (2013.01); *G02F 1/137* (2013.01); *G02F 1/1337* (2013.01); *G02F 1/133606* (2013.01); *G02F 1/133615* (2013.01); *G02F 2001/13756* (2013.01); *G02F 2001/133601* (2013.01); *G02F 2001/133626* (2013.01); *G02F 2203/62* (2013.01)

(58) Field of Classification Search
CPC ............ G02F 1/1334; G02F 1/133606; G02F 2001/133626; G02F 2001/13756
See application file for complete search history.

(56) References Cited

U.S. PATENT DOCUMENTS

| | | | |
|---|---|---|---|
| 2003/0210222 A1 | 11/2003 | Ogiwara et al. | |
| 2007/0268427 A1 | 11/2007 | Uehara | |
| 2010/0165450 A1 | 7/2010 | Okuyama et al. | |
| 2011/0109663 A1 | 5/2011 | Uchida et al. | |
| 2011/0169877 A1 | 7/2011 | Ishida | |
| 2013/0314620 A1* | 11/2013 | Ebisui ................... | G02F 1/1313 349/1 |

FOREIGN PATENT DOCUMENTS

| | | |
|---|---|---|
| JP | 2002-208307 | 7/2002 |
| JP | 2007-334344 | 12/2007 |
| JP | 2008-256853 | 10/2008 |
| JP | 2010-156811 | 7/2010 |
| JP | 2011-119210 | 6/2011 |
| JP | 2011-142065 | 7/2011 |
| WO | 2010/035562 | 4/2010 |

* cited by examiner

*Primary Examiner* — Paisley L Arendt
(74) *Attorney, Agent, or Firm* — K&L Gates LLP

(57) ABSTRACT

Provided is an edge light illumination device, in which a light modulation layer includes: a first region having optical anisotropy and a relatively high responsiveness to an electrical field; and a second region having optical anisotropy and a relatively low responsiveness to the electrical field. When denoting dispersal, the light modulation layer satisfies the formulae A>B>C and A1/C1<A2/C2.

20 Claims, 42 Drawing Sheets

ILLUMINATION UNIT INCLUDING LIGHT MODULATION LAYER AND DISPLAY UNIT

CROSS REFERENCES TO RELATED APPLICATIONS

The present application is a national stage of International Application No. PCT/JP2013/062635 filed on Apr. 30, 2013 and claims priority to Japanese Patent Application No. 2012-109523 filed on May 11, 2012, the disclosure of which is incorporated herein by reference.

BACKGROUND

The present technology relates to an illumination unit and a display unit each of which includes a light modulation device exhibiting a scattering property or transparency with respect to light.

In recent years, improvements in image quality and energy conservation of liquid crystal displays have been accelerated, and systems achieving an improvement in dark-room contrast by modulating light intensity in a partial region of a backlight have been proposed. As a main technique of achieving an improvement in dark-room contrast, some of light-emitting diodes (LEDs) used as light sources of a backlight are driven to modulate backlight light based on a display image. Moreover, in large-screen liquid crystal displays, as with small-screen liquid crystal displays, thinner displays have been increasingly demanded; therefore, attention has been given not to a system in which cold cathode fluorescent lamps (CCFLs) or LEDs are disposed directly below a liquid crystal panel, but to an edge light system in which a light source is disposed on an edge of a light guide plate.

The applicant of the present application has achieved a partial drive in which light intensity in a partial region of the backlight is modulated, and has disclosed the partial drive in, for example, PTL 1. In PTL 1, to achieve the above-described partial drive, a polymer dispersed liquid crystal (PDLC) is used. In PTL 1, the PDLC is formed by mixing a liquid crystal material and a low-molecular material having orientation and polymerizability, and causing phase separation by ultraviolet irradiation, and is a composite layer in which the liquid crystal material is dispersed in a polymer material with a streaky structure. The PDLC is classified into a horizontal alignment type, a vertical alignment type, and an isotropic type based on orientation under no voltage application. Among them, the horizontal alignment type PDLC is the most suitable for the backlight, because high luminance and high contrast are obtainable.

CITATION LIST

Patent Literature

[PTL 1] Japanese Unexamined Patent Application Publication No. 2011-142065

SUMMARY

In the above-described horizontal alignment type PDLC, an interface between the polymer material and the liquid crystal material is formed densely in a minor-axis direction of the streaky structure and coarsely in a major-axis direction of the streaky structure. Therefore, in a case where the streaky structure extends in a direction parallel to a light incident surface, light propagating through the PDLC in the minor-axis direction of the above-described streaky structure enters the interface in periods of an average streaky texture size in the minor-axis direction of the streaky structure, and as a result, light is largely scattered. On the other hand, light propagating through the PDLC in the major-axis direction of the above-described streaky structure does not enter the interface so often; therefore, the light is not scattered much.

Moreover, light propagating through the PDLC in a direction (hereinafter referred to as "X direction") that is the minor-axis direction of the streaky structure and is perpendicular to the light incident surface propagates in periods of the average streaky texture size in the minor-axis direction of the streaky structure while being influenced by a difference between an extraordinary light refractive index of the liquid crystal material and an ordinary light refractive index of the polymer material and a difference between an ordinary light refractive index of the liquid crystal material and an extraordinary light refractive index of the polymer material. On the other hand, light propagating through the PDLC in the major-axis direction of the above-described streaky structure (hereinafter referred to as "Y direction") or a thickness direction of the PDLC (hereinafter referred to as "Z direction") propagates while being influenced by a difference between the extraordinary light refractive index of the liquid crystal material and the ordinary light refractive index of the polymer material or a difference between the ordinary light refractive index of the liquid crystal material and the extraordinary light refractive index of the polymer material. Therefore, while light propagating through the PDLC in the X direction is largely scattered, light propagating through the PDLC in the Y direction or the Z direction is not scattered much.

Thus, in the horizontal alignment type PDLC, light propagating in the X direction and light propagating in the Y direction or the Z direction have anisotropy in scattering because of the above-described two factors. As a result, light propagating in the Z direction is preferentially scattered in a direction where light guide conditions are disrupted, and light extraction efficiency is increased; therefore, high luminance and high contrast are obtained.

However, in a case where the horizontal alignment type PDLC is applied to an edge light system backlight, since light propagating in the X direction and light propagating in the Y direction have anisotropy in scattering, a luminance distribution easily becomes nonuniform. In particular, when an arrangement pitch of respective point-like light sources in a linear light source is large, light and dark stripes are formed in proximity to the linear light source; therefore, there is a room for improvement.

Thus, it is desirable to provide an illumination unit capable of reducing contrast of light and dark stripes caused by arrangement of a light source while maintaining high luminance, and a display unit including the illumination unit.

An illumination unit according to an embodiment of the present technology includes: a first transparent substrate and a second transparent substrate disposed to be separated from and face each other; a light source configured to emit light to an end surface of the first transparent substrate; and a light modulation layer disposed in a gap between the first transparent substrate and the second transparent substrate. The light modulation layer is configured to exhibit a scattering property or transparency with respect to light from the light source, depending on magnitude of an electric field, and includes a first region and a second region, the first region having optical anisotropy and relatively high responsivity with respect to the electric field, and the second region having optical anisotropy and relatively low responsivity with respect to the electric field. Hereinafter, a magnitude of scattering (hereinafter referred to as "first scattering") of light propagating in a direction (hereinafter referred to as "first direction") perpendicular to the light incident surface is A. A magnitude of scattering (hereinafter referred to as "second scattering") of light propagating in a direction (hereinafter referred to as "second direction") perpendicular to the first transparent substrate is B. A magnitude of scattering (hereinafter referred to as "third scattering") of light propagating in a direction (hereinafter referred to as "third direction") parallel to the light incident surface and parallel to a surface of the first transparent substrate is C. A magnitude of the first scattering in a third region closer to the light source of the light modulation layer is A1. A magnitude of the third scattering in the third region is C1. A magnitude of the first scattering in a fourth region farther from the light source of the light modulation layer is A2. A magnitude of the third scattering in the fourth region is C2. At this time, the light modulation layer is configured to satisfy following expressions when the light modulation layer exhibits the scattering property.

$A > B > C$ $A1/C1 < A2/C2$

A display unit according to an embodiment of the present technology includes: a display panel displaying an image by modulating light; and an illumination unit applying light from a back of the display panel. The illumination unit included in the display unit includes the same components as those included in the above-described illumination unit.

In the illumination unit and the display unit according to the embodiments of the present technology, when the light modulation layer exhibits the scattering property, the light modulation layer is configured to satisfy the above-described expressions. Thus, anisotropic scattering of light propagating in the first direction and light propagating in the third direction is reduced in proximity to the light source.

In the illumination unit and the display unit according to the embodiments of the present technology, when the light modulation layer exhibits the scattering property, the light modulation layer is configured to satisfy the above-described expressions; therefore, the above-described anisotropic scattering is allowed to be reduced in proximity to the light source. Light and dark stripes caused by arrangement of the light source are formed due to a large difference between the first scattering and the third scattering. Therefore, when the above-described anisotropic scattering is reduced in proximity to the light source, contrast of light and dark stripes caused by the arrangement of the light source is allowed to be reduced. Moreover, in the illumination unit and the display unit according to the present technology, the above-described anisotropic scattering is reduced only in a region closer to the light source of the light modulation layer; therefore, compared to a case where the above-described anisotropic scattering is reduced in the entire light modulation layer, high luminance is allowed to be obtained. Further, in the illumination unit and the display unit according to the present technology, since the second scattering is stronger than the third scattering, light from the light source is preferentially scattered in a direction where light guide conditions are disrupted, and light extraction efficiency is increased. Thus, in the illumination unit and the display unit according to the present technology, while high luminance is maintained, contrast of light and dark stripes caused by the arrangement of the light source is allowed to be reduced.

Additional features and advantages are described herein, and will be apparent from the following Detailed Description and the figures.

DETAILED DESCRIPTION

Some embodiments of the present technology will be described in detail below referring to the accompanying drawings. It is to be noted that description will be given in the following order.
1. First Embodiment (Illumination Unit)
   An example in which two horizontal alignment films (0-degree alignment) are used
   An example using a light modulation layer in which a ratio of a polymer region is different, depending on a distance from a light source
2. Second Embodiment (Illumination Unit)
   An example using a horizontal alignment film (0-degree alignment) and a mixture film configured of a vertical alignment film and a horizontal alignment film (0-degree alignment)
3. Third Embodiment (Illumination Unit)
   An example using two horizontal alignment films (0-degree alignment and θ1 alignment)
4. Fourth Embodiment (Illumination Unit)
   An example using horizontal alignment films (0-degree alignment and θ1 alignment) and a horizontal alignment film (0-degree alignment)
5. Fifth Embodiment (Illumination Unit)
   An example using a light modulation layer in which a material of a polymer region is different, depending on a distance from a light source
6. Sixth Embodiment (Illumination Unit)
   An example using a light modulation layer in which orientation of a polymer region is different, depending on a distance from the light source
7. Modification Examples (Illumination Units)
8. Seventh Embodiment (Display Unit)

1. First Embodiment

Configuration

Figure 1:
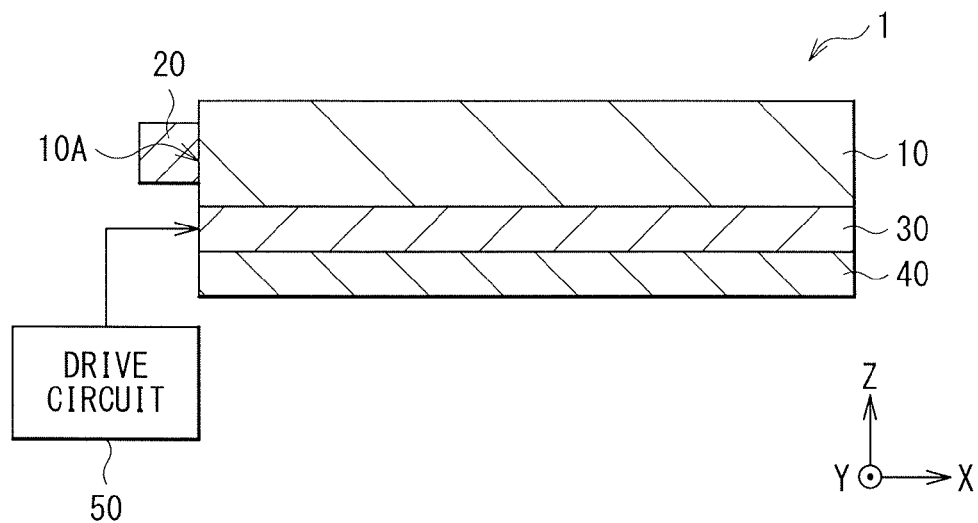
FIG. 1 is a diagram illustrating an example of a schematic configuration of an illumination unit according to an embodiment of the present technology.
Figure 2:
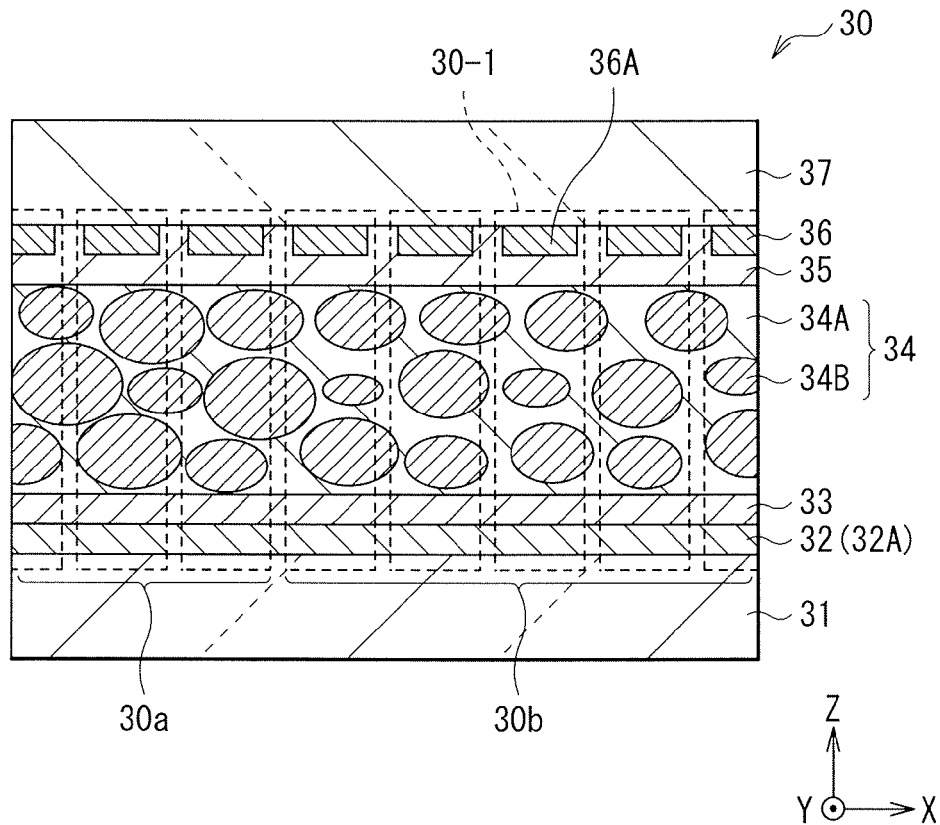
FIG. 2 is a diagram illustrating an example of a sectional configuration in an XZ plane of a light modulation device in FIG. 1.

FIG. 1 illustrates an example of a sectional configuration of an illumination unit 1 according to a first embodiment of the present technology. FIG. 2 is a sectional view illustrating an example of a schematic configuration of a light modulation device 30 in the illumination unit 1 in FIG. 1. It is to be noted that FIGS. 1 and 2 are schematic illustrations, and dimensions and shapes in the illustrations are not necessarily the same as actual dimensions and shapes. The illumination unit 1 outputs illumination light from a top surface thereof, and, for example, the illumination unit 1 may be used for a purpose to illuminate a liquid crystal display panel or the like from a back side thereof, or the like. The illumination unit 1 may include, for example, a light guide plate 10, a light source 20 disposed on a side surface of the light guide plate 10, the light modulation device 30 and a reflective plate 40 disposed behind the light guide plate 10, and a drive circuit 50 driving the light modulation device 30.

The light guide plate 10 guides light from the light source 20 disposed on the side surface of the light guide plate 10 to a top surface of the illumination unit 1. The light guide plate 10 has a shape corresponding to a display panel (not illustrated) disposed on the top surface of the light guide plate 10, for example, a rectangular parallelepiped shape surrounded by a top surface, a bottom surface, and side surfaces. It is to be noted that a side surface where light from the light source 20 enters of the side surfaces of the light guide plate 10 is hereinafter referred to as "light incident surface 10A". In the light guide plate 10, one or both of the top surface and the bottom surface have a predetermined patterned shape, and the light guide plate 10 has a function of scattering and uniformizing light incident from the light incident surface 10A. The light guide plate 10 also functions, for example, as a supporting body supporting an optical sheet (for example, a diffuser plate, a diffuser sheet, a lens film, or a polarization splitter sheet) disposed between the display panel and the illumination unit 1. The light guide plate 10 is formed to include, for example, a transparent thermoplastic resin such as a polycarbonate resin (PC) or an acrylic resin (polymethylmethacrylate (PMMA)).

The light source 20 applies light to a side surface of the light guide plate 10. The light source 20 is a linear light source, and more specifically, the light source 20 is configured of a plurality of LEDs arranged in one line. The LEDs may be preferably white LEDs. It is to be noted that the plurality of LEDs may be configured of, for example, a red LED, a green LED, and a blue LED. For example, as illustrated in FIG. 1, the light source 20 may be disposed on only one side surface of the light guide plate 10. It is to be noted that, although not illustrated, the light sources 20 may be disposed, for example, on both side surfaces of the light guide plate 10.

The reflective plate 40 returns light leaked from behind the light guide plate 10 through the light modulation device 30 to the light guide plate 10, and may have, for example, functions such as reflection, diffusion, and scattering. Therefore, the reflective plate 40 allows light emitted from the light source 20 to be efficiently used, and is also useful to improve front luminance. The reflective plate 40 may be made of, for example, foamed PET (polyethylene terephthalate), a silver-evaporated film, a multilayer reflective film, or white PET.

In this embodiment, the light modulation device 30 is in close contact with a back side (the bottom surface) of the light guide plate 10 without an air layer in between, and is bonded to the back side of the light guide plate 10 with, for example, an adhesive (not illustrated) in between. For example, as illustrated in FIG. 2, the light modulation device 30 is configured by arranging a transparent substrate 31, a lower electrode 32, an alignment film 33, a light modulation layer 34, an alignment film 35, an upper electrode 36, and a transparent substrate 37 in this order from the reflective plate 40.

The transparent substrates 31 and 37 are disposed to face each other with a space in between. The transparent substrates 31 and 37 support the light modulation layer 34, and are typically configured of substrates transparent to visible light, for example, glass plates or plastic films. The lower electrode 32 is disposed on a surface facing the transparent substrate 37 of the transparent substrate 31. The lower electrode 32 and the upper electrode 36 may be made of, for example, a transparent conductive material such as indium tin oxide (ITO). The transparent conductive material may be preferably a material with as small absorption of visible light as possible.

The lower electrode 32 may be configured of, for example, a plurality of strip-like sub-electrodes 32A that extend in one direction in a plane and are arranged side by side. The upper electrode 36 is disposed on a surface facing the transparent substrate 31 of the transparent substrate 37. The upper electrode 36 may be configured of, for example, a plurality of strip-like sub-electrodes 36A that extend in one direction in a plane intersecting with (being orthogonal to) the extending direction of the sub-electrodes 32A and are arranged side by side.

Patterns of the lower electrode 32 and the upper electrode 36 are dependent on a driving system. For example, in a case where the lower electrode 32 and the upper electrode 36 are each configured of the above-described strip-like sub-electrodes arranged side by side, for example, the respective sub-electrodes may be driven by a simple matrix method. In a case where one of the lower electrode 32 and the upper electrode 36 is formed in a sheet shape (a solid film), and the other electrode is formed in a very small quadrate shape, for example, respective electrodes may be driven by an active matrix method. Moreover, in a case where one of the lower electrode 32 and the upper electrode 36 is formed in a sheet shape (a solid film), and the other electrode is formed in a block shape provided with a fine leading line, for example, each division block may be driven by a segment method.

Portions where the lower electrode 32 and the upper electrode 36 face each other of the light modulation device 30 when the lower electrode 32 and the upper electrode 36 are viewed from a direction of a normal to the light modulation device 30 configure light modulation cells 30-1. The light modulation cells 30-1 are allowed to be separately and independently driven by applying a predetermined voltage to the lower electrode 32 and the upper electrode 36, and exhibit transparency or a scattering property with respect to light from the light source 20, depending on a voltage value applied to the lower electrode 32 and the upper electrode 36. It is to be noted that transparency and the scattering property will be described in more detail when the light modulation layer 34 is described.

Figure 3:
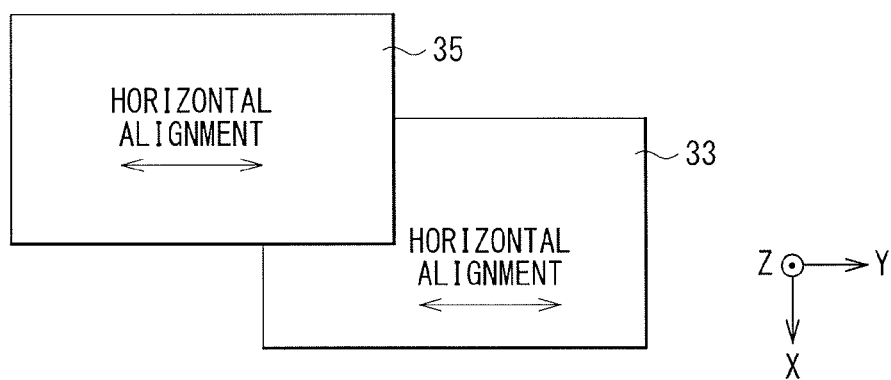
FIG. 3 is a plan view illustrating alignment directions of alignment films in FIG. 2.

The alignment films 33 and 35 are so disposed as to sandwich the light modulation layer 34 therebetween. The alignment films 33 and 35 align, for example, a liquid crystal or a monomer used in the light modulation layer 34. Examples of kinds of alignment films may include a vertical alignment film and a horizontal alignment film, and in this embodiment, horizontal alignment films are used for the alignment films 33 and 35. As illustrated in FIG. 3, both the horizontal alignment films used for the alignment films 33 and 35 have an alignment direction oriented in a direction parallel or substantially parallel to the light incident surface 10A (or a linear light source). In a case where the horizontal alignment films used for the alignment films 33 and 35 are formed with use of a rubbing process, rubbing directions of the alignment films 33 and 35 are oriented in a direction parallel to the light incident surface 10A (or the linear light source).

Examples of the horizontal alignment films may include an alignment film formed by performing a rubbing process on polyimide, polyamide imide, polyvinyl alcohol, or the like, and an alignment film provided with a groove by transfer, etching, or the like. Other examples of the horizontal alignment films may include an alignment film formed by obliquely evaporating an inorganic material such as silicon oxide, a diamond-like carbon alignment film formed by ion beam irradiation, and an alignment film provided with an electrode pattern slit. In a case where plastic films are used as the transparent substrates 31 and 37, in a manufacturing process, polyamide imide capable of forming a film at a temperature of 100° C. or less may be preferably used for the alignment films 33 and 35, because a firing temperature after coating surfaces of the transparent substrates 31 and 37 with the alignment films 33 and 35 may be preferably as low as possible.

It is to be noted that, as the horizontal alignment films, horizontal alignment films having a function of providing a pretilt to liquid crystal molecules in contact therewith may be preferably used. Examples of a method of developing a pretilt function in the horizontal alignment film may include rubbing. The pretilt may mean that, for example, major axes of liquid crystal molecules in proximity to the alignment film intersect with a "plane parallel to a surface of the alignment film" or a "normal to the alignment film" at a slight angle. The above-described horizontal alignment films may preferably have, for example, a function of allowing major axes of liquid crystal molecules in proximity to the horizontal alignment film to intersect with the surface of the horizontal alignment film at a slight angle in a plane parallel to the light incident surface 10A. The horizontal alignment film having such a function is achievable, for example, by rubbing in a direction parallel to the light incident surface 10A.

Moreover, it is only necessary for the horizontal alignment films used for the alignment films 33 and 35 to have a function of aligning a liquid crystal and a monomer, and reliability and the like, which are necessary for a typical liquid crystal display, with respect to repeated voltage application are not necessary. It is because reliability with respect to voltage application after forming a device is determined by an interface between a resultant formed by polymerizing a monomer, and a liquid crystal. Moreover, even if the alignment films are not used, for example, a liquid crystal or a monomer used in the light modulation layer 34 is allowed to be aligned, for example, by applying an electric field or a magnetic field between the lower electrode 32 and the upper electrode 36. In other words, while an electric field or a magnetic field is applied between the lower electrode 32 and the upper electrode 36, the alignment state of the liquid crystal or the monomer under voltage application is allowed to be fixed by ultraviolet irradiation. In a case where a voltage is used to form the alignment films, an electrode for alignment and an electrode for drive may be separately formed, or as a liquid crystal material, a dual-frequency liquid crystal allowing the sign of dielectric constant anisotropy to be inverted by a frequency may be used. Moreover, in a case where a magnetic field is used to form the alignment films, for the alignment films, a material with large magnetic susceptibility anisotropy may be preferably used, and, for example, a material with a large number of benzene rings may be preferably used.

A part of the light modulation layer 34 or the entire light modulation layer 34 exhibits a scattering property or transparency with respect to light from the light source 20, depending on magnitude of an electric field. The light modulation layer 34 exhibits transparency with respect to light from the light source 20, for example, when a voltage is not applied between the sub-electrode 32A and the sub-electrode 36A (hereinafter simply referred to "under no voltage application"). Moreover, the light modulation layer 34 exhibits the scattering property with respect to light from the light source 20, for example, when a voltage is applied between the sub-electrode 32A and the sub-electrode 36A (hereinafter simply referred to as "under voltage application"). As used herein, the term "under no voltage application" encompasses "at the time when a voltage that is smaller than a voltage allowing the light modulation layer 34 to exhibit the scattering property and allows the light modulation layer 34 to exhibit transparency is applied". As used herein, "under voltage application" means "at the time when a voltage allowing the light modulation layer 34 to exhibit the scattering property is applied".

For example, as illustrated in FIG. 2, the light modulation layer 34 may be a composite layer including a polymer region 34A and a plurality of liquid crystal regions 34B dispersed in the polymer region 34A. The polymer region 34A and the liquid crystal regions 34B have shape anisotropy, and further have optical anisotropy. It is to be noted that the liquid crystal region 34B corresponds to a specific example of "first region" in the present technology, and the polymer region 34A corresponds to a specific example of "second region" in the present technology.

(Shape Anisotropy)

Figure 4:
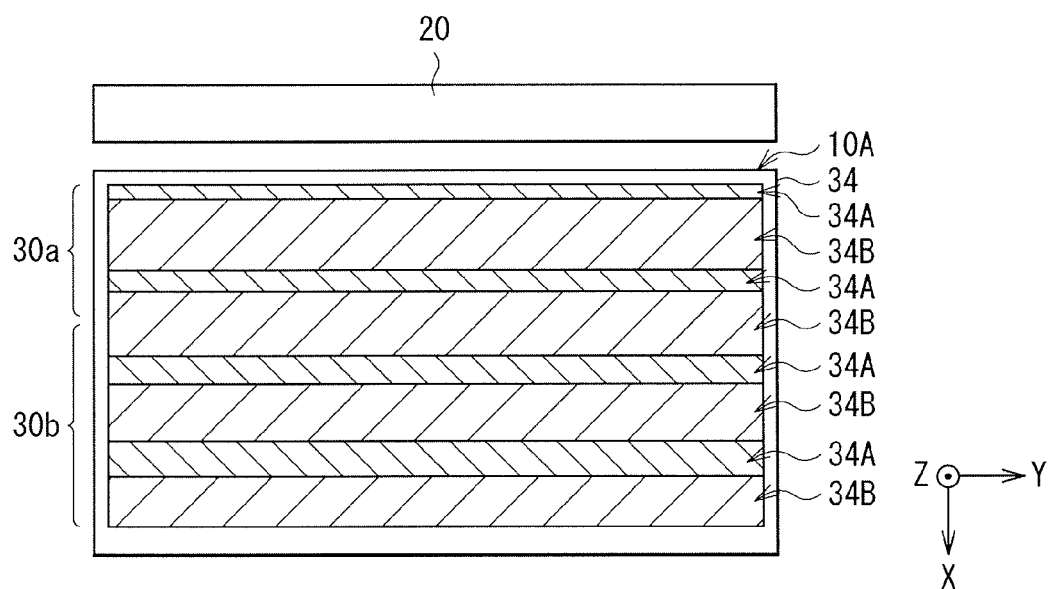
FIG. 4 is a diagram illustrating an example of a sectional configuration in an XY plane of a light modulation layer in FIG. 2.

FIG. 4 illustrates an example of a sectional configuration in an XY plane of the light modulation layer 34. The polymer region 34A and the liquid crystal regions 34B both extend in a direction parallel or substantially parallel to the light incident surface 10A and parallel or substantially parallel to a surface of the transparent substrate 31. In other words, the polymer region 34A and the liquid crystal regions 34B both extend in a direction parallel or substantially parallel to the linear light source. For example, the polymer region 34A and the liquid crystal regions 34B both may continuously or intermittently extend from one end to the other end of the light modulation layer 30. Moreover, for example, as illustrated in FIG. 4, the polymer region 34A and the liquid crystal regions 34B may be alternately arranged in a direction orthogonal to the light incident surface 10A.

Figure 5A:
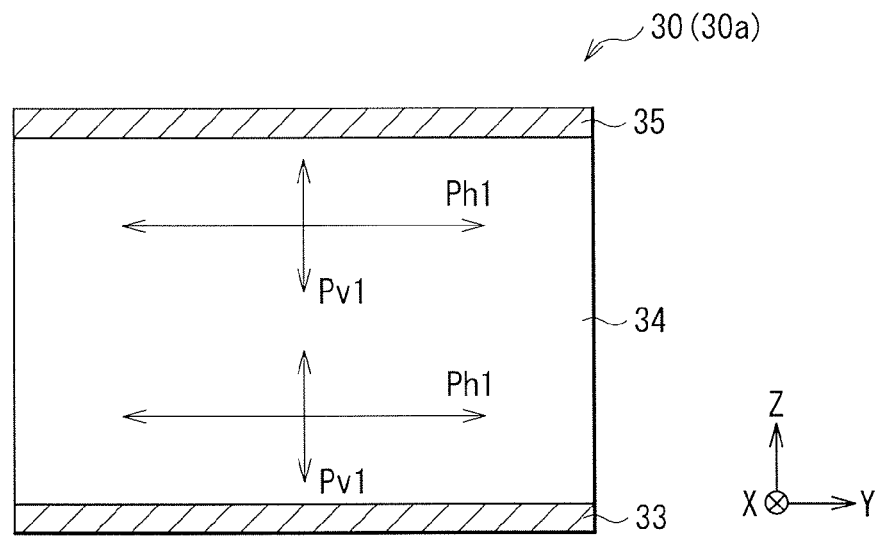
FIG. 5A is a diagram illustrating an example of structural periods in a close region of the light modulation layer in FIG. 2.
Figure 5B:
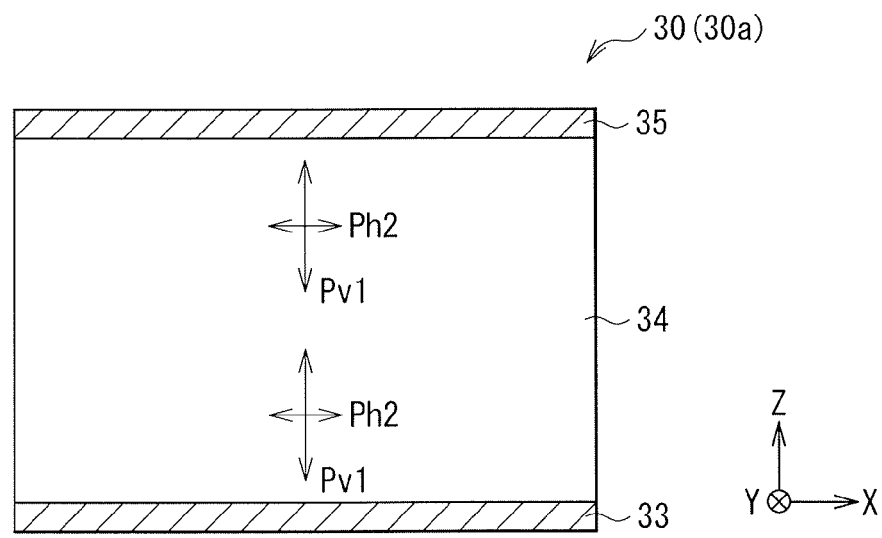
FIG. 5B is a diagram illustrating another example of the structural periods in the close region of the light modulation layer in FIG. 2.
Figure 6A:
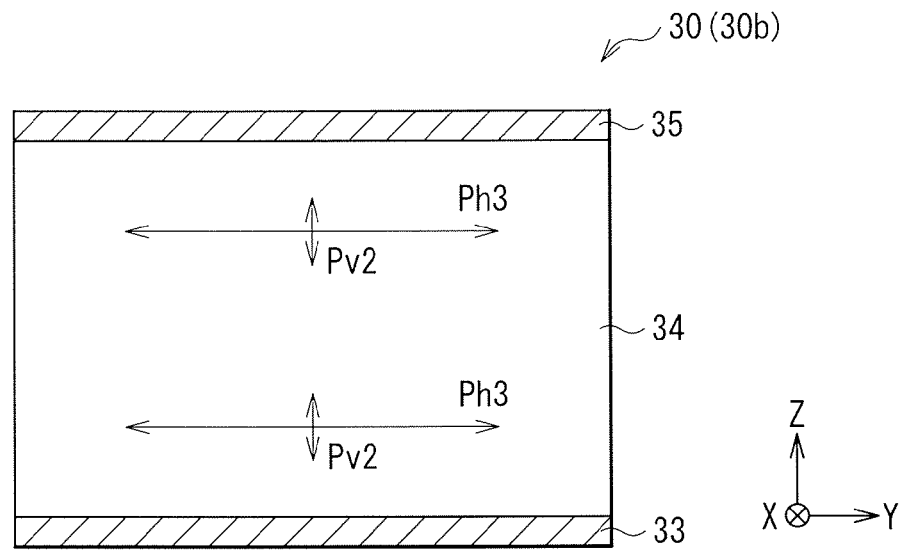
FIG. 6A is a diagram illustrating an example of structural periods in a far region of the light modulation layer in FIG. 2.
Figure 6B:
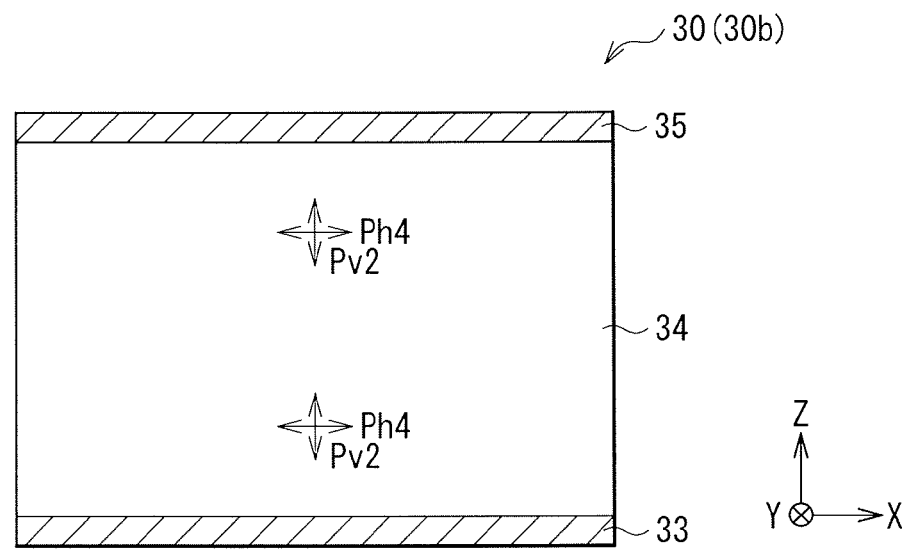
FIG. 6B is a diagram illustrating another example of the structural periods in the far region of the light modulation layer in FIG. 2.

FIGS. 5A and 5B illustrate structural periods in an X-axis direction, a Y-axis direction, and a Z-axis direction in a region (a close region 30a) closer to the light source 20 of the light modulation layer 34. FIGS. 6A and 6B illustrate structural periods in the X-axis direction, the Y-axis direction, and the Z-axis direction in a region (a far region 30b) farther from the light source 20 of the light modulation layer 34. It is to be noted that the close region 30a corresponds to a specific example of "third region" in the present technology, and the far region 30b corresponds to a specific example of "fourth region" in the present technology.

In the light modulation layer 34, at least the structural period in the X-axis direction of the structural periods in the X-axis direction, the Y-axis direction, and the Z-axis direction is different, depending on a distance from the light source 20, and the structural periods in the X-axis direction in the close region 30a and the far region 30b are different from each other. For example, as illustrated in FIGS. 5A and 5B, the light modulation layer 34 may have a regular structure with a period Ph2 in the X-axis direction, a period Ph1 in the Y-axis direction, and a period Pv1 in the Z-axis direction in the close region 30a. Moreover, for example, as illustrated in FIGS. 6A and 6B, the light modulation layer 34 may have a regular structure with a period Ph4 in the X-axis direction, a period Ph3 in the Y-axis direction, and a period Pv2 in the Z-axis direction in the far region 30b.

In the close region 30a and the far region 30b, interfaces between the polymer region 34A and the liquid crystal regions 34B are formed relatively densely in a direction orthogonal to the alignment directions of the alignment films 33 and 35, and are formed relatively coarsely in the alignment directions of the alignment films 33 and 35. Moreover, the interfaces between the polymer region 34A and the liquid crystal regions 34B are disposed in the close region 30a more coarsely than in the far region 30b. The structural periods in the light modulation layer 34 are adjustable by adjusting, for example, a way of applying ultraviolet light in a manufacturing process, a polarization component of ultraviolet light applied, a weight ratio of a low-molecular monomer included in a material of the light modulation layer 34, and/or the like. It is to be noted that a specific method of adjusting the structural periods in the light modulation layer 34 will be described in detail later.

Figure 8:
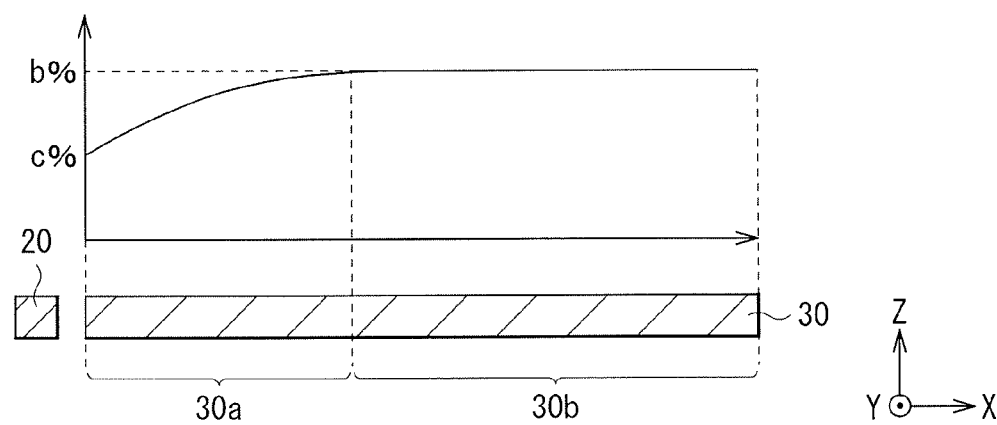
FIG. 8 is a diagram illustrating another example of the ratio of the polymer region in the light modulation layer in FIG. 2.
Figure 9:
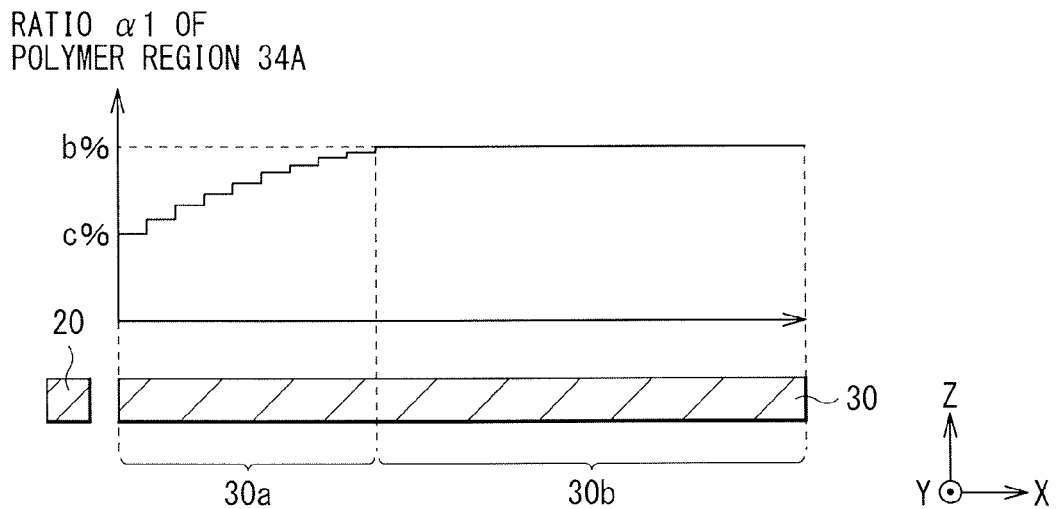
FIG. 9 is a diagram illustrating still another example of the ratio of the polymer region in the light modulation layer in FIG. 2.

A ratio α1 of the polymer region 34A in the light modulation layer 34 is different, depending on a distance from the light source 20, and the ratios α1 in the close region 30a and the far region 30b are different from each other. For example, as illustrated in FIGS. 7 to 9, the ratio α1 is relatively low in the close region 30a and relatively high in the far region 30b.

Figure 7:
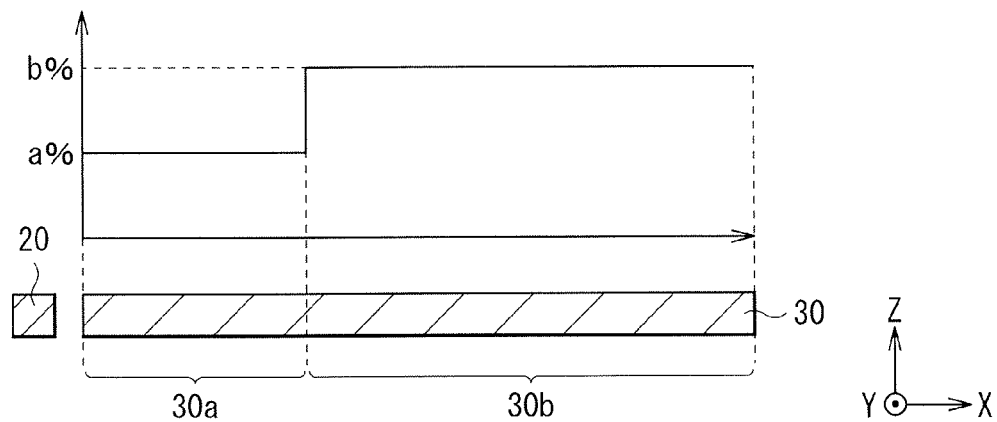
FIG. 7 is a diagram illustrating an example of a ratio of a polymer region in the light modulation layer in FIG. 2.

For example, as illustrated in FIG. 7, the ratio α1 has a fixed value (a %) in the close region 30a, and has a fixed value (b %) larger than a % in the far region 30b. For example, as illustrated in FIG. 8, the ratio α1 may be smoothly increased from c % to b % with an increasing distance from the light source 20 in the close region 30a, and may have a fixed value (b %) in the far region 30b. It is to be noted that c % may be equal to a %, or may be lower or higher than a %. Moreover, as illustrated in FIG. 9, the ratio α1 may be intermittently (in a stepwise way) increased with an increasing distance from the light source 20 in the close region 30a and may have a fixed value (b %) in the far region 30b.

The polymer region 34A and the liquid crystal regions 34B have different response speeds with respect to an electric field. The polymer region 34A has relatively low responsivity with respect to the electric field, and the liquid crystal regions 34B have relatively high responsivity with respect to the electric field. The polymer region 34A is configured to include a polymer material. The polymer region 34A has, for example, a streaky structure or a porous structure which does not respond to an electric field, or a rod-like structure having a response speed slower than that of the liquid crystal region 34B. The streaky structure, the porous structure, or the rod-like structure in the polymer region 34A extend in a direction parallel or substantially parallel to the light incident surface 10A and parallel or substantially parallel to the surface of the transparent substrate 31. In other words, the streaky structure, the porous structure, or the rod-like structure in the polymer region 34A extend in a direction parallel or substantially parallel to the linear light source.

The polymer region 34A is formed of, for example, a polymer material obtained by polymerizing a low-molecular monomer. The polymer region 34A is formed, for example, by polymerizing, by one or both of heat and light, a low-molecular monomer with orientation and polymerizability which is aligned along the alignment directions of the alignment films 33 and 35. The liquid crystal regions 34B are configured to include a liquid crystal material, and have a response speed sufficiently higher than that of the polymer region 34A. Examples of the liquid crystal material (liquid crystal molecules) included in the liquid crystal regions 34B may include rod-like molecules. As liquid crystal molecules included in the liquid crystal regions 34B, liquid crystal molecules having positive dielectric constant anisotropy (a so-called positive type liquid crystal) may be preferably used.

The above-described low-molecular monomer may be preferably a low-molecular monomer having orientation and polymerizability. As the low-molecular monomer having orientation and polymerizability, a low-molecular monomer that has optical anisotropy and is allowed to be combined with a liquid crystal may be used, and in this embodiment, a low-molecular monomer that is curable with ultraviolet light may be preferable. It may be preferable that, in a state where no voltage is applied, directions of optical anisotropy of the liquid crystal and a resultant (a polymer material) formed by polymerizing a low-molecular monomer coincide with each other; therefore, before curing the low-molecular monomer with ultraviolet light, the liquid crystal and the low-molecular monomer may be preferably aligned in the same direction. In a case where a liquid crystal is used as the liquid crystal regions 34B, when the liquid crystal includes rod-like molecules, the used low-molecular monomer material may preferably have a rod-like shape. As described above, a material having both polymerizability and a liquid crystal property (a low-molecular monomer having both polymerizability and a liquid crystal property) may be preferably used as the low-molecular monomer. For example, the low-molecular monomer having both polymerizability and the a liquid crystal property may preferably include one or more functional groups selected from a group configured of an acrylate group, a methacrylate group, an acryloyloxy group, a methacryloyloxy group, a vinyl ether group, and an epoxy group as polymerizable functional groups. These functional groups are allowed to be polymerized by ultraviolet, infrared, or electron irradiation, or by heating. To suppress a reduction in the degree of alignment under ultraviolet irradiation, a liquid crystal material having a polyfunctional group may be added. In a case where the polymer region 34A has the above-described streaky structure, as the material of the light modulation layer 34, a bifunctional monomer (a low-molecular monomer having both polymerizability and the liquid crystal property) may be preferably used. Moreover, a monofunctional monomer may be added to the material of the polymer region 34A to adjust a temperature at which the liquid crystal property is exhibited, or a tri- or more-functional monomer may be added to the material of the polymer region 34A to improve crosslink density.

(Optical Anisotropy)

Figure 10:
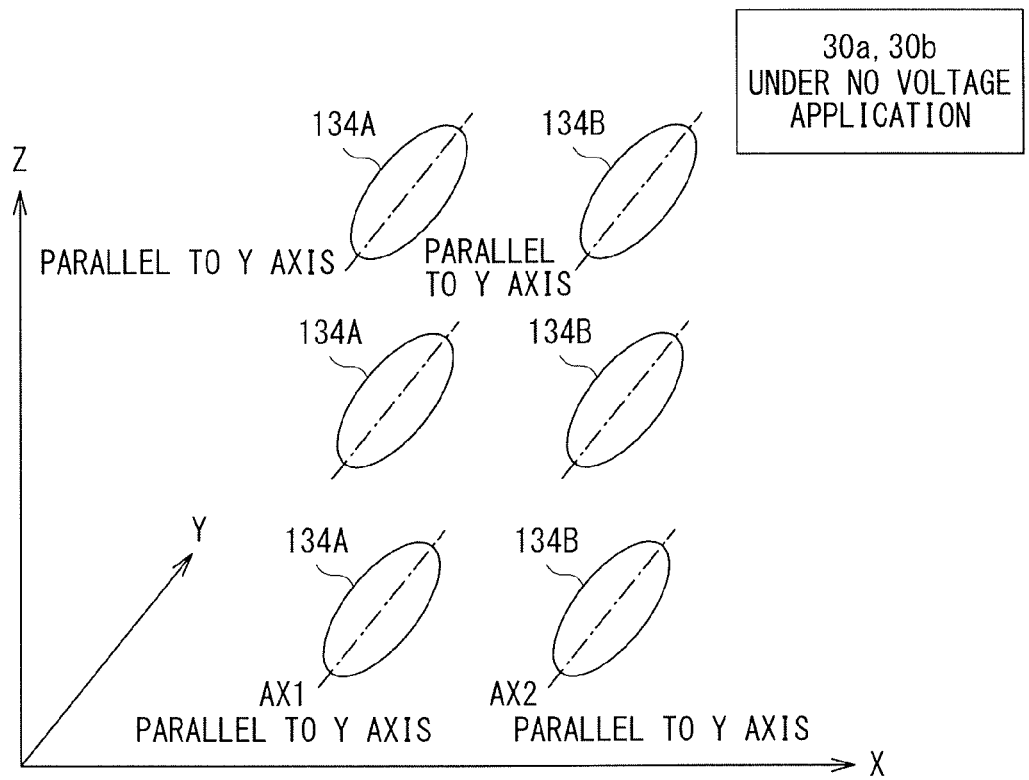
FIG. 10 is a diagram schematically illustrating an example of a function of the light modulation device in FIG. 1.

FIG. 10 schematically illustrates an example of an alignment state in the polymer region 34A and the liquid crystal regions 34B under no voltage application. An ellipsoid 134A in FIG. 10 is an example of a refractive index ellipsoid exhibiting refractive index anisotropy of the polymer region 34A under no voltage application. An ellipsoid 134B in FIG. 10 is an example of a refractive index ellipsoid exhibiting refractive index anisotropy of the liquid crystal region 34B under no voltage application. The refractive index ellipsoid is a tensor ellipsoid representing a refractive index of linearly-polarized light incident from various directions, and when a section of an ellipsoid from a light incident direction is observed, the refractive index is allowed to be geometrically learned.

Figure 11:
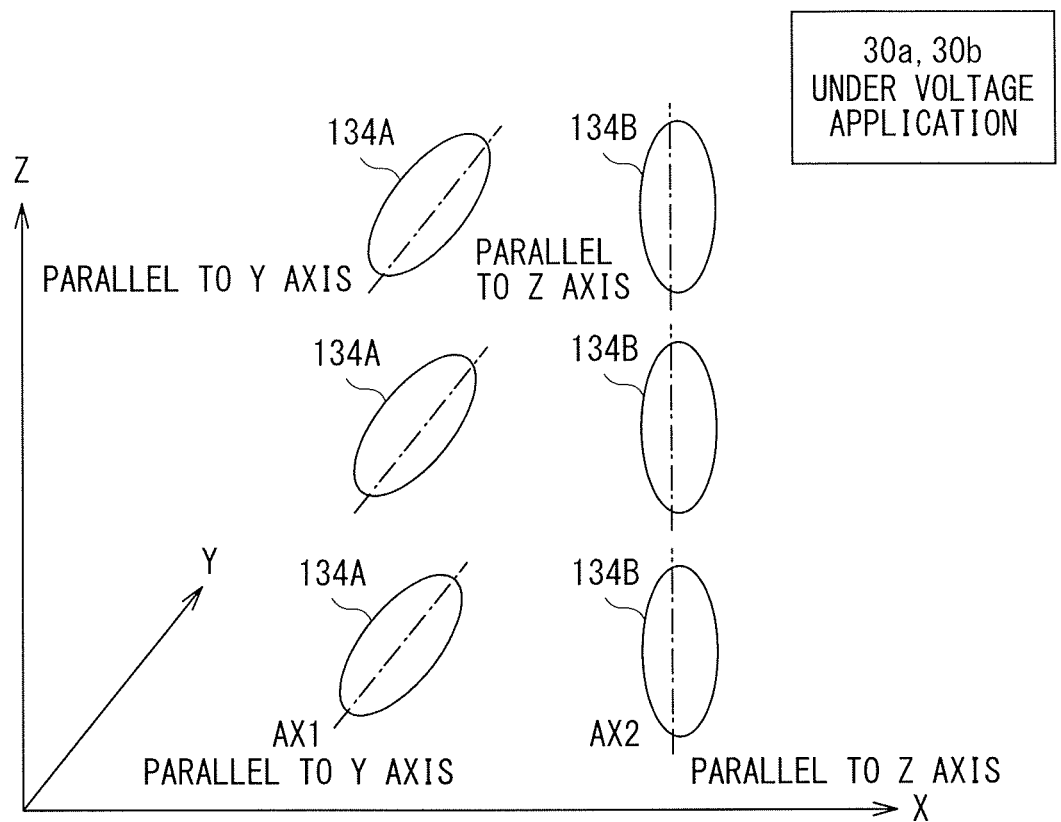
FIG. 11 is a diagram schematically illustrating another example of the function of the light modulation device in FIG. 1.

FIG. 11 schematically illustrates an example of an alignment state in the polymer region 34A and the liquid crystal regions 34B under voltage application. The ellipsoid 134A in FIG. 11 is an example of a refractive index ellipsoid exhibiting refractive index anisotropy of the polymer region 34A under voltage application. The ellipsoid 134B in FIG. 11 is an example of a refractive index ellipsoid exhibiting refractive index anisotropy of the liquid crystal region 34B under voltage application.

For example, as illustrated in FIG. 10, the polymer region 34A and the liquid crystal region 34B are structured to allow the direction of an optical axis AX1 of the polymer region 34A (more specifically, a major axis of the ellipsoid 134A) and the direction of an optical axis AX2 of the liquid crystal region 34B (more specifically, a major axis of the liquid crystal region 134B) to coincide with (be parallel to) each other under no voltage application. It is to be noted that the optical axes AX1 and AX2 each indicate a line parallel to a travel direction of a light beam allowing a refractive index to have one value irrespective of polarization direction. Moreover, it is not necessary for the directions of the optical axis AX1 and the optical axis AX2 to consistently coincide with each other under no voltage application, and the directions of the optical axis AX1 and the optical axis AX2 may be slightly deviated from each other due to, for example, a manufacturing error.

Moreover, in the liquid crystal regions 34B, under no voltage application, the optical axis AX2 is parallel or substantially parallel to the light incident surface 10A and parallel or substantially parallel to the surface of the transparent substrate 31. In a case where the alignment films 33 and 35 have a pretilt function, under no voltage application, the optical axis AX2 is parallel or substantially parallel to the light incident surface 10A, and intersects with the surface of the transparent substrate 31 at a predetermined pretilt angle.

On the other hand, in the polymer region 34A, the optical axis AX1 is fixed irrespective of whether or not a voltage is applied. More specifically, the optical axis AX1 is parallel or substantially parallel to the light incident surface 10A and parallel or substantially parallel to the surface of the transparent substrate 31. In other words, the optical axis AX1 is parallel or substantially parallel to the optical axis AX2 under no voltage application. In a case where the alignment films 33 and 35 have a pretilt function, the optical axis AX1 is parallel or substantially parallel to the light incident surface 10A, and intersects with the surface of the transparent substrate 31 at a predetermined pretilt angle. In other words, also in this case, the optical axis AX1 is parallel or substantially parallel to the optical axis AX2 under no voltage application.

Figure 12:
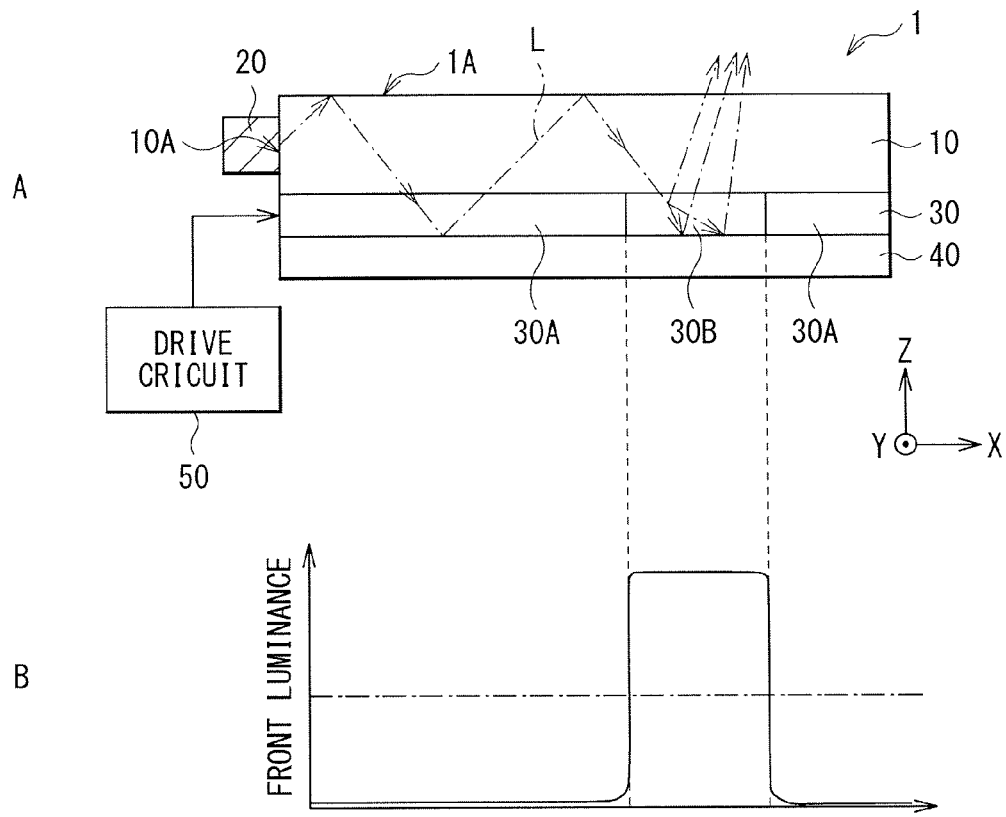
FIGS. 12A and 12B is a diagram schematically illustrating an example of a function of the illumination unit in FIG. 1.

Ordinary refractive indices of the polymer region 34A and the liquid crystal region 34B may be preferably equal to each other, and extraordinary refractive indices of the polymer region 34A and the liquid crystal region 34B may be preferably equal to each other. In this case, for example, under no voltage application, there is little difference in refractive index in all directions, and high transparency is obtained. Therefore, for example, light from the light source 20 passes through the light modulation layer 34 without being scattered in the light modulation layer 34. As a result, for example, as illustrated in FIGS. 12A and 12B, light L from the light source 20 (light from the oblique direction) propagates through a region (a transparent region 30A) that is transparent of the light modulation device 30, and is totally reflected by an interface between the light modulation device 30 and air, and luminance (luminance in black display) in the transparent region 30A is decreased, compared to a case where luminance is uniformized (indicated by an alternate long and short dash line in FIG. 12B). It is to be noted that a graph in FIG. 12B is obtained by measuring front luminance in a state where a diffuser sheet (not illustrated) is disposed on the light guide plate 10 as illustrated in FIG. 12A.

Moreover, for example, as illustrated in FIG. 11, the polymer region 34A and the liquid crystal regions 34B are structured to allow directions of the optical axes AX1 and AX2 to be different from (intersect with or be orthogonal to) each other under voltage application. More specifically, in the liquid crystal regions 34B, under voltage application, the optical axis AX2 is parallel or substantially parallel to the light incident surface 10A and parallel or substantially parallel to the normal to the transparent substrate 31.

Therefore, under voltage application, in the light modulation layer 34, a difference in refractive index in all directions is increased to obtain a high scattering property. Accordingly, for example, light from the light source 20 is scattered in the light modulation layer 34. As a result, for example, as illustrated in FIGS. 12A and 12B, the light L from the light source 20 (light from the oblique direction) is scattered in a region in a scattering state (a scattering region 30B) in the light modulation device 30, and the scattered light directly enters the light guide plate 10, or is reflected by the reflective plate 40 to enter the light guide plate 10, thereby exiting from a top surface (a light exit surface) of the light guide plate 10. Therefore, luminance of the scattering region 30B is extremely higher than that in a case where the luminance is uniformized (indicated by an alternate long and short dash line in FIG. 12B), and luminance in white display is partially increased (partial luminance enhancement) by a reduced amount of luminance of the transparent region 30A.

It is to be noted that the ordinary refractive indices of the polymer region 34A and the liquid crystal region 34B may be slightly different from each other due to, for example, a manufacturing error, and may be preferably, for example, 0.1 or less, and more preferably 0.05 or less. Moreover, the extraordinary refractive indices of the polymer region 34A and the liquid crystal region 34B may be slightly different from each other due to, for example, a manufacturing error, and may be preferably, for example, 0.1 or less, and more preferably 0.05 or less.

Moreover, a refractive index difference (=extraordinary refractive index-ordinary refractive index) in the polymer region 34A and a refractive index difference (=extraordinary refractive index-ordinary refractive index) in the liquid crystal region 34B may be preferably as large as possible, and may be preferably 0.05 or over, more preferably 0.1 or over, and still more preferably 0.15 or over. It is because, in a case where the refractive index differences in the polymer region 34A and the liquid crystal region 34B are large, the scattering power of the light modulation layer 34 is enhanced to allow light guide conditions to be easily disrupted, thereby allowing light from the light guide plate 10 to be easily extracted.

The drive circuit 50 controls a voltage applied to a pair of electrodes (sub-electrodes 32A and 36A) of each light modulation cell 30-1 to allow each light modulation cell 30-1 to emit light or not to emit light.

(Anisotropic Scattering)

Next, anisotropic scattering in this embodiment will be described below. In this embodiment, anisotropic scattering is caused by (a) nonuniformity of existence probability of interfaces (scattering interfaces) between the polymer region 34A and the liquid crystal regions 34B in the scattering region 30B, and (b) birefringence in the scattering region 30B. Therefore, nonuniformity of existence probability of the scattering interfaces in the scattering region 30B, and birefringence in the scattering region 30B will be described in detail below.

—Nonuniformity of Existence Probability of Scattering Interfaces—

In the scattering region 30B, the interfaces between the polymer region 34A and the liquid crystal regions 34B are disposed densely in a direction orthogonal to the alignment direction of the alignment film 33, and are disposed coarsely in a direction parallel to the alignment direction of the alignment film 33. The direction orthogonal to the alignment direction of the alignment film 33 indicates a direction perpendicular to the light incident surface 10A (hereinafter referred to as "first direction") or a direction perpendicular to the transparent substrate 31 (hereinafter referred to as "second direction"). The direction parallel to the alignment direction of the alignment film 33 indicates a direction parallel to the light incident surface 10A and parallel to the surface of the transparent substrate 31 (hereinafter referred to as "third direction"). Light propagating through the scattering region 30B in the first direction or the second direction enters an interface in periods of an average streaky texture size in a minor-axis direction of a streaky structure in the polymer region 34A; therefore, the light is largely scattered. On the other hand, light propagating through the scattering region 30B in the third direction enters an interface in periods of an average streaky texture size in a major-axis direction of the streaky structure in the polymer region 34A; therefore, the light is not scattered much.

—Birefringence—

Moreover, in the scattering region 30B, light propagating in the first direction propagates in periods of the average streaky texture size in the minor-axis direction of the streaky structure in the polymer region 34A while being influenced by a difference between an extraordinary light refractive index of the liquid crystal region 34B and an ordinary light refractive index of the polymer region 34A and a difference between an ordinary light refractive index of the liquid crystal region 34B and an extraordinary light refractive index of the polymer region 34A. Therefore, light propagating through the scattering region 30B in the first direction is largely scattered.

On the other hand, in the scattering region 30B, light propagating in the second direction or the third direction propagates in periods of the average streaky texture size in the minor-axis direction or the major-axis direction of the streaky structure in the polymer region 34A while being influenced by only the difference between the ordinary light refractive index of the liquid crystal region 34B and the extraordinary light refractive index of the polymer region 34A or the difference between the extraordinary light refractive index of the liquid crystal region 34B and the ordinary light refractive index of the polymer region 34A. As a result, in the scattering region 30B, scattering of light propagating in the second direction or the third direction is smaller than scattering of light propagating in the first direction.

In other words, the light modulation layer 34 is configured to exhibit, in the scattering region 30B (when the light modulation layer 34 exhibits the scattering property), anisotropic scattering in which scattering (hereinafter referred to as "first scattering") of light propagating in the first direction is larger than scattering (hereinafter referred to as "third scattering") of light propagating in the third direction. Moreover, the light modulation layer 34 is configured to exhibit, in the scattering region 30B (when the light modulation layer 34 exhibits the scattering property), anisotropic scattering in which scattering (hereinafter referred to as "second scattering") of light propagating in the second direction is larger than the third scattering.

As used herein, a magnitude of the first scattering is A, a magnitude of the second scattering is B, and a magnitude of the third scattering is C. A magnitude of the first scattering in the close region 30a of the light modulation layer 34 is A1, and a magnitude of the third scattering in the close region 30a of the light modulation layer 34 is C1. A magnitude of the first scattering in the far region 30b of the light modulation layer 34 is A2, and a magnitude of the third scattering in the far region 30b of the light modulation layer 34 is C2. At this time, the light modulation layer 34 is configured to satisfy the following expressions when the light modulation layer 34 exhibits the scattering property. A1/C1 corresponds to a magnitude of scattering anisotropy in the close region 30a (which will be described later), and A2/C2 corresponds to a magnitude of scattering anisotropy in the far region 30b (which will be described later).

$$A > B > C$$

$$A1/C1 < A2/C2$$

Next, advantages in a case where the light modulation layer 34 exhibits such anisotropic scattering will be described below. A light modulation layer having optical isotropy exhibits an isotropic scattering property. In a case where such a light modulation layer is used instead of the light modulation layer 34 in this embodiment, a large amount of light is scattered also in a direction parallel to a plane of the light guide plate 10, and a probability of changing a light propagating direction until disrupting light guide conditions is reduced. On the other hand, in this embodiment, as can be seen from the above expressions, light incident on the light modulation layer 34 is largely scattered in a direction perpendicular to the top surface of the light guide plate 10; therefore, light is preferentially scattered in a direction where the light guide conditions are disrupted. Accordingly, it is considered that, when the light modulation layer 34 exhibits anisotropic scattering, light extraction efficiency from the light guide plate 10 is increased.

To increase a scattering property of guided light, the average streaky texture size in the minor-axis direction in the polymer region 34A may be preferably within a range from 0.1 micrometers to 10 micrometers both inclusive, and more preferably within a range from 0.2 micrometers to 2.0 micrometers both inclusive.

Next, magnitudes of anisotropic scattering in the close region 30a and the far region 30b will be described below.

A magnitude of scattering anisotropy indicates a quotient of three axes, i.e., a magnitude of scattering of light propagating in the first direction (the X-axis direction), a magnitude of scattering of light propagating in the third direction (the Y-axis direction), and a magnitude of scattering of light propagating in the second direction (the Z-axis direction). More specifically, the quotient of three axes indicates a total sum of the following three fractions ((A) to (C)). When the quotient of three axes is large, scattering anisotropy is large, and when the quotient of three axes is small, scattering anisotropy is small. In other words, the further the quotient of three axes is deviated from 1, the larger scattering anisotropy becomes, and the closer the quotient of three axes approaches 1, the smaller the scattering anisotropy becomes. It is to be noted that, in the following fractions (A) to (C), as a precondition, a value of a numerator is larger than a value of a denominator. Therefore, in a case where the value of the numerator is smaller than the value of the denominator, the numerator and denominator may preferably switch places in the following fractions (A) to (C).

(A) (Magnitude of scattering of light propagating in the first direction)/(magnitude of scattering of light propagating in the third direction)

(B) (Magnitude of scattering of light propagating in the second direction)/(magnitude of scattering of light propagating in the third direction)

(C) (Magnitude of scattering of light propagating in the first direction)/(magnitude of scattering of light propagating in the second direction)

The magnitude of scattering anisotropy is determined by (a) nonuniformity of existence probability of the interfaces (scattering interfaces) between the polymer region 34A and the liquid crystal regions 34B in the scattering region 30B, and (b) birefringence in the scattering region 30B. In the magnitude of scattering anisotropy, the above-described factor (a) is dominant. It is because, when existence probability of the scattering interfaces is considered, ideally, a same medium is continued in the third direction; therefore, light is not scattered in the third direction, and is scattered only in the first direction and the second direction. At this time, in a desk plan, scattering in the third direction is zero; therefore, a scattering ratio of the third direction to the first direction and the second direction is infinite. On the other hand, when birefringence is considered, while two polarization components are scattered in the first direction, only one polarization component is scattered in the second direction and the third direction. At this time, a scattering ratio of the first direction to the second direction and the third direction is twice as high at most. Accordingly, in the magnitude of scattering anisotropy, the above-described factor (a) is dominant. Therefore, a relationship between existence probability of the scattering interfaces and the magnitude of scattering anisotropy will be described below, and a relationship between birefringence and the magnitude of scattering anisotropy will not be described.

The magnitude of scattering anisotropy corresponds to a quotient of three axes, i.e., a period in the first direction in the light modulation layer 34, a period in the third direction in the light modulation layer 34, and a period in the second direction in the light modulation layer 34. The quotient of three axes specifically indicates a total sum of the following three fractions ((D) to (F)). It is to be noted that, in the following fractions (D) to (F), as a precondition, a value of a numerator is larger than a value of a denominator. Therefore, in a case where the value of the numerator is smaller than the value of the denominator, the numerator and denominator may preferably switch places in the following fractions (D) to (F).

(D) (Period in the third direction in the light modulation layer 34)/(period in the first direction in the light modulation layer 34)

(E) (Period in the third direction in the light modulation layer 34)/(period in the second direction in the light modulation layer 34)

(F) (Period in the second direction in the light modulation layer 34)/(period in the first direction in the light modulation layer 34)

A magnitude (A1/C1) of scattering anisotropy in the close region 30a has a value corresponding to Ph1/Ph2+Ph1/Pv1+Pv1/Ph2. Moreover, a magnitude (A2/C2) of scattering anisotropy in the far region 30b has a value corresponding to Ph3/Ph4+Ph3/Pv2+Pv2/Ph4. Herein, respective periods may have, for example, the following relationship.

$$Ph1/Ph2 < Ph3/Ph4$$

$$Ph1/Pv1 < Ph3/Pv2$$

Ph2 is nearly equal to Pv1.
Ph4 is nearly equal to Pv2.

Therefore, it can be said that, when the light modulation layer 34 exhibits the scattering property, the light modulation layer 34 is configured to satisfy A>B>C and A1/C1<A2/C2.

The magnitudes of scattering anisotropy in the close region 30a and the far region 30b are different from each other, because the ratios α1 of the polymer region 34A in the light modulation layer 34 in the close region 30a and the far region 30b are different from each other. The ratio α1 of the polymer region 34A in the light modulation layer 34 is relatively low in the close region 30a, and is relatively high in the far region 30b. In a region (the close region 30a) in which the ratio α1 is relatively low, compared to a region (the far region 30b) in which the ratio α1 is relatively high, the magnitude of scattering anisotropy is relatively low.

Figure 13:
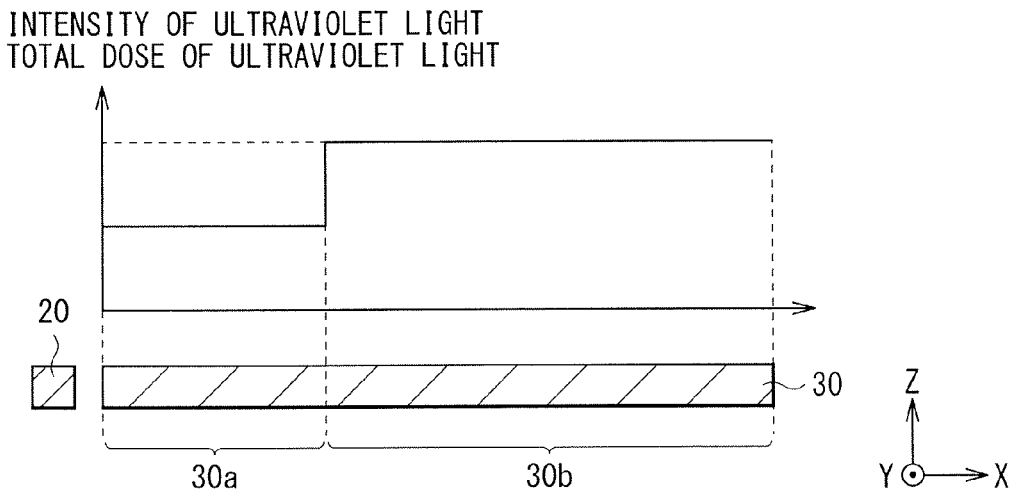
FIG. 13 is a diagram illustrating an example of intensity or a total dose of ultraviolet light.
Figure 14:
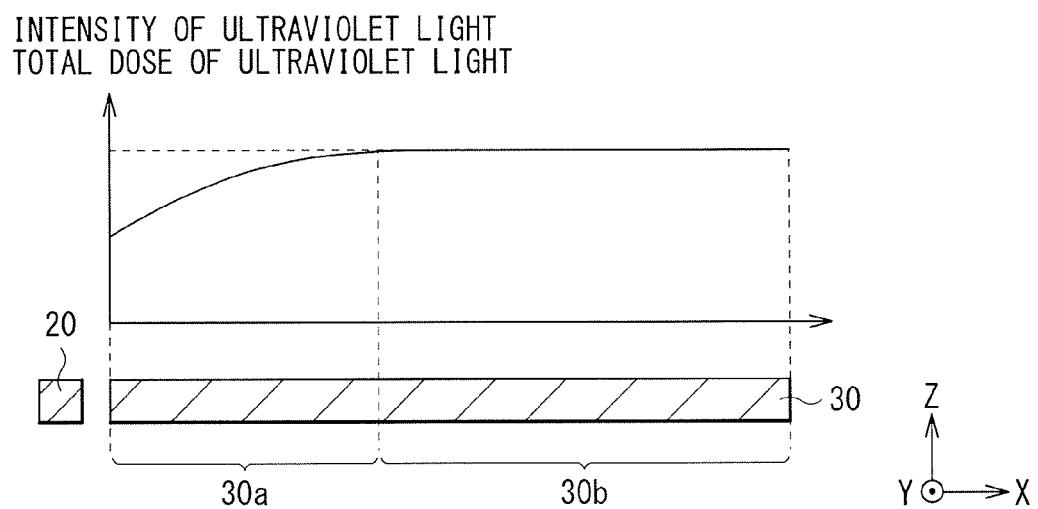
FIG. 14 is a diagram illustrating another example of the intensity or the total dose of ultraviolet light.
Figure 15:
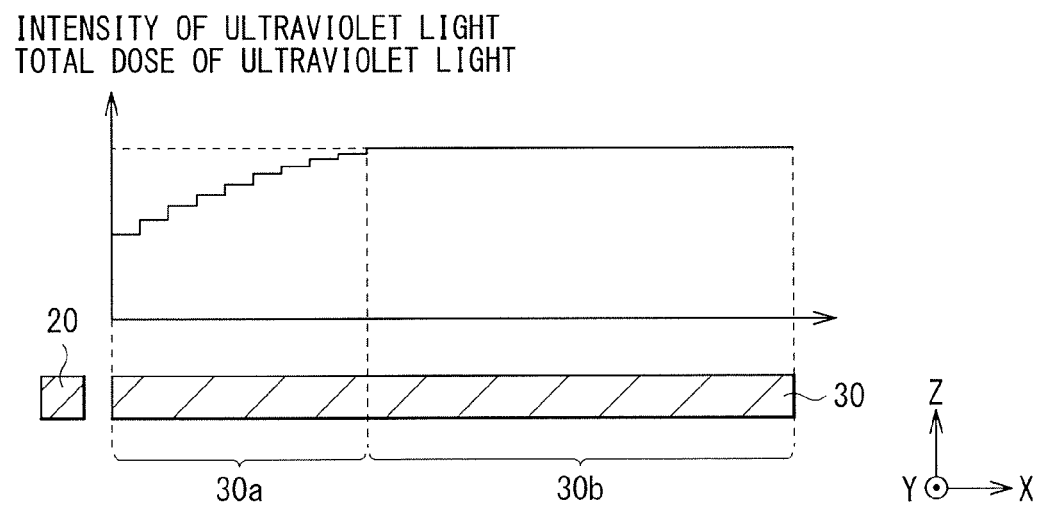
FIG. 15 is a diagram illustrating still another example of the intensity or the total dose of ultraviolet light.

The ratio α1 is adjustable, for example, by a way of applying ultraviolet light in a manufacturing process. For example, the ratio α1 is adjustable by adjusting intensity or a total dose of ultraviolet light applied to a mixture of a liquid crystal material and a low-molecular monomer having both polymerizability and a liquid crystal property. Therefore, the light modulation layer 34 (the close region 30*a* and the far region 30*b*) may be formed by applying ultraviolet light so as to allow intensity or a total dose of ultraviolet light applied to a region farther from the light source 20 to be larger than that applied to a region closer to the light source 20. In a case where the ratio α1 in the polymer region 34A is, for example, as illustrated in FIG. 7, the intensity or the total dose of ultraviolet light has a distribution (for example, refer to FIG. 13) similar to that in FIG. 7. Moreover, in a case where the ratio α1 in the polymer region 34A is, for example, as illustrated in FIG. 8, the intensity or the total dose of ultraviolet light has a distribution (for example, refer to FIG. 14) similar to that in FIG. 8. Further, in a case where the ratio α1 in the polymer region 34A is, for example, as illustrated in FIG. 9, the intensity or the total dose of ultraviolet light has a distribution (for example, refer to FIG. 15) similar to that in FIG. 9.

The intensity of ultraviolet light is adjustable, for example, by using a gray mask. For example, the ratio α1 is adjustable by applying ultraviolet light to a mixture of a liquid crystal material and a low-molecular monomer having both polymerizability and a liquid crystal property through a gray mask in which transmittance of ultraviolet light in a region farther from the light source 20 is higher than that in a region closer to the light source 20. Therefore, the light modulation layer 34 (the close region 30*a* and the far region 30*b*) may be formed by applying ultraviolet light through the gray mask in which transmittance of ultraviolet light in the region farther from the light source 20 is higher than that in the region closer to the light source 20.

The intensity of ultraviolet light is adjustable, for example, by using an LED emitting ultraviolet light. The ratio α1 is adjustable, for example, by applying LED light in an ultraviolet region to a mixture of a liquid crystal material and a low-molecular monomer having both polymerizability and a liquid crystal property so as to allow the intensity of ultraviolet light applied to the region farther from the light source 20 to be larger than that applied to the region closer to the light source 20. Therefore, the light modulation layer 34 (the close region 30*a* and the far region 30*b*) may be formed by applying LED light in an ultraviolet region so as to allow the intensity of ultraviolet light applied to the region farther from the light source 20 to be larger than that applied to the region closer to the light source 20.

The total dose of ultraviolet light is adjustable, for example, by using an LED emitting ultraviolet light. For example, the ratio α1 is adjustable by applying pulses of LED light in an ultraviolet region to a mixture of a liquid crystal material and a low-molecular monomer having both polymerizability and a liquid crystal property so as to allow the total dose of ultraviolet light applied to the region farther from the light source 20 to be larger than that applied to the region closer to the light source 20. Therefore, the light modulation layer 34 (the close region 30*a* and the far region 30*b*) may be formed by applying pulses of LED light in an ultraviolet region so as to allow the total dose of ultraviolet light applied to the region farther from the light source 20 to be larger than that to the region closer to the light source 20. Moreover, in a case where the above-described mixture is exposed to light while being transported with use of a conveyor belt for transport in a manufacturing process, speed of the conveyor belt may be adjusted so as to allow the total dose of ultraviolet light applied to the region farther from the light source 20 to be larger than that applied to the region closer to the light source 20.

It is to be noted that the light modulation layer 34 may be formed, for example, by performing exposure with use of polarized light. For example, the light modulation layer 34 in which the degree of scattering anisotropy is relatively small in the close region 30*a* and relatively large in the far region 30*b* is allowed to be formed by applying polarized light in an ultraviolet region to a mixture of a liquid crystal material and a low-molecular monomer having both polymerizability and a liquid crystal property so as to apply more polarization components of polarized light in an ultraviolet region to the region farther from the light source 20 than to the region closer to the light source 20. Therefore, the light modulation layer 34 (the close region 30*a* and the far region 30*b*) may be formed by applying more polarization components of polarized light in an ultraviolet region to the region farther from the light source 20 than to the region closer to the light source 20. It is to be noted that, in a case where the light modulation layer 34 is formed in such a manner, the ratio α1 in the close region 30*a* may be smaller than that in the far region 30*b*, or the ratios α1 in the close region 30*a* and the far region 30*b* may be equal or substantially equal to each other.

Moreover, the light modulation layer 34 is allowed to be formed, for example, by adjusting a weight ratio of a liquid crystal material and a low-molecular monomer having both polymerizability and a liquid crystal property. For example, the polymer region 34A and the liquid crystal regions 34B included in the close region 30*a* are allowed to be formed by mixing the liquid crystal material and the low-molecular monomer having polymerizability and a liquid crystal property at a weight ratio from 98:2 to 75:25 to form a mixture, and applying ultraviolet light to the mixture to cure the above-described low-molecular monomer. Further, the polymer region 34A and the liquid crystal regions 34B included in the far region 30*b* are allowed to be formed by mixing, at a weight ratio from 95:5 to 50:50, a liquid crystal material and a low-molecular monomer having both polymerizability and a liquid crystal property and having a larger weight percent than that of the above-described low-molecular monomer in the close region 30*a* to form a mixture, and applying ultraviolet light to the mixture to cure the above-described low-molecular monomer. Therefore, the light modulation layer 34 (the close region 30*a* and the far region 30*b*) may be formed by depositing the mixture of the liquid crystal material and the low-molecular monomer having both polymerizability and a liquid crystal property so as to allow a weight ratio of the liquid crystal material to the mixture in the region closer to the light source 20 to be larger than that in the region farther from the light source 20, and then applying ultraviolet light to the mixture.

Figure 16:
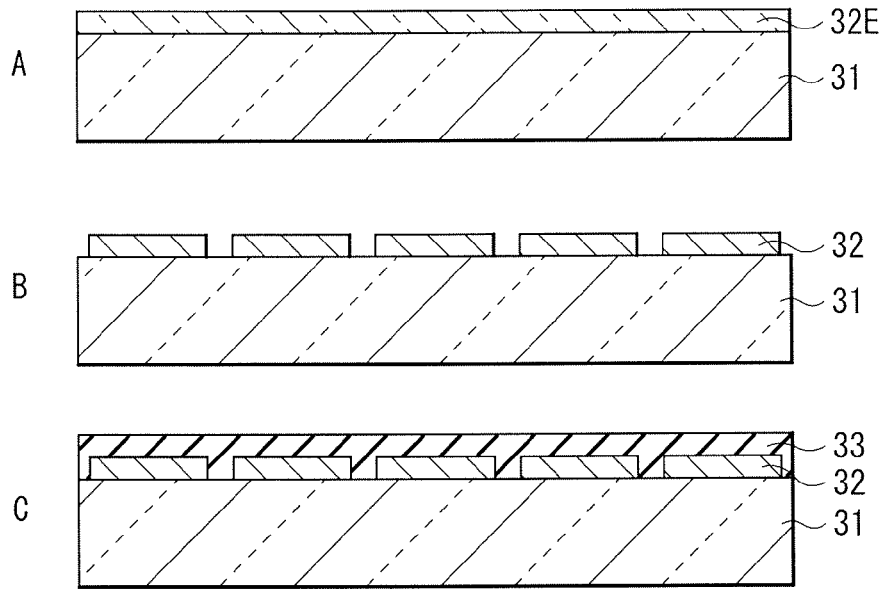
FIGS. 16A through 16C is a diagram illustrating an example of a method of manufacturing the light modulation device in FIG. 1.
Figure 17:
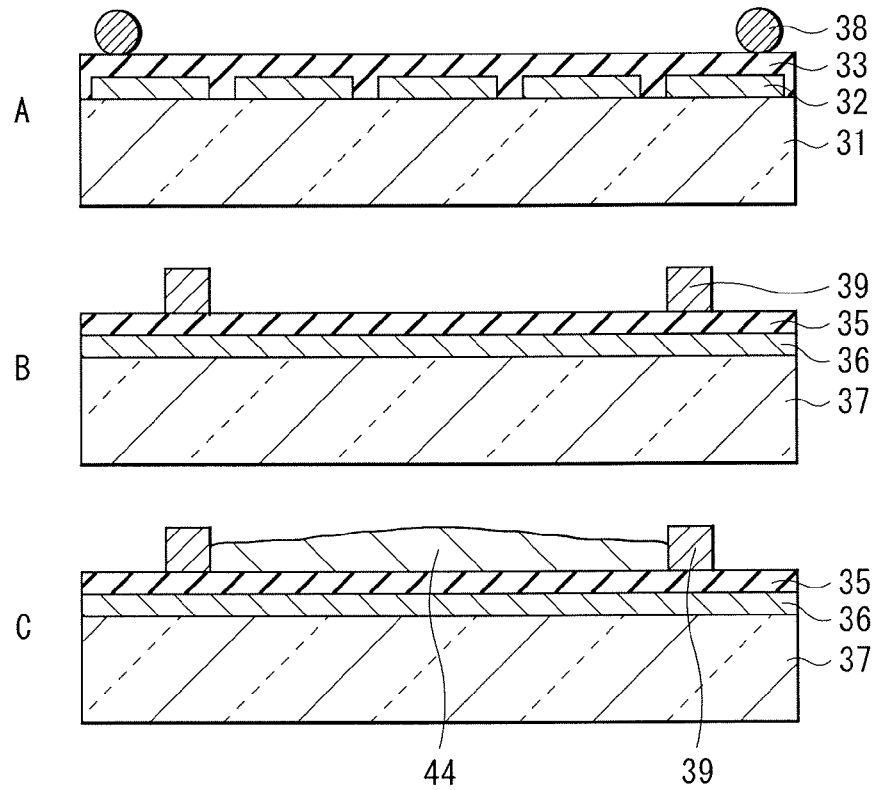
FIGS. 17A through 17C is a diagram illustrating a manufacturing process following FIG. 16.
Figure 18:
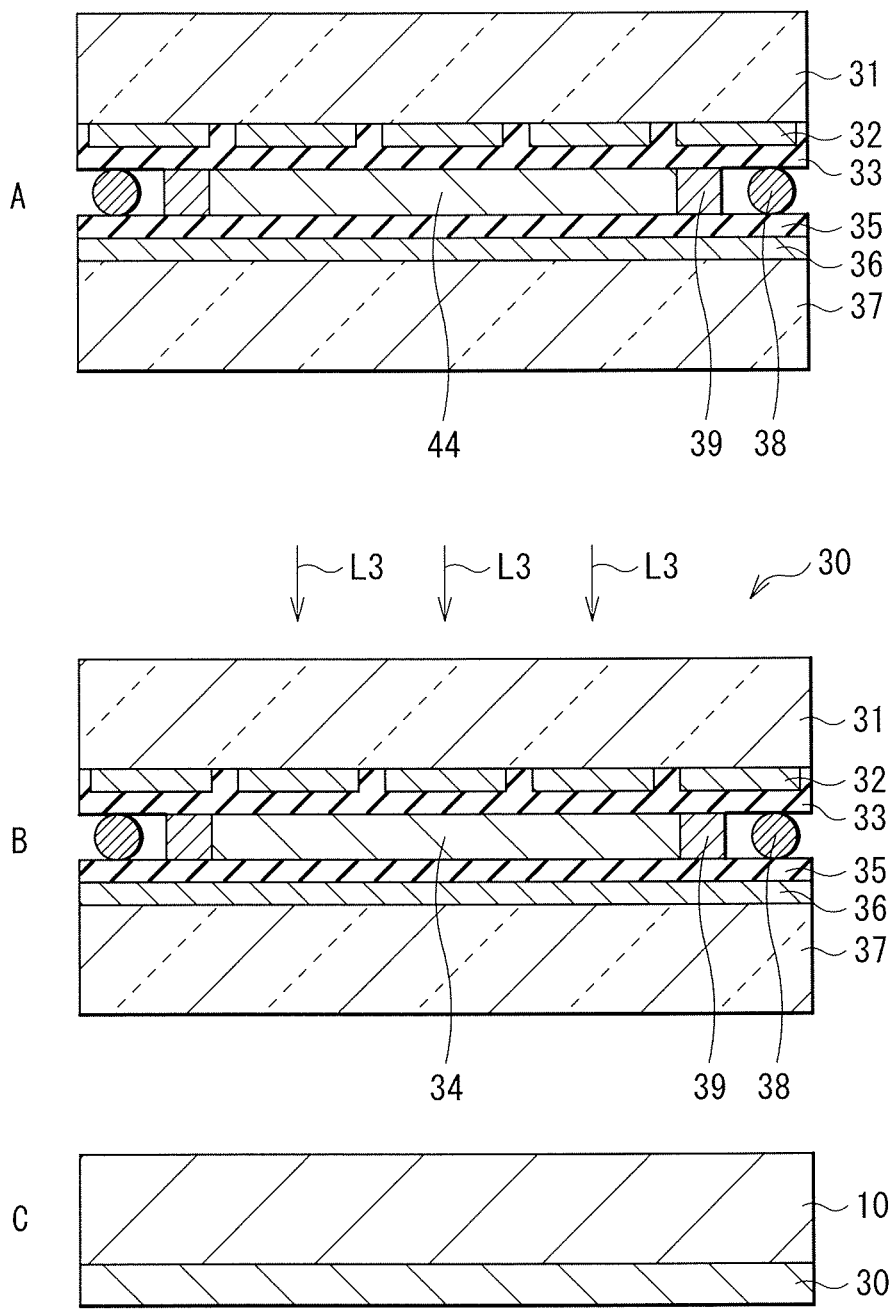
FIGS. 18A through 18C is a diagram illustrating a manufacturing process following FIG. 17.

A method of manufacturing the illumination unit 1 according to this embodiment will be described below referring to FIGS. 16 to 18.

First, a transparent conductive film 32E made of ITO or the like is formed on the transparent substrate 31 configured of a glass substrate or a plastic film substrate (refer to FIG. 16A). Next, a patterned resist layer (not illustrated) is formed on the transparent conductive film 32E, and then the transparent conductive film 32E is selectively etched with use of the resist layer as a mask. As a result, the lower electrode 32 is formed (refer to FIG. 16B).

Next, after an entire surface of the transparent substrate 31 is coated with the alignment film 33, the alignment film 33 is dried and fired (refer to FIG. 16C). In a case where a polyimide-based material is used as the alignment film 33, NMP (N-methyl-2-pyrrolidone) is often used as a solvent; however, at this time, a temperature of about 200° C. is necessary under an atmosphere. It is to be noted that, in this case, when a plastic substrate is used as the transparent substrate 31, the alignment film 33 may be vacuum-dried at 100° C. and fired. After that, a rubbing process is performed on the alignment film 33. Therefore, the alignment film 33 is allowed to function as an alignment film for horizontal alignment.

Next, spacers 38 allowing a cell gap to be formed are sprayed on the alignment film 33 by a dry method or a wet method (refer to FIG. 17A). It is to be noted that, in a case where the light modulation cells 30-1 are formed by a vacuum bonding method, the spacers 38 may be mixed in a mixture which is to be dropped. Alternatively, columnar spacers may be formed by a photolithography method, instead of the spacers 38.

Then, the alignment film 35 formed by a method similar to the above-described method is coated with a sealant pattern 39 for bonding and preventing leakage of the liquid crystal in, for example, a frame shape (refer to FIG. 17B). The sealant pattern 39 is allowed to be formed by a dispenser method or a screen printing method.

The vacuum bonding method (a one-drop-fill (ODF) method) will be described below; however, the light modulation cells 30-1 may also be formed by a vacuum injection method, a roll bonding method, or the like.

First, a mixture 44 of a liquid crystal and a monomer, corresponding to a volume determined by a cell gap, a cell area, or the like, is dropped uniformly on a plane (refer to FIG. 17C). The mixture 44 may be preferably dropped with use of a linear guide precise dispenser; however, a die coater or the like may be used with use of the sealant pattern 39 as a bank.

The above-described materials may be used as the liquid crystal and the monomer, and a weight ratio of the liquid crystal to the low-molecular monomer is within a range of 98:2 to 50:50, and may be preferably within a range of 95:5 to 75:25, and more preferably within a range of 92:8 to 85:15. A drive voltage is allowed to be decreased by increasing the ratio of the liquid crystal; however, when the liquid crystal is increased too much, the liquid crystal tends to have difficulty in returning to a transparent state, such as a reduction in whiteness under voltage application or a decrease in the response speed after turning the voltage off.

In addition to the liquid crystal and the low-molecular monomer, a polymerization initiator is added to the mixture 44. A monomer ratio of the added polymerization initiator is adjusted within a range of 0.1 wt % to 10 wt %, depending on a used ultraviolet wavelength. A polymerization inhibitor, a plasticizer, a viscosity modifier, or the like may be further added to the mixture 44, as necessary. When the monomer is a solid or gel at room temperature, a cap, a syringe, and a substrate may be preferably warmed.

After the transparent substrates 31 and 36 are put in a vacuum bonding system (not illustrated), evacuation is performed to bond the transparent substrates 31 and 36 (refer to FIG. 18A). After that, a resultant is released to the atmosphere to uniformize the cell gap by uniform pressurization under atmospheric pressure. The cell gap may be appropriately selected based on a relationship between white luminance (whiteness) and the drive voltage; however, the cell gap is within a range of 1 μm to 40 μm, and may be preferably within a range of 1 μm to 20 μm, and more preferably within a range of 1 μm to 10 μm.

After bonding, an alignment process may be preferably performed, as necessary (not illustrated). In a case where light leakage occurs by an insertion of a bonded cell between crossed-Nicols polarizers, the cell may be heated for a predetermined time or be left at room temperature. Thus, the liquid crystal and the low-molecular monomer in the mixture 44 are aligned by an alignment function of the alignment films 33 and 35. After that, the mixture 44 is irradiated with ultraviolet light L3 to polymerize the low-molecular monomer (refer to FIG. 18B). At this time, the ratio α1 of the polymer region 34A is adjusted by adjusting the intensity or the total dose of ultraviolet light. Moreover, as described above, exposure may be performed with use of polarized light. Thus, the light modulation device 30 that includes the modulation layer 34 satisfying A>B>C and A1/C1<A2/C2 when exhibiting the scattering property is manufactured.

It may be preferable to prevent the temperature of the cell from being changed under ultraviolet irradiation. An infrared cut filter may be preferably used, or an UV-LED or the like may be preferably used as a light source. Ultraviolet irradiance exerts an influence on a texture structure of a composite material; therefore, the ultraviolet irradiance may be preferably adjusted appropriately based on a used liquid crystal material or a used monomer material, and a composition thereof, and the ultraviolet irradiance may be preferably within a range of 0.1 mW/cm$^2$ to 500 mW/cm$^2$, and more preferably within a range of 0.5 mW/cm$^2$ to 30 mW/cm$^2$. There is a tendency that the lower the ultraviolet irradiance is, the lower the drive voltage becomes, and preferable ultraviolet irradiance is allowed to be selected in terms of both of productivity and properties.

Then, the light modulation device 30 is bonded to the light guide plate 10 (refer to FIG. 18C). Bonding may be carried out by sticking or adhesion; however, it may be preferable that the light modulation device 30 be adhered or stuck with a material having a refractive index which is as close to a refractive index of the light guide plate 10 and a refractive index of a substrate material of the light modulation device 30 as possible. Finally, leading lines (not illustrated) are attached to the lower electrode 32 and the upper electrode 36. Thus, the illumination unit 1 according to this embodiment is manufactured.

Although the process of forming the light modulation device 30, and finally bonding the light modulation device 30 to the light guide plate 10 is described, the transparent substrate 36 on which the alignment film 35 is formed may be bonded in advance to the surface of the light guide plate 10 to form the illumination unit 1. Moreover, the illumination unit 1 may be formed by one of a sheet-feeding method and a roll-to-roll method.

[Functions and Effects]

Next, functions and effects of the illumination unit 1 according to this embodiment will be described below.

In the illumination unit 1 according to this embodiment, a voltage is applied between a pair of electrodes (the sub-electrodes 32A and 36A) of each of the light modulation cells 30-1 to allow the optical axis AX2 of the liquid crystal region 34B in one light modulation cell 30B to be parallel or substantially parallel to the optical axis AX1 of the polymer region 34A, and to allow the optical axis AX2 of the liquid crystal region 34B in another light modulation cell 30B to intersect with or be orthogonal to the optical axis AX1 of the polymer region 34A. As a result, light emitted from the light source 20 and entering into the light guide plate 10 passes through the transparent region 30A where the optical axes AX1 and AX2 are parallel or substantially parallel to each other of the light modulation device 30. On the other hand, light emitted from the light source 20 and entering into the light guide plate 10 is scattered in the scattering region 30B where the optical axes AX1 and AX2 intersect with or are orthogonal to each other of the light modulation device 30. Light having passed through a bottom surface of the scattering region 30B in the scattered light is reflected by the reflective plate 40 to be returned to the light guide plate 10 again, and then the light exits from a top surface of the illumination unit 1. Moreover, light toward a top surface of the scattering region 30B in the scattered light passes through the light guide plate 10, and then exits from the top surface of the illumination unit 1. Thus, in this embodiment, light hardly exits from the top surface of the transparent region 30A, and light exits from the top surface of the scattering region 30B. Accordingly, a modulation ratio in a front direction is increased.

Typically, a PDLC is formed by mixing a liquid crystal material and an isotropic low-molecular material, and causing phase separation by ultraviolet irradiation, drying of a solvent, or the like, and is a composite layer in which microparticles of the liquid crystal material are dispersed in a polymer material. The liquid crystal material in the composite layer is aligned in random directions under no voltage application, and thus exhibits the scattering property, but on the other hand, under voltage application, the liquid crystal material is aligned in an electric field direction; therefore, in a case where the ordinary refractive index of the liquid crystal material and the refractive index of the polymer material are equal to each other, the liquid crystal material exhibits high transparency in the front direction (in a direction of a normal to the PDLC). However, in this liquid crystal material, a difference between the extraordinary refractive index of the liquid crystal material and the refractive index of the polymer material becomes pronounced in an oblique direction; therefore, even if the liquid crystal material has transparency in the front direction, the liquid crystal material exhibits the scattering property in the oblique direction.

A typical light modulation device using the PDLC often has a configuration in which the PDLC is sandwiched between two glass plates having surfaces on which transparent conductive films are formed. When light obliquely enters from air into the light modulation device with the above-described configuration, the light incident from the oblique direction is refracted by a refractive index difference between the air and the glass plate to enter into the PDLC at a smaller angle. Therefore, large scattering does not occur in such a light modulation device. For example, when light enters from air at an angle of 80°, the incident angle of the light on the PDLC is reduced to about 40° by refraction at a glass interface.

However, in an edge light system with use of a light guide plate, since light enters through the light guide plate, the light crosses the PDLC at a large angle of about 80°. Accordingly, a difference between the extraordinary refractive index of the liquid crystal material and the refractive index of the polymer material is large, and light crosses the PDLC at a larger angle, thereby causing a longer optical path subjected to scattering. For example, in a case where microparticles of a liquid crystal material having an ordinary refractive index of 1.5 and an extraordinary refractive index of 1.65 are dispersed in a polymer material having a refractive index of 1.5, there is no refractive index difference in the front direction (the direction of the normal to the PDLC), but the refractive index difference is large in the oblique direction. Therefore, the scattering property in the oblique direction is not allowed to be reduced, thereby causing low view angle characteristics. Further, in a case where an optical film such as a diffuser film is disposed on the light guide plate, oblique leak light is diffused also in the front direction by the diffuser film or the like, thereby causing an increase in light leakage in the front direction and a decrease in a modulation ratio in the front direction.

On the other hand, in this embodiment, since the polymer region 34A and the liquid crystal regions 34B are formed to include an optical anisotropic material, the scattering property in an oblique direction is reduced, thereby enabling to improve transparency. For example, when the polymer region 34A and the liquid crystal regions 34B are configured to include optical anisotropic materials with ordinary refractive indices which are equal to each other and extraordinary refractive indices which are also equal to each other, the directions of the optical axes of the polymer region 34A and the liquid crystal regions 34B coincide with or substantially coincide with each other in a region where a voltage is not applied between the lower electrode 32 and the upper electrode 36. Therefore, the refractive index difference is reduced or eliminated in all directions including the front direction (a direction of a normal to the light modulation device 30) and the oblique direction, thereby obtaining high transparency. As a result, the leakage of light in a range having a large view angle is allowed to be reduced or almost eliminated, and view angle characteristics are improvable.

For example, when a liquid crystal having an ordinary refractive index of 1.5 and an extraordinary refractive index of 1.65, and a liquid crystal monomer having an ordinary refractive index of 1.5 and an extraordinary refractive index of 1.65 are mixed, and the liquid crystal monomer is polymerized in a state where the liquid crystal and the liquid crystal monomer are aligned by an alignment film or an electric field, the optical axis of the liquid crystal and the optical axis of a polymer formed by polymerizing the liquid crystal monomer coincide with each other. Therefore, the refractive indices are allowed to coincide with each other in all directions, thereby enabling to achieve a state where transparency is high, and to further improve the view angle characteristics.

Moreover, in this embodiment, for example, as illustrated in FIGS. 12A and 12B, luminance in the transparent region 30A (luminance in black display) is lower, compared to a case where luminance is uniformized (indicated by the alternate long and short dash line in FIG. 12B). On the other hand, luminance in the scattering region 30B is significantly increased, compared to the case where luminance is uniformized (indicated by the alternate long and short dash line in FIG. 12B), and luminance in white display is partially increased (partial luminance enhancement) by a reduced amount of the luminance of the transparent region 30A.

The partial luminance enhancement is a technique of enhancing luminance when white display is partially performed, compared to a case where white display is performed on an entire screen. The partial luminance enhancement is typically and frequently used in a CRT, a PDP, or the like. However, in a liquid crystal display, since a backlight uniformly emits light in an entire surface thereof irrespective of an image, the luminance is not allowed to be partially enhanced. When an LED backlight in which a plurality of LEDs are two-dimensionally arranged is used as a backlight, some of the LEDs are allowed to be turned off. However, in such a case, diffusion light from dark regions in which the LEDs are turned off disappears; therefore, the luminance becomes lower, compared to a case where all of the LEDs are turned on. Also, luminance may be increased by increasing a current flowing through some LEDs which are turned on; however, in such a case, a large current flows for an extremely short time, thereby causing an issue in terms of load and reliability of a circuit.

On the other hand, in this embodiment, since the polymer region 34A and the liquid crystal regions 34B are formed to include the optical anisotropic material, the scattering property in the oblique direction is suppressed to reduce leak light from the light guide plate in a dark state. Therefore, since light is guided from a part in a partially-dark state to a part in a partially-bright state, partial luminance enhancement is achievable without increasing electric power supplied to the illumination unit 1.

Moreover, in this embodiment, in a case where liquid crystal molecules included in the liquid crystal region 34B in a state in which a pretilt angle is provided to the liquid crystal molecules are aligned in a region where a voltage is not applied, the liquid crystal material included in the liquid crystal regions 34B does not rise in random directions, but rises in a plane parallel to the light incident surface 10A under voltage application. At this time, the optical axes AX1 and AX2 of the polymer region 34A and the liquid crystal region 34B intersect with or are orthogonal to each other in a plane parallel to the light incident surface 10A. Therefore, in a region where a voltage is applied, a refractive index difference in all directions including the front direction (the direction of the normal to the light modulation device 30) and oblique directions is increased to obtain a high scattering property. As a result, display luminance is improvable. Moreover, the display luminance is further improvable by the above-described partial luminance enhancement effect.

Therefore, in this embodiment, while leakage of light in a range having a large view angle is allowed to be reduced or almost eliminated, display luminance is improvable. As a result, the modulation ratio in the front direction is allowed to be increased.

In the above-described horizontal alignment type PDLC, an interface between the polymer material and the liquid crystal material is formed densely in the minor-axis direction of the streaky structure and is formed coarsely in the major-axis direction of the streaky structure. Therefore, in a case where the streaky structure extends in a direction parallel to the linear light source, light propagating through the PDLC in the minor-axis direction of the above-described streaky structure enters the interface in periods of the average streaky texture size in the minor-axis direction of the streaky structure, and as a result, light is largely scattered. On the other hand, light propagating through the PDLC in the major-axis direction of the above-described streaky structure does not enter the interface so often; therefore, the light is not scattered much.

Moreover, light propagating through the PDLC in the minor-axis direction of the streaky structure and a direction perpendicular to the light incident surface propagates in periods of the average streaky texture size in the minor-axis direction of the streaky structure while being influenced by a difference between the extraordinary light refractive index of the liquid crystal material and the ordinary light refractive index of the polymer material and a difference between the ordinary light refractive index of the liquid crystal material and the extraordinary light refractive index of the polymer material. On the other hand, light propagating through the PDLC in the major-axis direction of the above-described streaky structure or a thickness direction of the PDLC propagates while being influenced by a difference between the extraordinary light refractive index of the liquid crystal material and the ordinary light refractive index of the polymer material or a difference between the ordinary light refractive index of the liquid crystal material and the extraordinary light refractive index of the polymer material. Therefore, while light propagating through the PDLC in the minor-axis direction of the streaky structure and the direction perpendicular to the light incident surface is largely scattered, light propagating through the PDLC in the major-axis direction of the above-described streaky structure or the thickness direction of the PDLC is not scattered much.

Thus, in the horizontal alignment type PDLC, light propagating in the minor-axis direction of the streaky structure and the direction perpendicular to the light incident surface, and light propagating in the minor-axis direction of the streaky structure and the thickness direction of the PDLC and light propagating in a direction parallel to the major-axis direction of the streaky structure have anisotropy in scattering, because of the above-described two factors. As a result, light propagating in the thickness direction of the PDLC is preferentially scattered in a direction where light guide conditions are disrupted, and light extraction efficiency is increased; therefore, high luminance and high contrast are obtained.

However, in a case where the horizontal alignment type PDLC is applied to an edge light system backlight, since light propagating in the X direction and light propagating in the Y direction have anisotropy in scattering, a luminance distribution easily becomes nonuniform. In particular, when an arrangement pitch of respective point-like light sources in the linear light source is large, light and dark stripes are formed in proximity to the linear light source.

On the other hand, in this embodiment, the magnitude (A1/C1) of scattering anisotropy in the close region 30a closer to the light source 20 of the light modulation layer 34 is smaller than the magnitude (A2/C2) of scattering anisotropy in the far region 30b farther from the light source 20 of the light modulation layer 34. Accordingly, anisotropic scattering of light propagating through the light modulation layer 34 is allowed to be reduced in proximity to the light source 20. Light and dark stripes caused by arrangement of the light source 20 are formed due to a large difference between the first scattering and the third scattering. Therefore, when the above-described anisotropic scattering is reduced in proximity to the light source 20, contrast of light and dark stripes caused by the arrangement of the light source 20 is allowed to be reduced. Moreover, in this embodiment, the above-described anisotropic scattering is reduced only in a region closer to the light source 20 of the light modulation layer 34; therefore, compared to a case where the above-described anisotropic scattering is reduced in the entire light modulation layer 34, high luminance is allowed to be obtained. Further, in this embodiment, since the second scattering is stronger than the third scattering, light from the light source 20 is preferentially scattered in a direction where light guide conditions are disrupted, and light extraction efficiency is increased. Thus, in this embodiment, while high luminance is maintained, contrast of light and dark stripes caused by the arrangement of the light source 20 is allowed to be reduced.

Moreover, in this embodiment, since the alignment directions of the alignment films 33 and 35 are equal to each other, compared to other illumination units which will be described later, light having more polarization components is allowed to be output. Therefore, for example, in a case where the illumination unit 1 is used as a backlight of a display panel, when the illumination unit 1 is so disposed as to allow the alignment directions of the alignment films 33 and 35 and a transmission axis of a polarizing plate located closer to the illumination unit 1 of the display panel to be parallel to each other, use efficiency, in the display panel, of light output from the illumination unit 1 is allowed to be increased.

2. Second Embodiment

Figure 19:
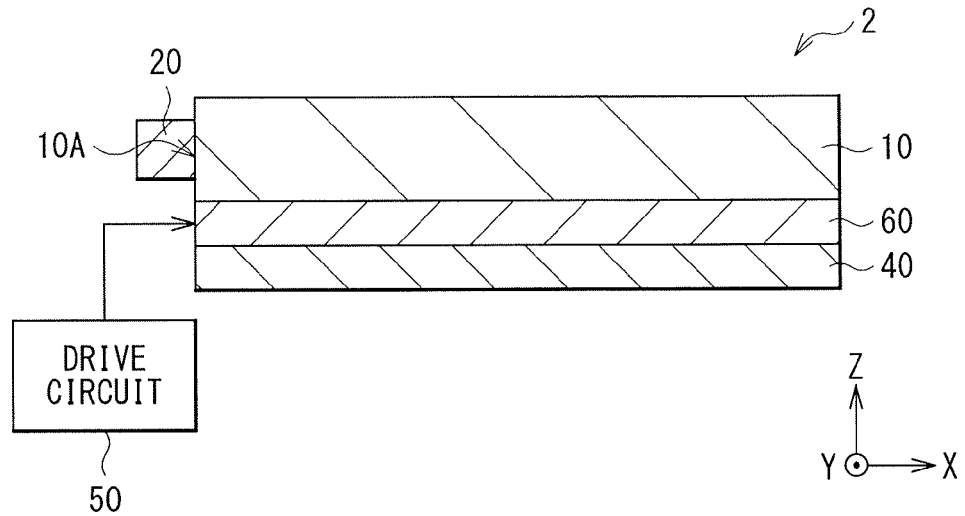
FIG. 19 is a diagram illustrating an example of a schematic configuration of an illumination unit according to a second embodiment of the present technology.

Next, an illumination unit 2 according to a second embodiment of the present technology will be described below. The illumination unit 2 according to this embodiment is different from the configuration of the illumination unit 1 according to the above-described embodiment in that, as illustrated in FIG. 19, a light modulation device 60 is provided instead of the light modulation device 30. Therefore, description will be given of, mainly, points different from the configuration of the above-described embodiment, and points common to the configuration of the above-described embodiment will not be further described as appropriate.

Figure 20:
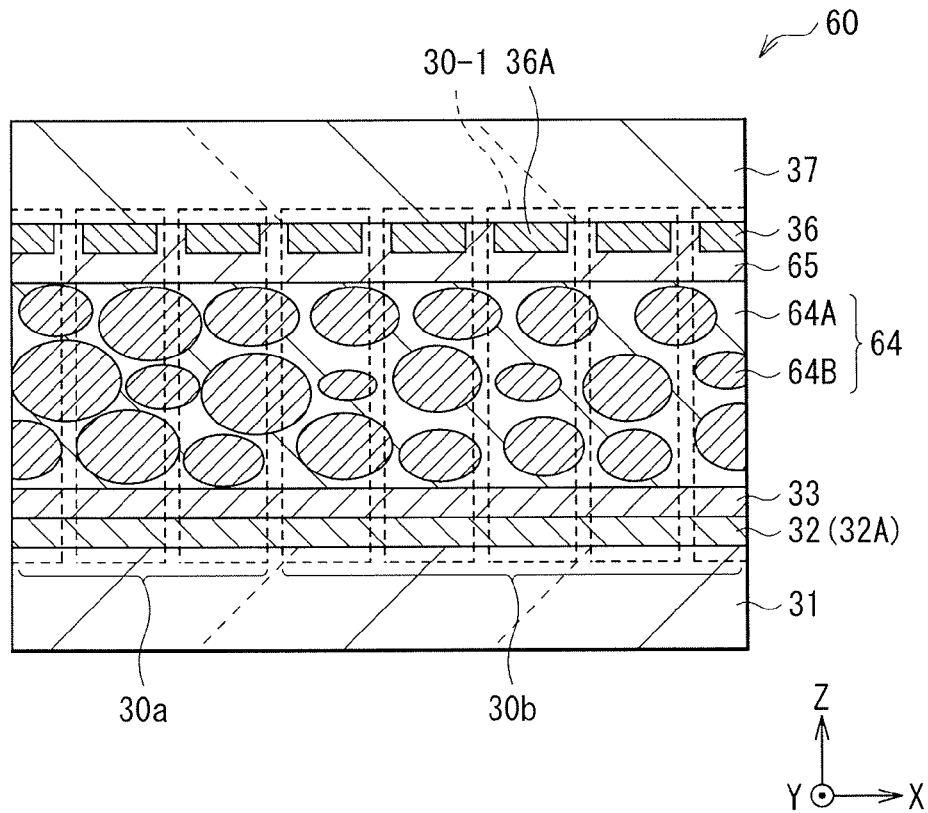
FIG. 20 is a diagram illustrating an example of a sectional configuration in an XZ plane of a light modulation device in FIG. 19.

FIG. 20 illustrates an example of a sectional configuration of the light modulation device 60. In the light modulation device 60, for example, the transparent substrate 31, the lower electrode 32, the alignment film 33, a light modulation layer 64, an alignment film 65, the upper electrode 36, and the transparent substrate 37 are arranged in order from the reflective plate 40.

The alignment films 33 and 65 are so disposed as to sandwich the light modulation layer 64 therebetween. The alignment films 33 and 65 align, for example, a liquid crystal or a low-molecular monomer used in the light modulation layer 64. The alignment films 33 and 65 are formed to satisfy the following two expressions (A>B>C and A1/C1<A2/C2) when the light modulation layer 64 exhibits a scattering property. As with the above-described embodiment, the alignment film 33 is a horizontal alignment film, and has an alignment direction in a direction parallel or substantially parallel to the light incident surface 10A. In a case where the horizontal alignment film used for the alignment film 33 is formed with use of a rubbing process, the rubbing direction of the alignment film 33 is oriented in a direction parallel to the light incident surface 10A.

Figure 21:
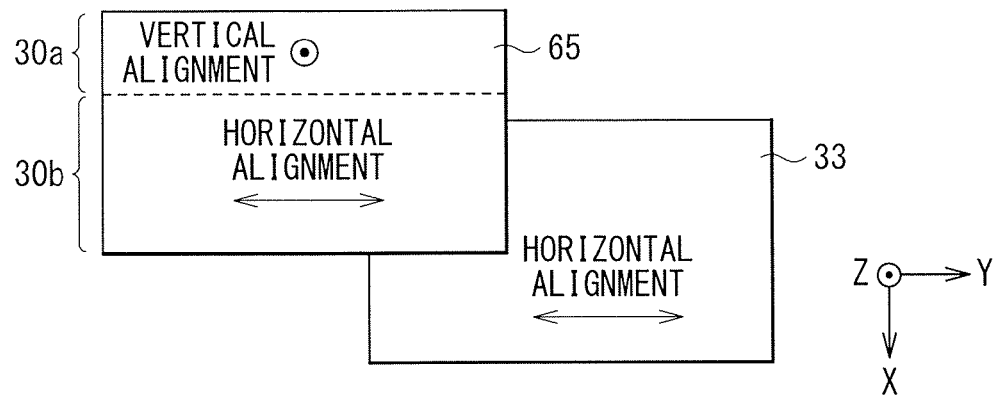
FIG. 21 is a plan view illustrating an example of alignment directions of alignment films in FIG. 20.
Figure 22:
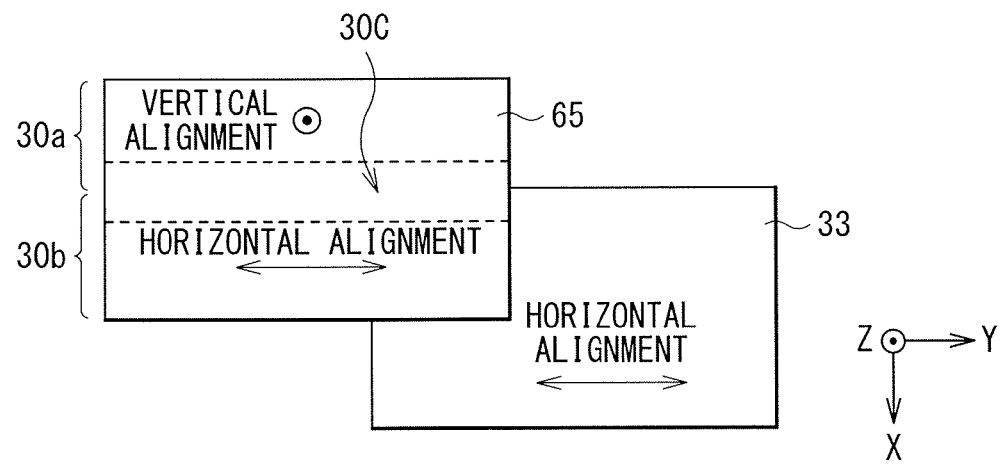
FIG. 22 is a plan view illustrating another example of the alignment directions of the alignment films in FIG. 20.

On the other hand, the alignment film 65 is a composite film configured of a horizontal alignment film and a vertical alignment film. For example, as illustrated in FIG. 21, in the alignment film 65, the close region 30a is configured of a vertical alignment film, and the far region 30b is configured of the same horizontal alignment film as the alignment film 33. It is to be noted that, for example, as illustrated in FIG. 22, the alignment film 65 may have, around a boundary between the close region 30a and the far region 30b, a transition region 30C of which an alignment property is gradually changed from an alignment property of the horizontal alignment film to an alignment property of the vertical alignment film with an increasing distance from the light source 20.

A part of the light modulation layer 64 or the entire light modulation layer 64 exhibits a scattering property or transparency with respect to light from the light source 20, depending on magnitude of an electric field. The light modulation layer 64 exhibits transparency with respect to light from the light source 20, for example, under no voltage application. Moreover, the light modulation layer 64 exhibits the scattering property with respect to light from the light source 20, for example, under voltage application. For example, as illustrated in FIG. 20, the light modulation layer 64 is a composite layer including a polymer region 64A and a plurality of liquid crystal regions 64B dispersed in the polymer region 64A. The polymer region 64A and the liquid crystal regions 64B have shape anisotropy, and further have optical anisotropy. It is to be noted that the liquid crystal region 64B corresponds to a specific example of "first region" in the present technology, and the polymer region 64A corresponds to a specific example of "second region" in the present technology.

(Shape Anisotropy)

Figure 23:
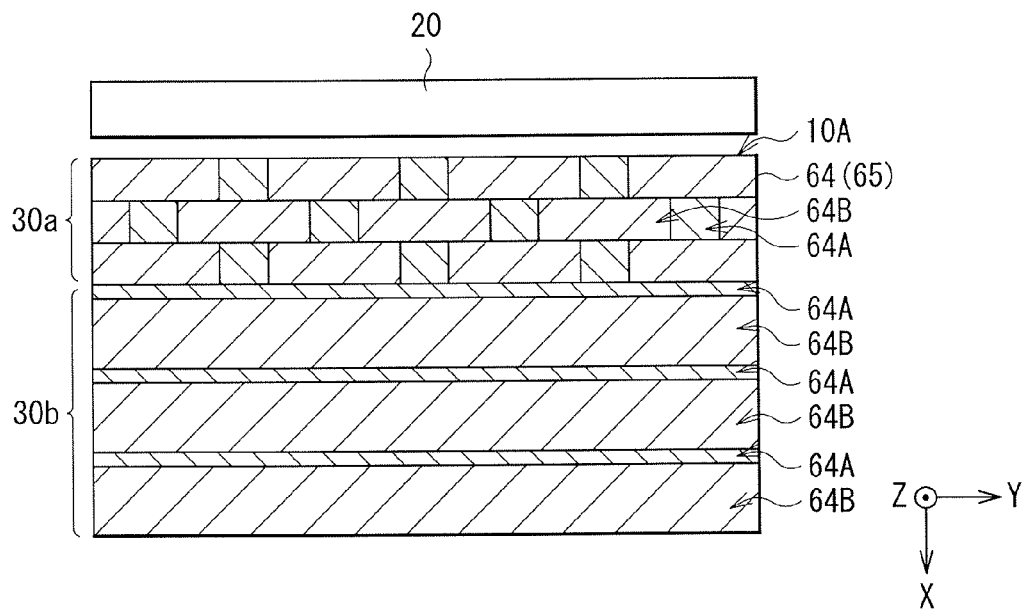
FIG. 23 is a diagram illustrating an example of a sectional configuration in an XY plane of a light modulation layer in FIG. 20.
Figure 24:
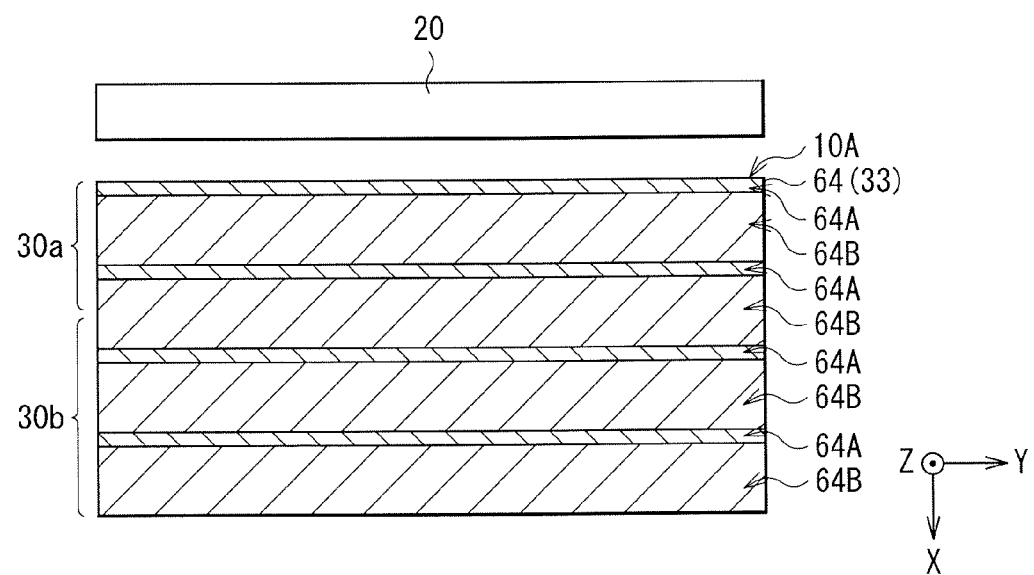
FIG. 24 is a diagram illustrating another example of the sectional configuration in the XY plane of the light modulation layer in FIG. 20.

FIG. 23 illustrates an example of a sectional configuration in an XY plane in proximity to the alignment film 65 of the light modulation layer 64. FIG. 24 illustrates an example of a sectional configuration in an XY plane in proximity to the alignment film 33 of the light modulation layer 64.

The polymer region 64A and the liquid crystal regions 64B both extend in a direction intersecting with the surface of the transparent substrate 31 in a region in proximity to the alignment film 65 of the close region 30a. For example, as illustrated in FIG. 23, the liquid crystal regions 64B are dotted over the polymer region 64A in the region in proximity to the alignment film 65 of the close region 30a when viewed from the direction of the normal to the transparent substrate 31. The polymer region 64A and the liquid crystal regions 64B both extend in a direction parallel or substantially parallel to the light incident surface 10A and parallel or substantially parallel to the surface of the transparent substrate 31 in a region in proximity to the alignment film 33 of the close region 30a. In other words, the polymer region 64A and the liquid crystal regions 64B both extend in a direction parallel or substantially parallel to the linear light source in the region in proximity to the alignment film 33 of the close region 30a. Moreover, the polymer region 64A and the liquid crystal regions 64B both extend in a direction parallel or substantially parallel to the light incident surface 10A and parallel or substantially parallel to the surface of the transparent substrate 31 in the far region 30b. In other words, the polymer region 64A and the liquid crystal regions 64B both extend in a direction parallel or substantially parallel to the linear light source in the far region 30b.

The polymer region 64A and the liquid crystal regions 64B both may continuously or intermittently extend from one end to the other end of the light modulation layer 60, for example, in the close region 30a. The polymer region 64A and the liquid crystal regions 64B both may continuously or intermittently extend from one end to the other end of the light modulation layer 60, for example, in the far region 30b. The polymer region 64A and the liquid crystal regions 64B may be alternately arranged in a direction orthogonal to the light incident surface 10A, for example, in the region in proximity to the alignment film 33 of the close region 30a. The polymer region 64A and the liquid crystal regions 64B may be alternately arranged in a direction orthogonal to the light incident surface 10A, for example, in the far region 30b.

Figure 25A:
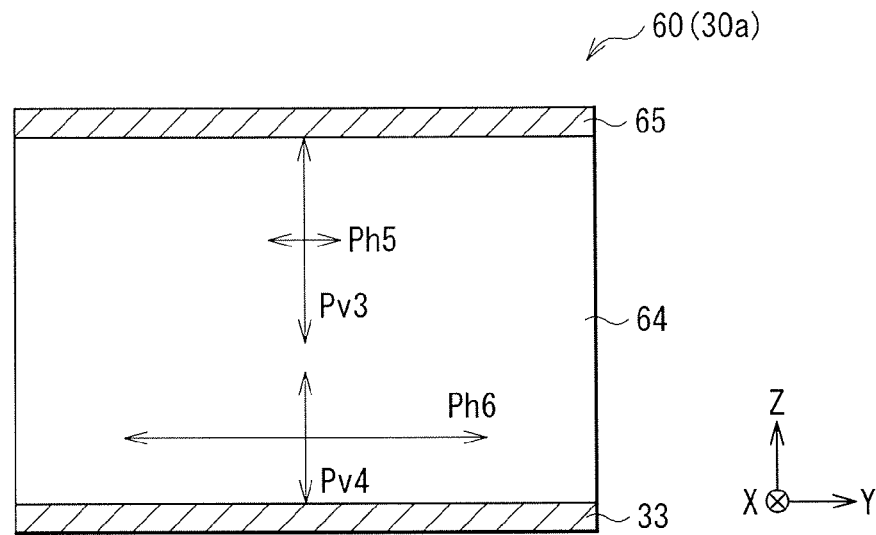
FIG. 25A is a diagram illustrating an example of structural periods in a close region of the light modulation layer in FIG. 20.
Figure 25B:
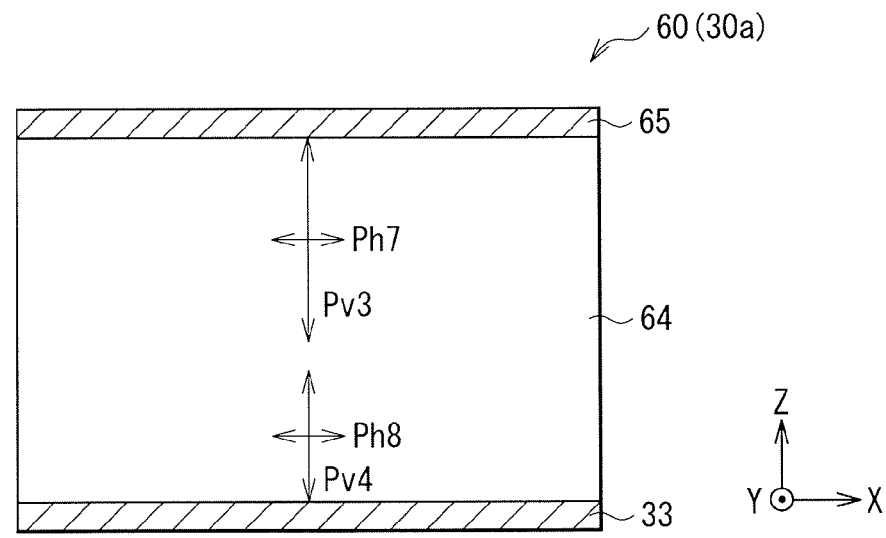
FIG. 25B is a diagram illustrating another example of the structural periods in the close region of the light modulation layer in FIG. 20.
Figure 26A:
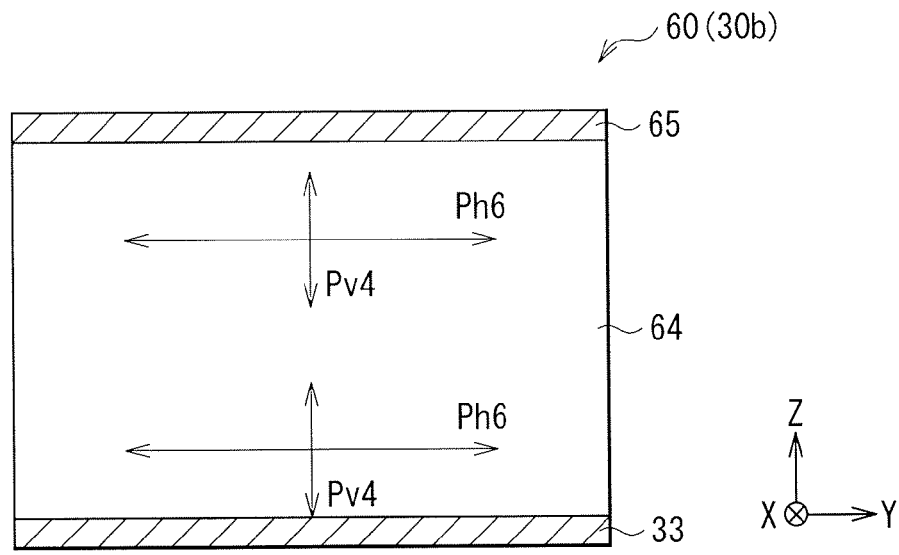
FIG. 26A is a diagram illustrating an example of structural periods in a far region of the light modulation layer in FIG. 20.
Figure 26B:
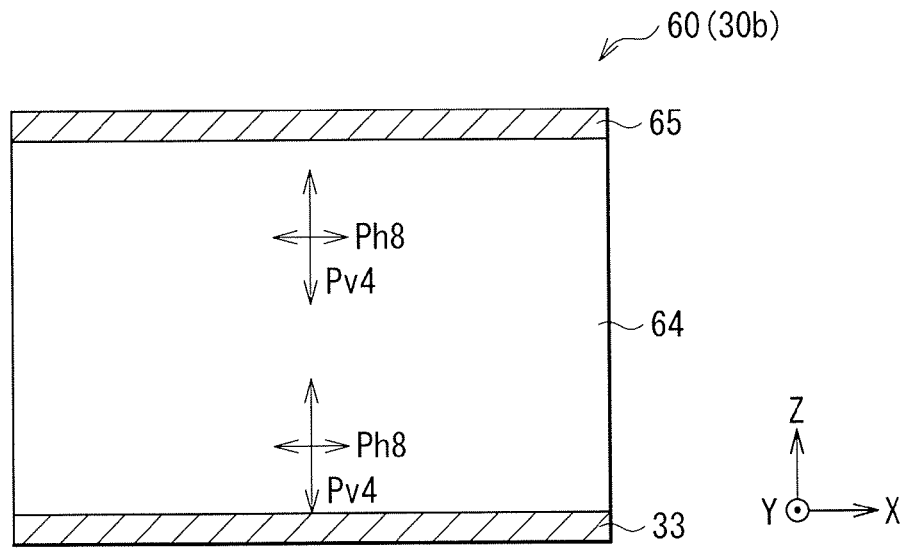
FIG. 26B is a diagram illustrating another example of the structural periods in the far region of the light modulation layer in FIG. 20.

FIGS. 25A and 25B illustrate structural periods in the X-axis direction, the Y-axis direction, and the Z-axis direction in the close region 30a of the light modulation layer 64. FIGS. 26A and 26B illustrate structural periods in the X-axis direction, the Y-axis direction, and the Z-axis direction in the far region 30b of the light modulation layer 64. For example, as illustrated in FIGS. 25A and 25B, the light modulation layer 64 has a regular structure with a period Ph7 in the X-axis direction, a period Ph5 in the Y-axis direction, and a period Pv3 in the Z-axis direction in the region in proximity to the alignment film 65 of the close region 30a. Moreover, for example, as illustrated in FIGS. 25A and 25B, the light modulation layer 64 has a regular structure with a period Ph8 in the X-axis direction, a period Ph6 in the Y-axis direction, and a period Pv4 in the Z-axis direction in the region in proximity to the alignment film 33 of the close region 30a.

In the region in proximity to the alignment film 65 of the close region 30a, the polymer region 64A is formed of a polymer material obtained by polymerizing the above-described low-molecular monomer in a state where the low-molecular monomer is aligned by a function of the alignment film 63. Therefore, in the region in proximity to the alignment film 65 of the close region 30a, interfaces between the polymer region 64A and the liquid crystal regions 64B are formed densely in a direction orthogonal to the alignment direction of the alignment film 65, and are formed coarsely in the alignment direction of the alignment film 65.

In the region in proximity to the alignment film 33 of the close region 30a, the polymer region 64A is configured of a polymer material obtained by polymerizing the above-described low-molecular monomer in a state where the low-molecular monomer is aligned by a function of the alignment film 33. Therefore, in the region in proximity to the alignment film 33 of the close region 30a, interfaces between the polymer region 64A and the liquid crystal regions 64B are formed densely in a direction orthogonal to the alignment direction of the alignment film 33, and are formed coarsely in the alignment direction of the alignment film 33.

In the far region 30b, the polymer region 64A is configured of a polymer material obtained by polymerizing the above-described low-molecular monomer in a state where the low-molecular monomer is aligned by the functions of the alignment films 33 and 63. Therefore, in the far region 30b, interfaces between the polymer region 64A and the liquid crystal regions 64B are formed densely in a direction orthogonal to the alignment directions of the alignment films 33 and 63, and are formed coarsely in the alignment directions of the alignment films 33 and 63.

Figure 27:
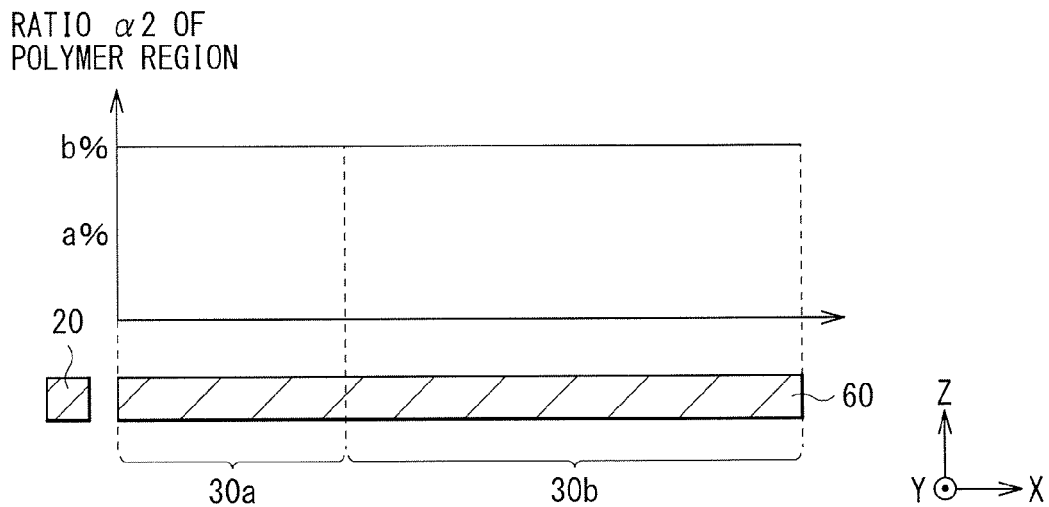
FIG. 27 is a diagram illustrating an example of a ratio of a polymer region in the light modulation layer in FIG. 20.

As illustrated in FIG. 27, a ratio α2 of the polymer region 64A in the light modulation layer 64 is fixed (uniform) or substantially fixed (substantially uniform) irrespective of a distance from the light source 20. The ratio α2 may be, for example, within a range from 50 wt % to 98 wt %, preferably within a range from 75 wt % to 95 wt %, and more preferably within a range of 85 to 92. The ratio α2 is adjustable by, for example, a weight ratio of a low-molecular monomer used as one of materials of the light modulation layer 64, intensity or a total dose of ultraviolet light applied to the low-molecular monomer, and/or the like.

The polymer region 64A and the liquid crystal regions 64B have different response speeds with respect to an electric field. The polymer region 64A has relatively low responsivity with respect to the electric field, and the liquid crystal regions 64B have relatively high responsivity with respect to the electric field. The polymer region 64A is configured to include a polymer material. The polymer region 64A has, for example, a streaky structure or a porous structure which does not respond to an electric field, or a rod-like structure having a response speed slower than that of the liquid crystal region 64B. The polymer region 64A is formed of, for example, a polymer material obtained by polymerizing a low-molecular monomer. The polymer region 64A is formed, for example, by polymerizing, by one or both of heat and light, a low-molecular monomer with orientation and polymerizability which is aligned along the alignment direction of the liquid crystal region 64 or the alignment directions of the alignment films 33 and 65.

The liquid crystal regions 64B are configured to include a liquid crystal material, and have a response speed sufficiently higher than that of the polymer region 64A. Examples of the liquid crystal material (liquid crystal molecules) included in the liquid crystal regions 64B include rod-like molecules. As liquid crystal molecules included in the liquid crystal regions 64B, liquid crystal molecules having positive dielectric constant anisotropy (a so-called positive type liquid crystal) may be preferably used.

(Optical Anisotropy)

Figure 28:
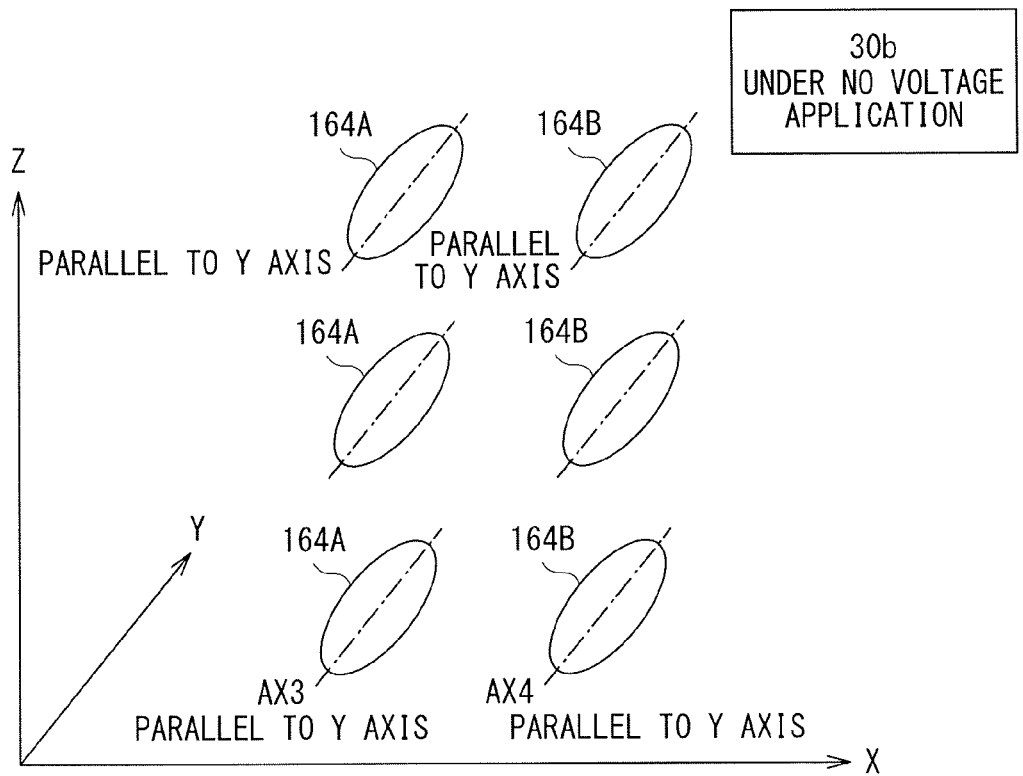
FIG. 28 is a diagram schematically illustrating an example of a function in a far region of the light modulation device in FIG. 19.

FIG. 28 schematically illustrates an example of an alignment state in the polymer region 64A and the liquid crystal regions 64B in the far region 30b under no voltage application. An ellipsoid 164A in FIG. 28 is an example of a refractive index ellipsoid exhibiting refractive index anisotropy of the polymer region 64A in the far region 30b under no voltage application. An ellipsoid 164B in FIG. 28 is an example of a refractive index ellipsoid exhibiting refractive index anisotropy of the liquid crystal region 64B in the far region 30b under no voltage application.

Figure 29:
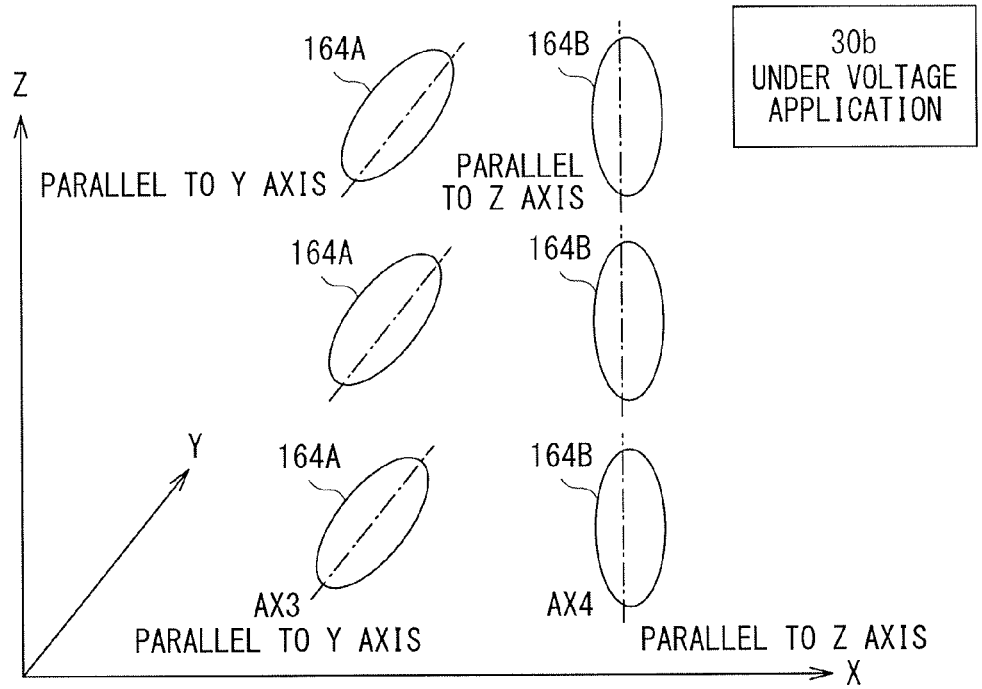
FIG. 29 is a diagram schematically illustrating another example of the function in the far region of the light modulation device in FIG. 19.

FIG. 29 schematically illustrates an example of an alignment state in the polymer region 64A and the liquid crystal regions 64B in the far region 30b under voltage application. The ellipsoid 164A in FIG. 29 is an example of a refractive index ellipsoid exhibiting refractive index anisotropy of the polymer region 64A in the far region 30b under voltage application. The ellipsoid 164B in FIG. 29 is an example of a refractive index ellipsoid exhibiting refractive index anisotropy of the liquid crystal region 64B in the far region 30b under voltage application.

Figure 30:
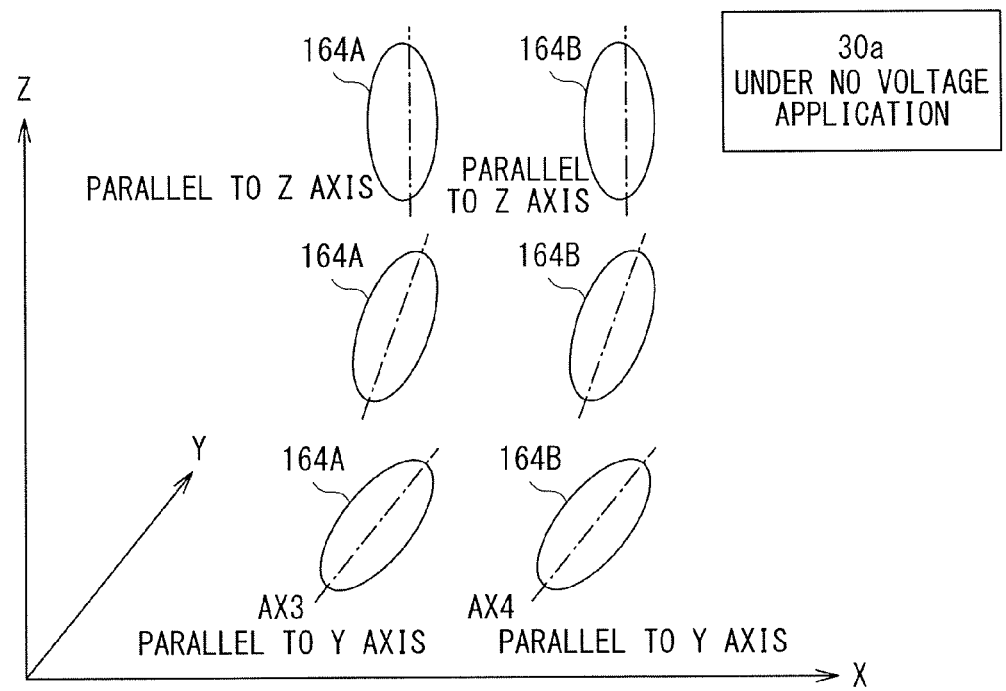
FIG. 30 is a diagram schematically illustrating an example of a function in a close region of the light modulation device in FIG. 19.

FIG. 30 schematically illustrates an example of an alignment state in the polymer region 64A and the liquid crystal regions 64B in the close region 30a under no voltage application. The ellipsoid 164A in FIG. 30 is an example of a refractive index ellipsoid exhibiting refractive index anisotropy of the polymer region 64A in the close region 30a under no voltage application. The ellipsoid 164B in FIG. 30 is an example of a refractive index ellipsoid exhibiting refractive index anisotropy of the liquid crystal region 64B in the close region 30a under no voltage application.

Figure 31:
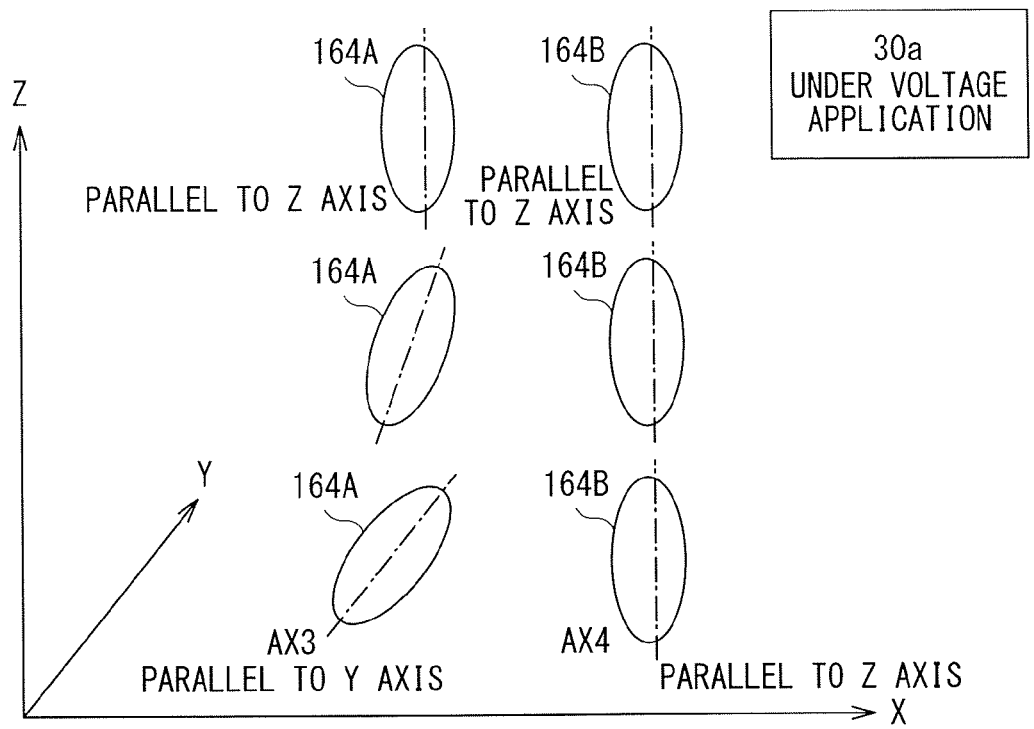
FIG. 31 is a diagram schematically illustrating another example of the function in the close region of the light modulation device in FIG. 19.

FIG. 31 schematically illustrates an example of an alignment state in the polymer region 64A and the liquid crystal regions 64B in the close region 30a under voltage application. The ellipsoid 164A in FIG. 31 is an example of a refractive index ellipsoid exhibiting refractive index anisotropy of the polymer region 64A in the close region 30a under voltage application. The ellipsoid 164B in FIG. 31 is an example of a refractive index ellipsoid exhibiting refractive index anisotropy of the liquid crystal region 64B in the close region 30a under voltage application.

For example, as illustrated in FIG. 28, the polymer region 64A and the liquid crystal region 64B are structured to allow the direction of an optical axis AX3 of the polymer region 64A (more specifically, a major axis of the ellipsoid 164A) and the direction of an optical axis AX4 of the liquid crystal region 64B (more specifically, a major axis of the ellipsoid 164B) in the far region 30b to coincide with (be parallel to) each other under no voltage application. It is to be noted that the optical axes AX3 and AX4 each indicate a line parallel to a travel direction of a light beam allowing a refractive index to have one value irrespective of polarization direction. Moreover, it is not necessary for the directions of the optical axis AX3 and the optical axis AX4 to consistently coincide with each other under no voltage application, and the directions of the optical axis AX3 and the optical axis AX4 may be slightly deviated from each other due to, for example, a manufacturing error.

In the liquid crystal region 64B, the optical axis AX4 is parallel or substantially parallel to the light incident surface 10A and parallel or substantially parallel to the surface of the transparent substrate 31 in the far region 30b under no voltage application. In a case where the alignment films 33 and 65 have a pretilt function, the optical axis AX4 is parallel or substantially parallel to the light incident surface 10A, and intersects with the surface of the transparent substrate 31 at a predetermined pretilt angle in the far region 30b under no voltage application.

On the other hand, in the polymer region 64A, the optical axis AX3 is fixed irrespective of whether or not a voltage is applied. More specifically, the optical axis AX3 is parallel or substantially parallel to the light incident surface 10A and parallel or substantially parallel to the surface of the transparent substrate 31 in the far region 30b. In other words, the optical axis AX3 is parallel or substantially parallel to the optical axis AX4 in the far region 30b under no voltage application. In a case where the alignment films 33 and 65 have a pretilt function, the optical axis AX3 is parallel or substantially parallel to the light incident surface 10A, and intersects with the surface of the transparent substrate 31 at a predetermined pretilt angle. In other words, also in this case, the optical axis AX3 is parallel or substantially parallel to the optical axis AX4 under no voltage application.

Ordinary refractive indices of the polymer region 64A and the liquid crystal region 64B may be preferably equal to each other, and extraordinary refractive indices of the polymer region 64A and the liquid crystal region 64B may be preferably equal to each other. In this case, for example, under no voltage application, there is little difference in refractive index in all directions, and high transparency is obtained. Therefore, for example, light from the light source 20 passes through the light modulation layer 64 without being scattered in the light modulation layer 64. As a result, for example, light from the light source 20 (light from an oblique direction) is totally reflected by an interface of a region (transparent region 30A) that is transparent of the light modulation device 60, and luminance (luminance in black display) in the transparent region 30A is decreased, compared to a case where luminance is uniformized.

Moreover, for example, as illustrated in FIG. 29, the polymer region 64A and the liquid crystal regions 64B are structured to allow directions of the optical axes AX3 and AX4 to be different from (intersect with or be orthogonal to) each other in the far region 30b under voltage application. In the liquid crystal regions 64B, under voltage application, the optical axis AX4 is parallel or substantially parallel to the light incident surface 10A and parallel or substantially parallel to the normal to the transparent substrate 31 in the far region 30b.

Therefore, under voltage application, in the light modulation layer 64, a difference in refractive index in all directions is increased to obtain a high scattering property. Accordingly, for example, light from the light source 20 is scattered in the light modulation layer 64. As a result, for example, the light from the light source 20 (light from the oblique direction) passes through an interface of a region in a scattering state (scattering region 30B) in the light modulation device 60, and the light having passed toward the reflective plate 40 is reflected by the reflective plate 40 to pass through the light modulation device 60. Therefore, luminance of the scattering region 30B is extremely higher than that in a case where the luminance is uniformized, and luminance in white display is partially increased (partial luminance enhancement) by a reduced amount of the luminance of the transparent region 30A.

It is to be noted that the ordinary refractive indices of the polymer region 64A and the liquid crystal region 64B may be slightly different from each other due to, for example, a manufacturing error, and may be preferably, for example, 0.1 or less, and more preferably 0.05 or less. Moreover, the extraordinary refractive indices of the polymer region 64A and the liquid crystal region 64B may be slightly different from each other due to, for example, a manufacturing error, and may be preferably, for example, 0.1 or less, and more preferably 0.05 or less.

Moreover, a refractive index difference (=extraordinary refractive index-ordinary refractive index) in the polymer region 64A and a refractive index difference (=extraordinary refractive index-ordinary refractive index) in the liquid crystal region 64B may be preferably as large as possible, and may be preferably 0.05 or over, more preferably 0.1 or over, and still more preferably 0.15 or over. It is because, in a case where the refractive index differences in the polymer region 64A and the liquid crystal region 64B are large, the scattering power of the light modulation layer 64 is enhanced to allow light guide conditions to be easily disrupted, thereby allowing light from the light guide plate 10 to be easily extracted.

For example, as illustrated in FIG. 30, the polymer region 64A and the liquid crystal region 64B are structured to allow the direction of the optical axis AX3 of the polymer region 64A and the direction of the optical axis AX4 of the liquid crystal region 64B in the close region 30a to coincide with (be parallel to) each other under no voltage application. It is to be noted that it is not necessary for the directions of the optical axis AX3 and the optical axis AX4 to consistently coincide with each other under no voltage application, and the directions of the optical axis AX3 and the optical axis AX4 may be slightly deviated from each other due to, for example, a manufacturing error.

In the liquid crystal region 64B in the close region 30a, under no voltage application, the direction of the optical axis AX4 varies from the alignment film 33 side to the alignment film 65 side in a direction where the direction of the optical axis AX4 rises. More specifically, in a region located closer to the alignment film 33, the optical axis AX4 is parallel or substantially parallel to the light incident surface 10A and parallel or substantially parallel to the surface of the transparent substrate 31. In a case where the alignment film 33 has a pretilt function, in the region located closer to the alignment film 33, the optical axis AX4 is parallel or substantially parallel to the light incident surface 10A, and intersects with the surface of the transparent substrate 31 at a predetermined pretilt angle under no voltage application. In other words, under no voltage application, the optical axis AX4 is parallel or substantially parallel to the linear light source in the region located closer to the alignment film 33. Moreover, in a region located closer to the alignment film 65, the optical axis AX4 is parallel or substantially parallel to the normal to the transparent substrate 31 under no voltage application. In a case where the alignment film 65 has a pretilt function, in the region located closer to the alignment film 65, the optical axis AX4 is parallel or substantially parallel to the light incident surface 10A, and intersects with the normal to the transparent substrate 31 at a predetermined pretilt angle. In other words, under no voltage application, the optical axis AX4 is orthogonal or substantially orthogonal to the linear light source in the region located closer to the alignment film 65.

In the polymer region 64A in the close region 30a, the direction of the optical axis AX3 varies from the alignment film 33 side to the alignment film 65 side in a direction where the direction of the optical axis AX3 rises, irrespective of whether or not a voltage is applied. More specifically, in the region located closer to the alignment film 33, the optical axis AX3 is parallel or substantially parallel to the light incident surface 10A and parallel or substantially parallel to the surface of the transparent substrate 31. In other words, under no voltage application, in the region located closer to the alignment film 33, the optical axis AX3 is parallel or substantially parallel to the linear light source and parallel or substantially parallel to the optical axis AX4. In a case where the alignment film 33 has a pretilt function, the optical axis AX3 is parallel or substantially parallel to the light incident surface 10A, and intersects with the surface of the transparent substrate 31 at a predetermined pretilt angle. In other words, also in this case, under no voltage application, the optical axis AX3 is parallel or substantially parallel to the optical axis AX4 in the region located closer to the alignment film 33. Moreover, the optical axis AX3 is parallel or substantially parallel to the normal to the transparent substrate 31 in the region located closer to the alignment film 65. In other words, under no voltage application, in the region located closer to the alignment film 65, the optical axis AX3 is parallel or substantially parallel to the normal to the transparent substrate 31 and parallel or substantially parallel to the optical axis AX4. In a case where the alignment film 65 has a pretilt function, in the region located closer to the alignment film 65, the optical axis AX3 is parallel or substantially parallel to the light incident surface 10A, and intersects with the normal to the transparent substrate 31 at a predetermined pretilt angle. In other words, also in this case, under no voltage application, the optical axis AX3 is parallel or substantially parallel to the optical axis AX4 in the region located closer to the alignment film 65.

Moreover, in the polymer region 64A and the liquid crystal regions 64B, for example, as illustrated in FIG. 31, under voltage application, the directions of the optical axis AX3 and the optical axis AX4 are different from (orthogonal or substantially orthogonal to) each other in a region located closer to the alignment film 33 of the close region 30a. In the liquid crystal regions 64B, under voltage application, the optical axis AX4 is parallel or substantially parallel to the light incident surface 10A and parallel or substantially parallel to the normal to the transparent substrate 31 in the close region 30a.

Therefore, under voltage application, in a region located closer to the alignment film 33 of the light modulation layer 64, a difference in refractive index in all directions is increased to obtain a high scattering property. Accordingly, for example, light from the light source 20 is scattered in the region located closer to the alignment film 33 of the light modulation layer 64. As a result, for example, the light from the light source 20 (light from the oblique direction) passes through an interface of a region in a scattering state (scattering region 30B) in the light modulation device 60, and the light having passed toward the reflective plate 40 is reflected by the reflective plate 40 to pass through the light modulation device 60. Therefore, luminance of the scattering region 30B is extremely higher than that in a case where the luminance is uniformized, and luminance in white display is partially increased (partial luminance enhancement) by a reduced amount of the luminance of the transparent region 30A. However, under voltage application, in a region located closer to the alignment film 65 of the light modulation layer 64, there is little difference in refractive index in all directions, and high transparency is obtained. Therefore, under voltage application, the region located closer to the alignment film 65 of the light modulation layer 64 does not contribute to scattering of light from the light source 20.

(Anisotropic Scattering)

Next, anisotropic scattering in this embodiment will be described below. In this embodiment, anisotropic scattering is caused by (a) nonuniformity of existence probability of interfaces (scattering interfaces) between the polymer region 64A and the liquid crystal regions 64B in the scattering region 30B, and (b) birefringence in the scattering region 30B. Therefore, nonuniformity of existence probability of the scattering interfaces in the scattering region 30B, and birefringence in the scattering region 30B will be described in detail below.

—Nonuniformity of Existence Probability of Scattering Interfaces—

In the scattering region 30B in the far region 30b, the interfaces between the polymer region 64A and the liquid crystal regions 64B are disposed densely in a direction orthogonal to the alignment direction of the alignment film 33, and are disposed coarsely in a direction parallel to the alignment direction of the alignment film 33. In a region located closer to the alignment film 33 of the scattering region 30B in the close region 30a, the interfaces between the polymer region 64A and the liquid crystal regions 64B are disposed densely in a direction orthogonal to the alignment direction of the alignment film 33, and are disposed coarsely in a direction parallel to the alignment direction of the alignment film 33. In a region located closer to the alignment film 65 of the scattering region 30B in the close region 30a, the interfaces between the polymer region 64A and the liquid crystal regions 64B are disposed densely in a direction orthogonal to the alignment direction of the close region 30a of the alignment film 65, and are disposed coarsely in a direction parallel to the alignment direction of the close region 30a of the alignment film 65.

The direction orthogonal to the alignment direction of the alignment film 33 indicates the first direction or the second direction. The direction parallel to the alignment direction of the alignment film 33 indicates the third direction. The direction orthogonal to the alignment direction of the close region 30a of the alignment film 65 indicates a direction parallel to the surface of the transparent substrate 31. The direction parallel to the alignment direction of the close region 30a of the alignment film 65 indicates the second direction.

In a region located closer to the alignment film 33 of the close region 30a, and the far region 30b, light propagating through the scattering region 30B in the first direction enters an interface in periods of an average streaky texture size in the minor-axis direction of a streaky structure in the polymer region 34A. Likewise, in the region located closer to the alignment film 33 of the close region 30a, and the far region 30b, light propagating through the scattering region 30B in the second direction enters an interface in periods of the average streaky texture size in the minor-axis direction of the streaky structure in the polymer region 34A. Therefore, the light propagating through the scattering region 30B in the first direction and the light propagating through the scattering region 30B in the second direction are largely scattered.

In the region located closer to the alignment film 33 of the close region 30a, and the far region 30b, light propagating through the scattering region 30B in the third direction enters an interface in periods of an average streaky texture size in the major-axis direction of the streaky structure in the polymer region 34A. Therefore, in the region located closer to the alignment film 33 of the close region 30a, and the far region 30b, scattering of this light is smaller than scattering of light propagating through the scattering region 30B in the first direction.

—Birefringence—

On the other hand, in the region located closer to the alignment film 33 of the close region 30a, and the far region 30b, light propagating through the scattering region 30B in the first direction propagates in periods of the average streaky texture size in the minor-axis direction of the streaky structure in the polymer region 34A while being influenced by a difference between an extraordinary light refractive index of the liquid crystal region 34B and an ordinary light refractive index of the polymer region 34A and a difference between an ordinary light refractive index of the liquid crystal region 34B and an extraordinary light refractive index of the polymer region 34A. Therefore, light propagating through the scattering region 30B in the first direction is largely scattered.

In the region located closer to the alignment film 33 of the close region 30a, and the far region 30b, light propagating in the second direction or the third direction propagates in periods of the average streaky texture size in the minor-axis direction or the major-axis direction of the streaky structure in the polymer region 34A while being influenced by only a difference between the extraordinary light refractive index of the liquid crystal region 34B and the ordinary light refractive index of the polymer region 34A. As a result, in the scattering region 30B, scattering of light propagating through the scattering region 30B in a direction parallel to the light incident surface 10A and parallel to the surface of the transparent substrate 31 is smaller than scattering of light propagating through the scattering region 30B in a direction orthogonal to the light incident surface 10A.

In other words, the light modulation layer 64 is configured to exhibit, in the region located closer to the alignment film 33 of the close region 30a, and the far region 30b, anisotropic scattering in which the first scattering is larger than the third scattering.

As used herein, a magnitude of the first scattering is A, a magnitude of the second scattering is B, and a magnitude of the third scattering is C. A magnitude of the first scattering in the close region 30a is A1, and a magnitude of the third scattering in the close region 30a is C1. A magnitude of the first scattering in the far region 30b is A2, and a magnitude of the third scattering in the far region 30b is C2. At this time, the light modulation layer 64 is configured to satisfy the following expressions when the light modulation layer 64 exhibits the scattering property.

$$A > B > C$$

$$A1/C1 < A2/C2$$

Next, advantages in a case where the light modulation layer 64 exhibits such anisotropic scattering will be described below. A light modulation layer having optical isotropy exhibits an isotropic scattering property. In a case where such a light modulation layer is used instead of the light modulation layer 64 in this embodiment, a large amount of light is scattered also in a direction parallel to a plane of the light guide plate 10, and a probability of changing a light propagating direction until disrupting light guide conditions is reduced. On the other hand, in this embodiment, as can be seen from the above expressions, light incident on the light modulation layer 64 is largely scattered in a direction perpendicular to the top surface of the light guide plate 10; therefore, light is preferentially scattered in a direction where light guide conditions are disrupted. Accordingly, it is considered that, when the light modulation layer 64 exhibits anisotropic scattering, light extraction efficiency from the light guide plate 10 is increased.

To increase a scattering property of guided light, the average streaky texture size in the minor-axis direction in the polymer region 64A may be preferably within a range from 0.1 micrometers to 10 micrometers both inclusive, and more preferably within a range from 0.2 micrometers to 2.0 micrometers both inclusive.

Next, magnitudes of anisotropic scattering in the close region 30a and the far region 30b will be described below.

A magnitude of scattering anisotropy indicates a quotient of three axes, i.e., a magnitude of scattering of light propagating in the first direction (the X-axis direction), a magnitude of scattering of light propagating in the third direction (the Y-axis direction), and a magnitude of scattering of light propagating in the second direction (the Z-axis direction). More specifically, the quotient of three axes indicates a total sum of the following three fractions ((A) to (C)). When the quotient of three axes is large, scattering anisotropy is large, and when the quotient of three axes is small, scattering anisotropy is small. It is to be noted that, in the following fractions (A) to (C), as a precondition, a value of a numerator is larger than a value of a denominator. Therefore, in a case where the value of the numerator is smaller than the value of the denominator, the numerator and denominator may preferably switch places in the following fractions (A) to (C).

(A) (Magnitude of scattering of light propagating in the first direction)/(magnitude of scattering of light propagating in the third direction)

(B) (Magnitude of scattering of light propagating in the second direction)/(magnitude of scattering of light propagating in the third direction)

(C) (Magnitude of scattering of light propagating in the first direction)/(magnitude of scattering of light propagating in the second direction)

The magnitude of scattering anisotropy is determined by (a) nonuniformity of existence probability of the interfaces (scattering interfaces) between the polymer region 34A and the liquid crystal regions 64B in the scattering region 30B, and (b) birefringence in the scattering region 30B. In the magnitude of scattering anisotropy, the above-described factor (a) is dominant. It is because, when existence probability of the scattering interfaces is considered, ideally, a same medium is continued in the third direction; therefore, light is not scattered in the third direction, and is scattered only in the first direction and the second direction. At this time, in a desk plan, scattering in the third direction is zero; therefore, a scattering ratio of the third direction to the first direction and the second direction is infinite. On the other hand, when birefringence is considered, while two polarization components are scattered in the first direction, only one polarization component is scattered in the second direction and the third direction. At this time, a scattering ratio of the first direction to the second direction and the third direction is twice as high at most. Accordingly, in the magnitude of scattering anisotropy, the above-described factor (a) is dominant. Therefore, a relationship between existence probability of the scattering interfaces and the magnitude of scattering anisotropy will be described below, and a relationship between birefringence and the magnitude of scattering anisotropy will not be described.

The magnitude of scattering anisotropy corresponds to a quotient of three axes, i.e., a period in the first direction in the light modulation layer 64, a period in the third direction in the light modulation layer 64, and a period in the second direction in the light modulation layer 64. The quotient of three axes specifically indicates a total sum of the following three fractions ((D) to (F)). It is to be noted that, in the following fractions (D) to (F), as a precondition, a value of a numerator is larger than a value of a denominator. Therefore, in a case where the value of the numerator is smaller than the value of the denominator, the numerator and denominator may preferably switch places in the following fractions (D) to (F).

(D) (Period in the third direction in the light modulation layer 64)/(period in the first direction in the light modulation layer 64)

(E) (Period in the third direction in the light modulation layer 64)/(period in the second direction in the light modulation layer 64)

(F) (Period in the second direction in the light modulation layer 64)/(period in the first direction in the light modulation layer 64)

A magnitude of scattering anisotropy in regions in proximity to the alignment film 33 of the close region 30a and the far region 30b has a value corresponding to Ph6/Ph8+Ph6/Pv4+Pv4/Ph8. Moreover, a magnitude of scattering anisotropy in a region in proximity to the alignment film 65 of the close region 30a has a value corresponding to Ph5/Ph7+Pv3/Ph5+Pv3/Ph7. A magnitude of scattering anisotropy in a region in proximity to the alignment film 65 of the far region 30b has a value corresponding to Ph6/Ph8+Ph6/Pv4+Pv4/Ph8. Herein, respective periods may have, for example, the following relationship.

$$Ph5/Ph7 < Ph6/Ph8$$

$$Pv3/Ph5 < Ph6/Pv4$$

Pv3/Ph7 is nearly equal to Pv4/Ph8.

Therefore, it can be said that, when the light modulation layer 64 exhibits the scattering property, the light modulation layer 64 is configured to satisfy A>B>C and A1/C1<A2/C2.

The magnitudes of scattering anisotropy in the close region 30a and the far region 30b are different from each other, because the directions of the optical axis AX3 of the polymer region 64A in the close region 30a and the far region 30b are changed in a thickness direction of the light modulation layer 64. More specifically, it is because scattering anisotropy in a part of the close region 30a is smaller than scattering anisotropy in the other part in the light modulation layer 64. In this embodiment, as a method of changing the direction of the optical axis AX3 of the polymer region 64A in the thickness direction of the light modulation layer 64, a horizontal alignment film is used as the alignment film 33 located closer to the transparent substrate 31, and a vertical alignment film is used as the alignment film 65 located closer to the transparent substrate 37.

[Effects]

Thus, in this embodiment, the magnitude (A1/C1) of scattering anisotropy in the close region 30a closer to the light source 20 of the light modulation layer 64 is smaller than the magnitude (A2/C2) of scattering anisotropy in the far region 30b farther from the light source 20 of the light modulation layer 64. Accordingly, anisotropic scattering of light propagating through the light modulation layer 64 is allowed to be reduced in proximity to the light source 20. Light and dark stripes caused by arrangement of the light source 20 are formed due to a large difference between the first scattering and the third scattering. Therefore, when the above-described anisotropic scattering is reduced in proximity to the light source 20, contrast of light and dark stripes caused by the arrangement of the light source 20 is allowed to be reduced. Moreover, in this embodiment, the above-described anisotropic scattering is reduced only in a region closer to the light source 20 of the light modulation layer 64; therefore, compared to a case where the above-described anisotropic scattering is reduced in the entire light modulation layer 64, high luminance is allowed to be obtained. Further, in this embodiment, since the second scattering is stronger than the third scattering, light from the light source 20 is preferentially scattered in a direction where light guide conditions are disrupted, and light extraction efficiency is increased. Thus, in this embodiment, while high luminance is maintained, contrast of light and dark stripes caused by the arrangement of the light source 20 is allowed to be reduced.

3. Third Embodiment

Figure 32:
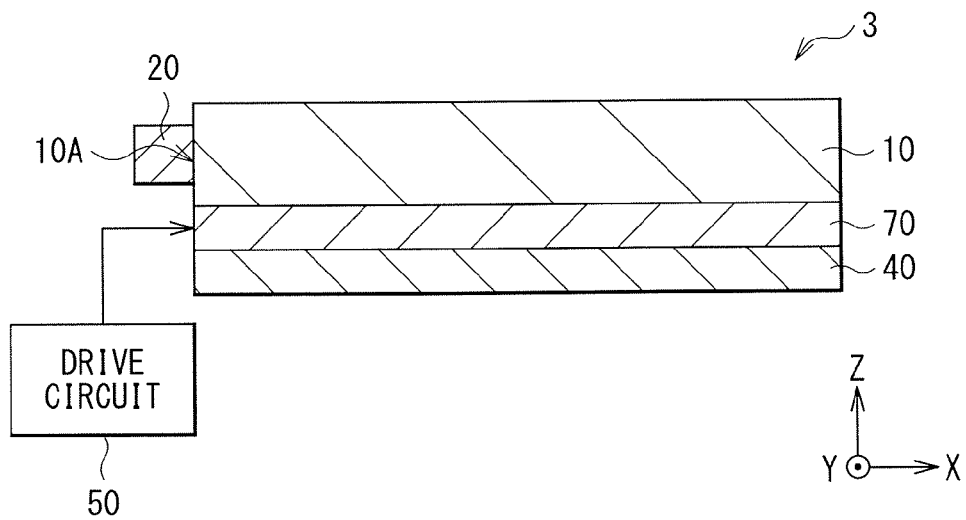
FIG. 32 is a diagram illustrating an example of a schematic configuration of an illumination unit according to a third embodiment of the present technology.

Next, an illumination unit 3 according to a third embodiment of the present technology will be described below. The illumination unit 3 according to this embodiment is different from the configuration of the illumination unit 1 according to the above-described embodiment in that, as illustrated in FIG. 32, a light modulation device 70 is provided instead of the light modulation device 30. Therefore, description will be given of, mainly, points different from the configuration of the above-described respective embodiments, and points common to the configuration of the above-described respective embodiments will not be further described as appropriate.

Figure 33:
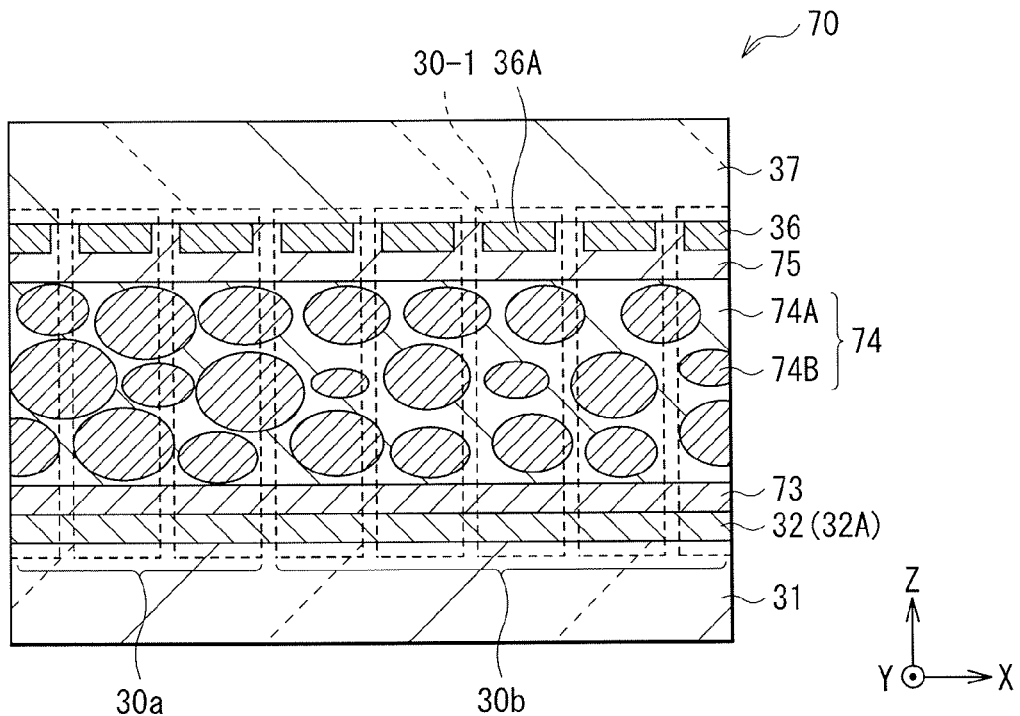
FIG. 33 is a diagram illustrating an example of a sectional configuration in an XZ plane of a light modulation device in FIG. 32.

FIG. 33 illustrates an example of a sectional configuration of the light modulation device 70. In the light modulation device 70, for example, the transparent substrate 31, the lower electrode 32, an alignment film 73, a light modulation layer 74, an alignment film 75, the upper electrode 36, and the transparent substrate 37 are arranged in order from the reflective plate 40.

Figure 34:
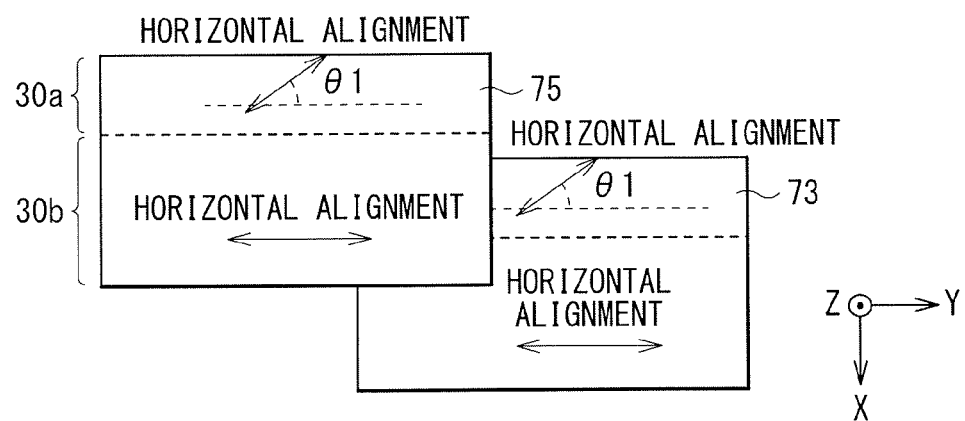
FIG. 34 is a plan view illustrating an example of alignment directions of alignment films in FIG. 33.

The alignment films 73 and 75 are so disposed as to sandwich the light modulation layer 74 therebetween. The alignment films 73 and 75 align, for example, a liquid crystal or a low-molecular monomer used in the light modulation layer 74. The alignment films 73 and 75 are formed to satisfy the following two expressions (A>B>C and A1/C1<A2/C2) when the light modulation layer 74 exhibits a scattering property. Each of the alignment films 73 and 75 is a composite film configured of two kinds of horizontal alignment films with alignment directions different from each other. As illustrated in FIG. 34, in each of the alignment films 73 and 75, the close region 30a is configured of a horizontal alignment film having an alignment direction in a direction intersecting with the light incident surface 10A at an angle θ1, and the far region 30b is configured of a horizontal alignment film having an alignment direction in a direction parallel or substantially parallel to the light incident surface 10A. The alignment directions of the alignment films 73 and 75 are oriented in a direction intersecting with the light incident surface 10A at the angle θ1 in the close region 30a, and are oriented in a direction parallel or substantially parallel to the light incident surface 10A in the far region 30b. In a case where the horizontal alignment films used for the alignment films 73 and 75 are formed with use of a rubbing process, the rubbing directions of the alignment films 73 and 75 are oriented in a direction intersecting with the light incident surface 10A at the angle θ1 in the close region 30a, and are oriented in a direction parallel or substantially parallel to the light incident surface 10A in the far region 30b. In the close region 30a, the angle θ1 of the alignment film 73 and the angle θ1 of the alignment film 75 may be preferably equal to each other in terms of ease of design, but may be different from each other.

Figure 35:
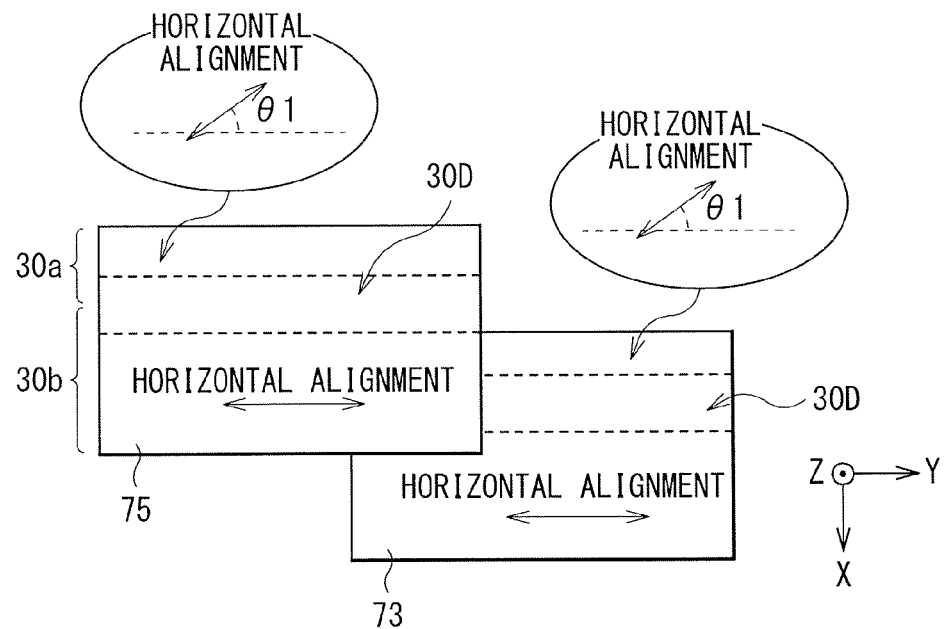
FIG. 35 is a plan view illustrating another example of the alignment directions of the alignment films in FIG. 33.

It is to be noted that, for example, as illustrated in FIG. 35, each of the alignment films 73 and 75 may have, around a boundary between the close region 30a and the far region 30b, a transition region 30D of which the alignment direction is gradually changed to a direction parallel or substantially parallel to the light incident surface 10A with an increasing distance from the light source 20.

A part of the light modulation layer 74 or the entire light modulation layer 74 exhibits a scattering property or transparency with respect to light from the light source 20, depending on magnitude of an electric field. The light modulation layer 74 exhibits transparency with respect to light from the light source 20, for example, under no voltage application. Moreover, the light modulation layer 74 exhibits the scattering property with respect to light from the light source 20, for example, under voltage application. For example, as illustrated in FIG. 33, the light modulation layer 74 is a composite layer including a polymer region 74A and a plurality of liquid crystal regions 74B dispersed in the polymer region 74A. The polymer region 74A and the liquid crystal regions 74B have shape anisotropy, and further have optical anisotropy. It is to be noted that the liquid crystal region 74B corresponds to a specific example of "first region" in the present technology, and the polymer region 74A corresponds to a specific example of "second region" in the present technology.

(Shape Anisotropy)

Figure 36:
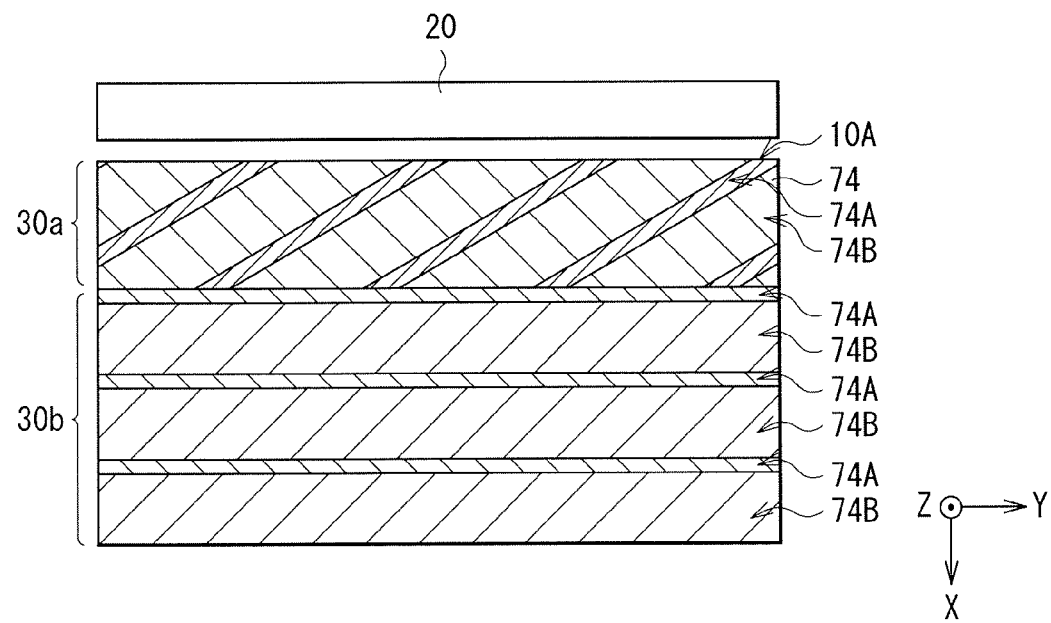
FIG. 36 is a diagram illustrating an example of a sectional configuration in an XY plane of a light modulation layer in FIG. 33.

FIG. 36 illustrates an example of a sectional configuration in an XY plane of the light modulation layer 74.

The polymer region 74A and the liquid crystal regions 74B both extend in a direction intersecting with the light incident surface 10A at the angle θ1 and parallel or substantially parallel to the surface of the transparent substrate 31 in the close region 30a. In other words, the polymer region 74A and the liquid crystal regions 74B both extend in a direction intersecting with the linear light source at the angle θ1 in the close region 30a. Moreover, the polymer region 74A and the liquid crystal regions 74B both extend in a direction parallel or substantially parallel to the light incident surface 10A and parallel or substantially parallel to the surface of the transparent substrate 31 in the far region 30b. In other words, the polymer region 64A and the liquid crystal regions 64B both extend in a direction parallel or substantially parallel to the linear light source in the far region 30b.

The polymer region 74A and the liquid crystal regions 74B both may continuously or intermittently extend from one end to the other end of the light modulation layer 70, for example, in the close region 30a and the far region 30b. Moreover, the polymer region 74A and the liquid crystal regions 74B may be alternately arranged in a direction orthogonal to the direction intersecting with the light incident surface 10A at the angle θ1, for example, in the close region 30a. Moreover, the polymer region 34A and the liquid crystal regions 34B may be alternately arranged in a direction orthogonal to the light incident surface 10A in, for example, the far region 30b.

Figure 37A:
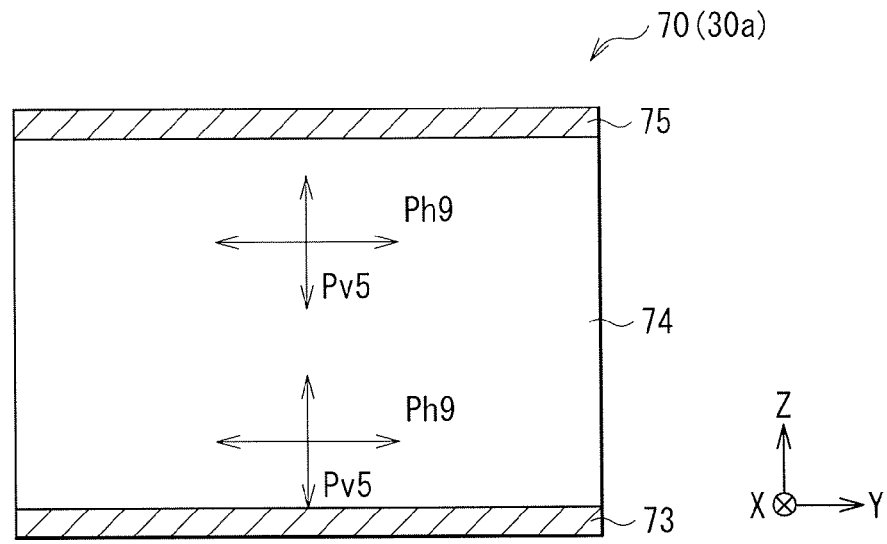
FIG. 37A is a diagram illustrating an example of structural periods in a close region of the light modulation layer in FIG. 33.
Figure 37B:
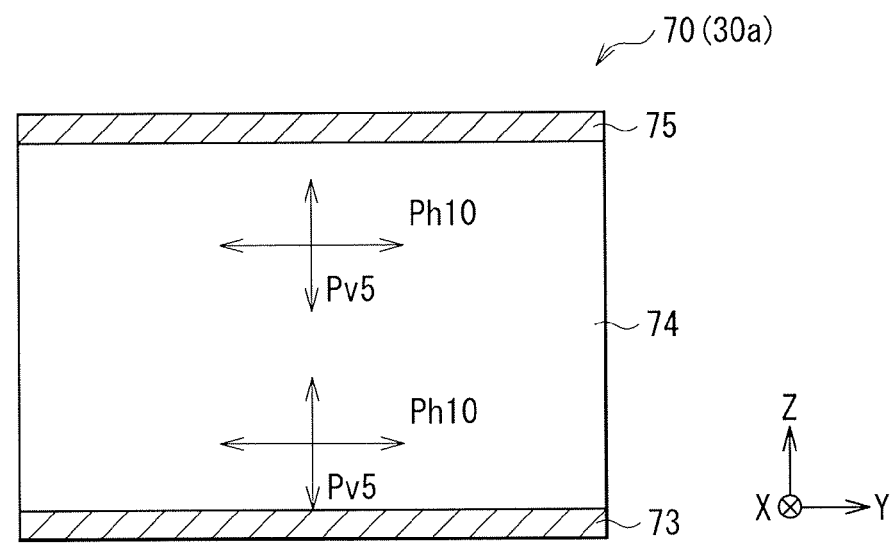
FIG. 37B is a diagram illustrating another example of the structural periods in the close region of the light modulation layer in FIG. 33.
Figure 38A:
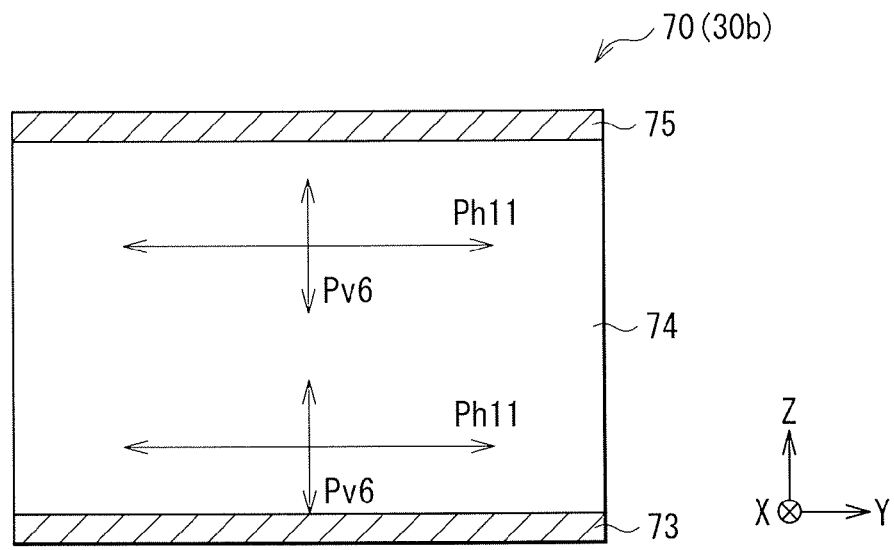
FIG. 38A is a diagram illustrating an example of structural periods in a far region of the light modulation layer in FIG. 33.
Figure 38B:
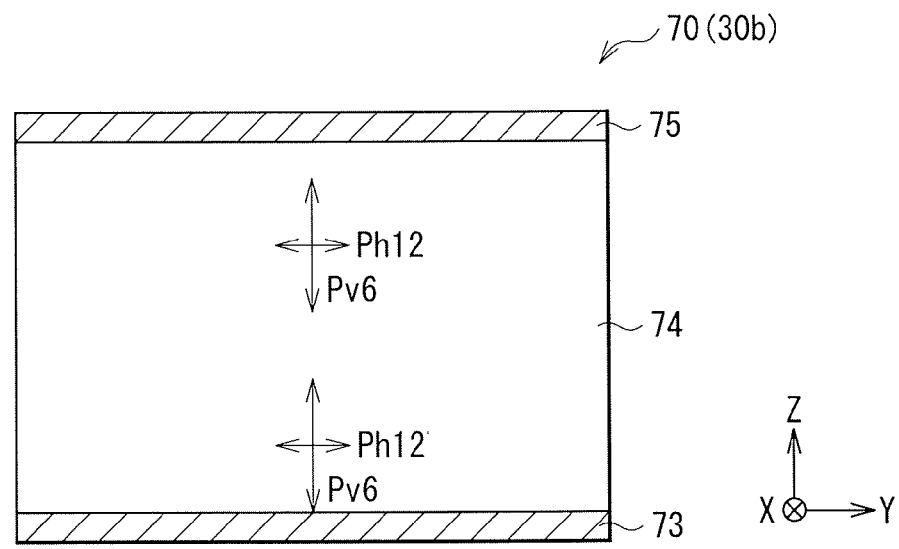
FIG. 38B is a diagram illustrating another example of the structural periods in the far region of the light modulation layer in FIG. 33.

FIGS. 37A and 37B illustrate structural periods in the X-axis direction, the Y-axis direction, and the Z-axis direction in the close region 30a of the light modulation layer 74. FIGS. 38A and 38B illustrate structural periods in the X-axis direction, the Y-axis direction, and the Z-axis direction in the far region 30b of the light modulation layer 74. For example, as illustrated in FIGS. 37A and 37B, the light modulation layer 74 has a regular structure with a period Ph10 in the X-axis direction, a period Ph9 in the Y-axis direction, and a period Pv5 in the Z-axis direction in the close region 30a. Moreover, for example, as illustrated in FIGS. 38A and 38B, the light modulation layer 74 has a regular structure with a period Ph12 in the X-axis direction, a period Ph11 in the Y-axis direction, and a period Pv6 in the Z-axis direction in the far region 30b.

The polymer region 74A in the close region 30a is formed of a polymer material obtained by polymerizing the above-described low-molecular monomer in a state where the low-molecular monomer is aligned by functions of the close regions 30a of the alignment films 73 and 75. Therefore, in the close region 30a, interfaces between the polymer region 74A and the liquid crystal regions 74B are formed densely in a direction orthogonal to the alignment directions of the alignment films 73 and 75, and are formed coarsely in the alignment directions of the alignment films 73 and 75.

The polymer region 74A in the far region 30b is formed of a polymer material obtained by polymerizing the above-described low-molecular monomer in a state where the low-molecular monomer is aligned by functions of the far regions 30b of the alignment films 73 and 75. Therefore, in the far region 30b, interfaces between the polymer region 74A and the liquid crystal region 74B are formed densely in a direction orthogonal to the alignment directions of the alignment films 73 and 75, and are formed coarsely in the alignment directions of the alignment films 73 and 75.

Figure 39:
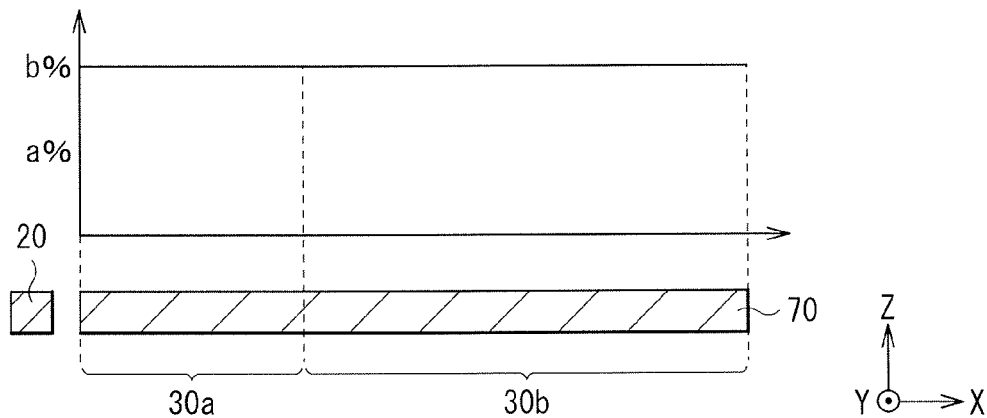
FIG. 39 is a diagram illustrating an example of a ratio of a polymer region in the light modulation layer in FIG. 33.

As illustrated in FIG. 39, a ratio α3 of the polymer region 74A in the light modulation layer 74 is fixed (uniform) or substantially fixed (substantially uniform) irrespective of a distance from the light source 20. The ratio α3 may be, for example, within a range from 50 wt % to 98 wt %, preferably within a range from 75 wt % to 95 wt %, and more preferably within a range of 85 to 92. The ratio α3 is adjustable by, for example, a weight ratio of a low-molecular monomer used as one of materials of the light modulation layer 74, intensity or a total dose of ultraviolet light applied to the low-molecular monomer, and the like.

The polymer region 74A and the liquid crystal regions 74B have different response speeds with respect to an electric field. The polymer region 74A has relatively low responsivity with respect to the electric field, and the liquid crystal regions 74B have relatively high responsivity with respect to the electric field. The polymer region 74A is configured to include a polymer material. The polymer region 74A has, for example, a streaky structure or a porous structure which does not respond to an electric field, or a rod-like structure having a response speed slower than that of the liquid crystal region 74B. The polymer region 74A is formed of, for example, a polymer material obtained by polymerizing a low-molecular monomer. The polymer region 74A is formed, for example, by polymerizing, by one or both of heat and light, a low-molecular monomer with orientation and polymerizability which is aligned along the alignment directions of the alignment films 73 and 75.

The liquid crystal regions 74B are configured to include a liquid crystal material, and have a response speed sufficiently higher than that of the polymer region 74A. Examples of the liquid crystal material (liquid crystal molecules) included in the liquid crystal regions 74B include rod-like molecules. As liquid crystal molecules included in the liquid crystal regions 74B, liquid crystal molecules having positive dielectric constant anisotropy (a so-called positive type liquid crystal) may be preferably used.

(Optical Anisotropy)

Figure 40:
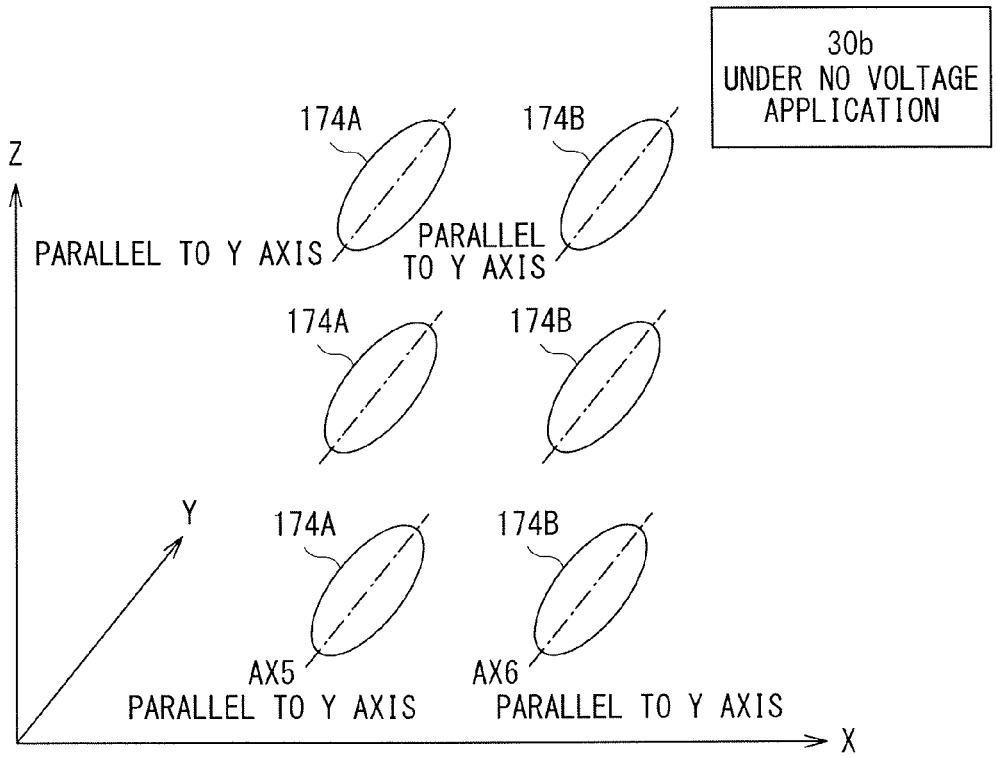
FIG. 40 is a diagram schematically illustrating an example of a function in a far region of the light modulation device in FIG. 32.

FIG. 40 schematically illustrates an example of an alignment state in the polymer region 74A and the liquid crystal regions 74B in the far region 30b under no voltage application. An ellipsoid 174A in FIG. 40 is an example of a refractive index ellipsoid exhibiting refractive index anisotropy of the polymer region 74A in the far region 30b under no voltage application. An ellipsoid 174B in FIG. 40 is an example of a refractive index ellipsoid exhibiting refractive index anisotropy of the liquid crystal region 74B in the far region 30b under no voltage application.

Figure 41:
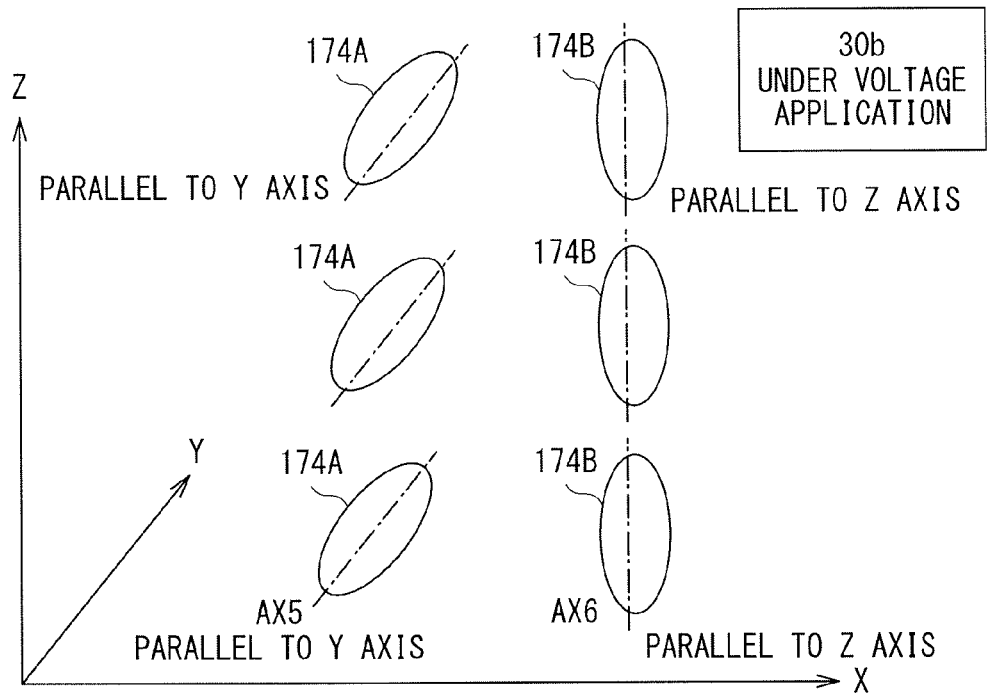
FIG. 41 is a diagram schematically illustrating another example of the function in the far region of the light modulation device in FIG. 32.

FIG. 41 schematically illustrates an example of an alignment state in the polymer region 74A and the liquid crystal regions 74B in the far region 30b under voltage application. The ellipsoid 174A in FIG. 41 is an example of a refractive index ellipsoid exhibiting refractive index anisotropy of the polymer region 74A in the far region 30b under voltage application. The ellipsoid 174B in FIG. 41 is an example of a refractive index ellipsoid exhibiting refractive index anisotropy of the liquid crystal region 74B in the far region 30b under voltage application.

Figure 42:
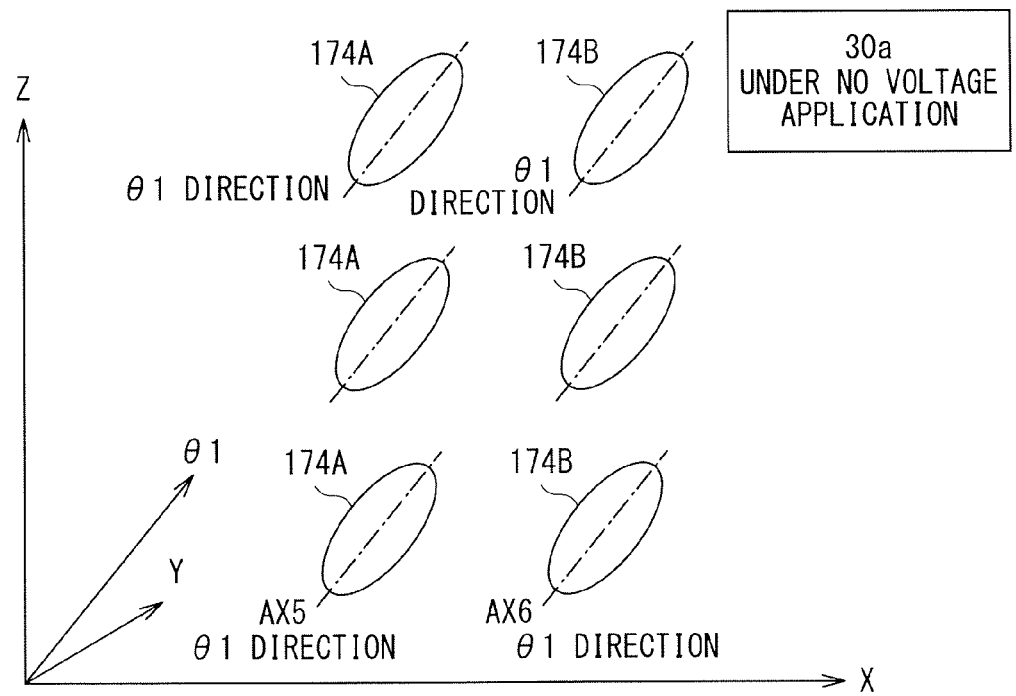
FIG. 42 is a diagram schematically illustrating an example of a function in a close region of the light modulation device in FIG. 32.

FIG. 42 schematically illustrates an example of an alignment state in the polymer region 74A and the liquid crystal regions 74B in the close region 30a under no voltage application. The ellipsoid 174A in FIG. 42 is an example of a refractive index ellipsoid exhibiting refractive index anisotropy of the polymer region 74A in the close region 30a under no voltage application. The ellipsoid 174B in FIG. 42 is an example of a refractive index ellipsoid exhibiting refractive index anisotropy of the liquid crystal region 74B in the close region 30a under no voltage application.

Figure 43:
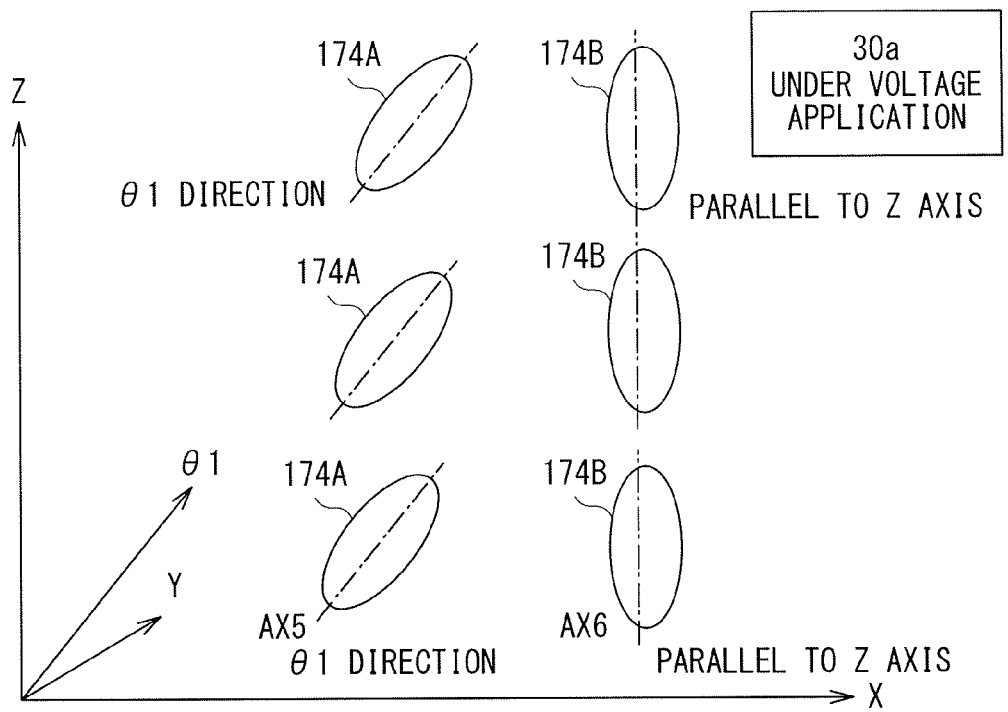
FIG. 43 is a diagram schematically illustrating another example of the function in the close region of the light modulation device in FIG. 32.

FIG. 43 schematically illustrates an example of an alignment state in the polymer region 74A and the liquid crystal regions 74B in the close region 30a under voltage application.

The ellipsoid 174A in FIG. 43 is an example of a refractive index ellipsoid exhibiting refractive index anisotropy of the polymer region 74A in the close region 30a under voltage application. The ellipsoid 174B in FIG. 43 is an example of a refractive index ellipsoid exhibiting refractive index anisotropy of the liquid crystal region 74B in the close region 30a under voltage application.

For example, as illustrated in FIG. 40, the polymer region 64A and the liquid crystal region 64B are structured to allow the direction of an optical axis AX5 of the polymer region 74A (more specifically, a major axis of the ellipsoid 174A) and the direction of an optical axis AX6 of the liquid crystal region 74B (more specifically, a major axis of the ellipsoid 174B) in the far region 30b to coincide with (be parallel to) each other under no voltage application. It is to be noted that the optical axes AX5 and AX6 each indicate a line parallel to a travel direction of a light beam allowing a refractive index to have one value irrespective of polarization direction. Moreover, it is not necessary for the directions of the optical axis AX5 and the optical axis AX6 to consistently coincide with each other under no voltage application, and the directions of the optical axis AX5 and the optical axis AX6 may be slightly deviated from each other due to, for example, a manufacturing error.

In the liquid crystal region 74B, the optical axis AX6 is parallel or substantially parallel to the light incident surface 10A and parallel or substantially parallel to the surface of the transparent substrate 31 in the far region 30b under no voltage application. In a case where the alignment films 73 and 75 have a pretilt function, the optical axis AX6 is parallel or substantially parallel to the light incident surface 10A, and intersects with the surface of the transparent substrate 31 at a predetermined pretilt angle in the far region 30b under no voltage application.

On the other hand, in the polymer region 74A, the optical axis AX5 is fixed irrespective of whether or not a voltage is applied. More specifically, the optical axis AX5 is parallel or substantially parallel to the light incident surface 10A and parallel or substantially parallel to the surface of the transparent substrate 31 in the far region 30b. In other words, the optical axis AX5 is parallel or substantially parallel to the optical axis AX6 in the far region 30b under no voltage application. In a case where the alignment films 73 and 75 have a pretilt function, the optical axis AX5 is parallel or substantially parallel to the light incident surface 10A, and intersects with the surface of the transparent substrate 31 at a predetermined pretilt angle. In other words, also in this case, the optical axis AX5 is parallel or substantially parallel to the optical axis AX6 under no voltage application.

Ordinary refractive indices of the polymer region 74A and the liquid crystal region 74B may be preferably equal to each other, and extraordinary refractive indices of the polymer region 74A and the liquid crystal region 74B may be preferably equal to each other. In this case, for example, under no voltage application, there is little difference in refractive index in all directions, and high transparency is obtained. Therefore, for example, light from the light source 20 passes through the light modulation layer 74 without being scattered in the light modulation layer 74. As a result, for example, light from the light source 20 (light from an oblique direction) is totally reflected by an interface of a region (transparent region 30A) that is transparent of the light modulation device 70, and luminance (luminance in black display) in the transparent region 30A is decreased, compared to a case where luminance is uniformized.

Moreover, for example, as illustrated in FIG. 41, the polymer region 74A and the liquid crystal regions 74B are structured to allow directions of the optical axes AX5 and AX6 to be different from (intersect with or be orthogonal to) each other in the far region 30b under voltage application. In the liquid crystal regions 74B, under voltage application, the optical axis AX6 is parallel or substantially parallel to the light incident surface 10A and parallel or substantially parallel to the normal to the transparent substrate 31 in the far region 30b. In other words, under voltage application, the optical axis AX6 is orthogonal or substantially orthogonal to a plane including the sub-electrode 32A or the sub-electrode 36A in the far region 30b.

Therefore, under voltage application, in the light modulation layer 74, a difference in refractive index in all directions is increased to obtain a high scattering property. Accordingly, for example, light from the light source 20 is scattered in the light modulation layer 74. As a result, for example, the light from the light source 20 (light from the oblique direction) passes through an interface of a region in a scattering state (scattering region 30B) in the light modulation device 70, and the light having passed toward the reflective plate 40 is reflected by the reflective plate 40 to pass through the light modulation device 70. Therefore, luminance of the scattering region 30B is extremely higher than that in a case where the luminance is uniformized, and luminance in white display is partially increased (partial luminance enhancement) by a reduced amount of the luminance of the transparent region 30A.

It is to be noted that the ordinary refractive indices of the polymer region 74A and the liquid crystal region 74B may be slightly different from each other due to, for example, a manufacturing error, and may be preferably, for example, 0.1 or less, and more preferably 0.05 or less. Moreover, the extraordinary refractive indices of the polymer region 74A and the liquid crystal region 74B may be slightly different from each other due to, for example, a manufacturing error, and may be preferably, for example, 0.1 or less, and more preferably 0.05 or less.

Moreover, a refractive index difference (=extraordinary refractive index-ordinary refractive index) in the polymer region 74A and a refractive index difference (=extraordinary refractive index-ordinary refractive index) in the liquid crystal region 74B may be preferably as large as possible, and may be preferably 0.05 or over, more preferably 0.1 or over, and still more preferably 0.15 or over. It is because, in a case where the refractive index differences in the polymer region 74A and the liquid crystal region 74B are large, the scattering power of the light modulation layer 74 is enhanced to allow light guide conditions to be easily disrupted, thereby allowing light from the light guide plate 10 to be easily extracted.

For example, as illustrated in FIG. 42, the polymer region 74A and the liquid crystal region 74B are structured to allow the direction of the optical axis AX5 of the polymer region 74A and the direction of the optical axis AX6 of the liquid crystal region 74B in the close region 30a to coincide with (be parallel to) each other under no voltage application. It is to be noted that it is not necessary for the directions of the optical axis AX5 and the optical axis AX6 to consistently coincide with each other under no voltage application, and the directions of the optical axis AX5 and the optical axis AX6 may be slightly deviated from each other due to, for example, a manufacturing error.

In the liquid crystal region 74B in the close region 30a, under no voltage application, the direction of the optical axis AX6 is oriented in a direction parallel or substantially parallel to a direction (alignment direction) of the angle θ1. In a case where the alignment films 73 and 75 have a pretilt function, in a region located closer to the alignment film 73 of the close region 30a, the optical axis AX6 is oriented in a direction parallel or substantially parallel to the direction (alignment direction) of the angle θ1 under no voltage application, and is oriented in a direction intersecting with the surface of the transparent substrate 31 at a predetermined pretilt angle.

In the polymer region 74A, the direction of the optical axis AX5 is oriented in a direction parallel or substantially parallel to the direction (alignment direction) of the angle θ1, irrespective of whether or not a voltage is applied. In a case where the alignment films 73 and 75 have a pretilt function, the optical axis AX5 is oriented in a direction parallel or substantially parallel to the direction (alignment direction) of the angle θ1, and is oriented in a direction intersecting with the surface of the transparent substrate 31 at a predetermined pretilt angle. In other words, also in this case, under no voltage application, the optical axis AX5 is parallel or substantially parallel to the optical axis AX6.

As illustrated in FIG. 43, in the polymer region 74A and the liquid crystal region 74B, under voltage application, the directions of the optical axis AX5 and the optical axis AX6 are different from (orthogonal or substantially orthogonal to) each other in the close region 30a. Moreover, in the liquid crystal region 74B, under voltage application, the optical axis AX6 is parallel or substantially parallel to the light incident surface 10A and parallel or substantially parallel to the normal to the transparent substrate 31 in the close region 30a.

Therefore, under voltage application, in the light modulation layer 74, a difference in refractive index in all directions is increased to obtain a high scattering property. Accordingly, for example, light from the light source 20 is scattered in the light modulation layer 74. As a result, for example, the light from the light source 20 (light from the oblique direction) passes through an interface of a region in a scattering state (scattering region 30B) in the light modulation device 70, and the light having passed toward the reflective plate 40 is reflected by the reflective plate 40 to pass through the light modulation device 70. Therefore, luminance of the scattering region 30B is extremely higher than that in a case where the luminance is uniformized, and luminance in white display is partially increased (partial luminance enhancement) by a reduced amount of the luminance of the transparent region 30A.

In a case where the angle θ1 (for example, a rubbing angle) is within a range from 60 degrees to less than 90 degrees, contrast of light and dark stripes caused by arrangement of the light source 20 is largely reduced, and luminance unevenness in proximity to the light source 20 is allowed to be nearly eliminated. It is to be noted that, in a case where the light modulation layer 74 easily satisfies A>B>C and A1/C1<A2/C2 by adding a monofunctional monomer (a low-molecular monomer having both polymerizability and a liquid crystal property) to the material of the light modulation layer 74, or by reducing intensity or a total dose of ultraviolet light applied to the material of the light modulation layer 74, the angle θ1 (for example, a rubbing angle) may be preferably within a range from 30 degrees to less than 90 degrees. Moreover, in a case where the light modulation layer 74 more easily satisfies A>B>C and A1/C1<A2/C2 by adding a monofunctional monomer (a low-molecular monomer having both polymerizability and a liquid crystal property) to the material of the light modulation layer 74 and reducing intensity or the total dose of ultraviolet light applied to the material of the light modulation layer 74, the angle θ1 (for example, a rubbing angle) may be preferably within a range from 10 degrees to less than 90 degrees.

(Anisotropic Scattering)

Next, anisotropic scattering in this embodiment will be described below. In this embodiment, anisotropic scattering is caused by (a) nonuniformity of existence probability of interfaces (scattering interfaces) between the polymer region 74A and the liquid crystal regions 74B in the scattering region 30B, and (b) birefringence in the scattering region 30B. Therefore, nonuniformity of existence probability of the scattering interfaces in the scattering region 30B, and birefringence in the scattering region 30B will be described in detail below.

—Nonuniformity of Existence Probability of Scattering Interfaces—

In the scattering region 30B in the far region 30b, the interfaces between the polymer region 74A and the liquid crystal regions 74B are disposed densely in a direction orthogonal to the alignment directions of the far regions 30b of the alignment films 73 and 75, and are disposed coarsely in a direction parallel to the alignment directions of the far regions 30b of the alignment films 73 and 75. In the scattering region 30B in the close region 30a, the interfaces between the polymer region 74A and the liquid crystal regions 74B are disposed densely in a direction orthogonal to the alignment directions of the close regions 30a of the alignment films 73 and 75, and are disposed coarsely in a direction parallel to the alignment directions of the close regions 30a of the alignment films 73 and 75.

The direction orthogonal to the alignment directions of the far regions 30b of the alignment films 73 and 75 indicates the first direction or the second direction. The direction parallel to the alignment directions of the far regions 30b of the alignment films 73 and 75 indicates the third direction. The direction orthogonal to the alignment directions of the close regions 30a of the alignment films 73 and 75 indicates a direction orthogonal to a direction intersecting with the light incident surface 10A at the angle θ1 and parallel to the surface of the transparent substrate 31. The direction parallel to the alignment directions of the close regions 30a of the alignment films 73 and 75 indicates a direction intersecting with the light incident surface 10A at the angle θ1 and parallel to the surface of the transparent substrate 31.

In the far region 30b, light propagating through the scattering region 30B in the first direction enters an interface in periods of an average streaky texture size in a minor-axis direction of a streaky structure in the polymer region 74A. Likewise, in the far region 30b, light propagating through the scattering region 30B in the second direction enters an interface in periods of the average streaky texture size in the minor-axis direction of the streaky structure in the polymer region 74A. Therefore, the light propagating through the scattering region 30B in the first direction and the light propagating through the scattering region 30B in the second direction are largely scattered.

In the far region 30b, light propagating through the scattering region 30B in the third direction enters an interface in periods of an average streaky texture size in a major-axis direction of the streaky structure in the polymer region 74A. Therefore, scattering of this light is smaller than scattering of light propagating through the scattering region 30B in the first direction in the far region 30b.

In the close region 30a, light propagating through the scattering region 30B in the first direction enters an interface in periods between the period of the average streaky texture size in the minor-axis direction of the streaky structure in the polymer region 74A and the period of the average streaky texture size in the major-axis direction of the streaky structure in the polymer region 74A. Therefore, scattering of this light is smaller than scattering of light propagating through the scattering region 30B in the first direction in the far region 30b.

In the close region 30a, light propagating through the scattering region 30B in the third direction enters an interface in periods between the period of the average streaky texture size in the minor-axis direction of the streaky structure in the polymer region 74A and the period of the average streaky texture size in the major-axis direction of the streaky structure in the polymer region 74A. Therefore, scattering of this light is smaller than scattering of light propagating through the scattering region 30B in a direction orthogonal to the light incident surface 10A in the far region 30b.

It is to be noted that a magnitude relationship between scattering of light propagating through the scattering region 30B in the first direction in the close region 30a and scattering of light propagating through the scattering region 30B in the third direction in the close region 30a is dependent on a magnitude relationship between a period of the interface between the polymer region 74A and the liquid crystal region 74B in a travel direction of the light propagating through the scattering region 30B in the first direction and a period of the interface between the polymer region 74A and the liquid crystal region 74B in a travel direction of the light propagating through the scattering region 30B in the third direction.

—Birefringence—

In the far region 30b, light propagating through the scattering region 30B in the first direction propagates in periods of the average streaky texture size in the minor-axis direction of the streaky structure in the polymer region 74A while being influenced by a difference between an extraordinary light refractive index of the liquid crystal region 74B and an ordinary light refractive index of the polymer region 74A and a difference between an ordinary light refractive index of the liquid crystal region 74B and an extraordinary light refractive index of the polymer region 74A. Therefore, in the far region 30b, light propagating through the scattering region 30B in the first direction is largely scattered.

In the far region 30b, light propagating through the scattering region 30B in the third direction propagates in periods of the average streaky texture size in the major-axis direction of the streaky structure in the polymer region 74A while being influenced by only a difference between the extraordinary light refractive index of the liquid crystal region 74B and the ordinary light refractive index of the polymer region 74A. Therefore, scattering of light propagating through the scattering region 30B in the third direction in the far region 30b is smaller than scattering of light propagating through the scattering region 30B in the first direction in the far region 30b.

In the close region 30a, light propagating through the scattering region 30B in the first direction propagates in periods between the period of the average streaky texture size in the minor-axis direction of the streaky structure in the polymer region 74A and the period of the average streaky texture size in the major-axis direction of the streaky structure in the polymer region 74A while being influenced by a difference between the extraordinary light refractive index of the liquid crystal region 74B and the ordinary light refractive index of the polymer region 74A and a difference between the ordinary light refractive index of the liquid crystal region 74B and the extraordinary light refractive index of the polymer region 74A. Moreover, the value of the extraordinary light refractive index in this case is close to that of the ordinary light refractive index by intersection at the angle θ1; therefore, a scattering property by polarization is weakened. Accordingly, scattering of light propagating through the scattering region 30B in the first direction in the close region 30a is smaller than scattering of light propagating through the scattering region 30B in the first direction in the far region 30b.

In the close region 30a, light propagating through the scattering region 30B in the third direction propagates in periods between the period of the average streaky texture size in the minor-axis direction of the streaky structure in the polymer region 74A and the period of the average streaky texture size in the major-axis direction of the streaky structure in the polymer region 74A while being influenced by a difference between the extraordinary light refractive index of the liquid crystal region 74B and the ordinary light refractive index of the polymer region 74A and a difference between the ordinary light refractive index of the liquid crystal region 74B and the extraordinary light refractive index of the polymer region 74A. Moreover, the value of the extraordinary light refractive index in this case is close to that of the ordinary light refractive index by intersection at the angle θ1; therefore, a scattering property by polarization is weakened.

In a case where the angle θ1 is within a range from more than 45 degrees to less than 90 degrees, the period of the interface between the polymer region 74A and the liquid crystal region 74B in the first direction is longer than the period of the interface between the polymer region 74A and the liquid crystal region 74B in the third direction. Therefore, in this case, scattering of light propagating through the scattering region 30B in the first direction in the close region 30a is smaller than scattering of light propagating through the scattering region 30B in the third direction in the close region 30a.

Moreover, in a case where the angle θ1 is within a range from more than 0 degrees to less than 45 degrees, the period of the interface between the polymer region 74A and the liquid crystal region 74B in the first direction is shorter than the period of the interface between the polymer region 74A and the liquid crystal region 74B in the third direction. Therefore, in this case, scattering of light propagating through the scattering region 30B in the first direction in the close region 30a is larger than scattering of light propagating through the scattering region 30B in the third direction in the close region 30a.

In other words, the light modulation layer 74 is configured to exhibit, in the far region 30b, anisotropic scattering in which scattering of light propagating in the first direction is larger than scattering of light propagating in the third direction. Moreover, in a case where the angle θ1 is within a range from more than 45 degrees to less than 90 degrees, the light modulation layer 74 is configured to exhibit, in the close region 30a, anisotropic scattering in which scattering of light propagating in the first direction is smaller than scattering of light propagating in the third direction. Further, in a case where the angle θ1 is within a range from more than 0 degrees to less than 45 degrees, the light modulation layer 74 is configured to exhibit, in the close region 30a, anisotropic scattering in which scattering of light propagating in the first direction is larger than scattering of light propagating in the third direction.

As used herein, a magnitude of the first scattering is A, a magnitude of the second scattering is B, and a magnitude of the third scattering is C. A magnitude of the first scattering in the close region 30a of the light modulation layer 74 is A1, and a magnitude of the third scattering in the close region 30a of the light modulation layer 74 is C1. A magnitude of the first scattering in the far region 30b of the light modulation layer 74 is A2 and a magnitude of the third scattering in the far region 30b of the light modulation layer 74 is C2. At this time, the light modulation layer 74 is configured to satisfy the following expressions when the light modulation layer 74 exhibits the scattering property.

$$A > B > C$$

$$A1/C1 < A2/C2$$

Next, magnitudes of anisotropic scattering in the close region 30*a* and the far region 30*b* will be described below.

A magnitude of scattering anisotropy indicates a quotient of three axes, i.e., a magnitude of scattering of light propagating in the first direction (the X-axis direction), a magnitude of scattering of light propagating in the third direction (the Y-axis direction), and a magnitude of scattering of light propagating in the second direction (the Z-axis direction). More specifically, the quotient of three axes indicates a total sum of the following three fractions ((A) to (C)). When the quotient of three axes is large, scattering anisotropy is large, and when the quotient of three axes is small, scattering anisotropy is small. It is to be noted that, in the following fractions (A) to (C), as a precondition, a value of a numerator is larger than a value of a denominator. Therefore, in a case where the value of the numerator is smaller than the value of the denominator, the numerator and denominator may preferably switch places in the following fractions (A) to (C).

(A) (Magnitude of scattering of light propagating in the first direction)/(magnitude of scattering of light propagating in the third direction)

(B) (Magnitude of scattering of light propagating in the second direction)/(magnitude of scattering of light propagating in the third direction)

(C) (Magnitude of scattering of light propagating in the first direction)/(magnitude of scattering of light propagating in the second direction)

The magnitude of scattering anisotropy is determined by (a) nonuniformity of existence probability of the interfaces (scattering interfaces) between the polymer region 74A and the liquid crystal regions 74B in the scattering region 30B, and (b) birefringence in the scattering region 30B. In the magnitude of scattering anisotropy, the above-described factor (a) is dominant. It is because, when existence probability of the scattering interfaces is considered, ideally, a same medium is continued in the third direction; therefore, light is not scattered in the third direction, and is scattered only in the first direction and the second direction. At this time, in a desk plan, scattering in the third direction is zero; therefore, a scattering ratio of the third direction to the first direction and the second direction is infinite. On the other hand, when birefringence is considered, while two polarization components are scattered in the first direction, only one polarization component is scattered in the second direction and the third direction. At this time, a scattering ratio of the first direction to the second direction and the third direction is twice as high at most. Accordingly, in the magnitude of scattering anisotropy, the above-described factor (a) is dominant. Therefore, a relationship between existence probability of the scattering interfaces and the magnitude of scattering anisotropy will be described below, and a relationship between birefringence and the magnitude of scattering anisotropy will not be described.

The magnitude of scattering anisotropy corresponds to a quotient of three axes, i.e., a period in the first direction in the light modulation layer 74, a period in the third direction in the light modulation layer 74, and a period in the second direction in the light modulation layer 74. The quotient of three axes indicates a total sum of the following three fractions ((D) to (F)). It is to be noted that, in the following fractions (D) to (F), as a precondition, a value of a numerator is larger than a value of a denominator. Therefore, in a case where the value of the numerator is smaller than the value of the denominator, the numerator and denominator may preferably switch places in the following (D) to (F).

(D) (Period in the third direction in the light modulation layer 74)/(period in the first direction in the light modulation layer 74)

(E) (Period in the third direction in the light modulation layer 74)/(period in the second direction in the light modulation layer 74)

(F) (Period in the second direction in the light modulation layer 74)/(period in the first direction in the light modulation layer 74)

A magnitude (A1/C1) of scattering anisotropy in the close region 30*a* has a value corresponding to Ph9/Ph10+Ph9/Pv5+Pv5/Ph10. Moreover, a magnitude (A2/C2) of scattering anisotropy in the far region 30*b* has a value corresponding to Ph11/Ph12+Ph11/Pv6+Pv6/Ph12. Herein, respective periods may have, for example, the following relationship.

$$Ph9/Ph10 < Ph11/Ph12$$

$$Ph9/Pv5 < Ph11/Pv6$$

$$Pv5/Ph10 < Pv6/Ph12$$

Therefore, it can be said that, when the light modulation layer 74 exhibits the scattering property, the light modulation layer 74 is configured to satisfy A>B>C and A1/C1<A2/C2.

The magnitudes of scattering anisotropy in the close region 30*a* and the far region 30*b* are different from each other, because the alignment directions in the close region 30*a* and the far region 30*b* are different from each other. In this embodiment, as a method of allowing the alignment directions in the close region 30*a* and the far region 30*b* to be different from each other, a pair of alignment films 73 and 75 in which the alignment directions in the close region 30*a* and the far region 30*b* are different from each other are used. More specifically, as the alignment film 73 located closer to the transparent substrate 31, a horizontal alignment film in which the alignment directions of the far region 30*b* and the close region 30*a* are oriented at 0 degrees and θ1 (0 degrees<θ1≤90 degrees), respectively, is used. As the alignment film 75 located closer to the transparent substrate 37, a horizontal alignment film in which the alignment directions of the far region 30*b* and the close region 30*a* are oriented at 0 degrees and θ1, respectively, is used.

Thus, in this embodiment, the magnitude (A1/C1) of scattering anisotropy in the close region 30*a* closer to the light source 20 of the light modulation layer 74 is smaller than the magnitude (A2/C2) of scattering anisotropy in the far region 30*b* farther from the light source 20 of the light modulation layer 74. Accordingly, anisotropic scattering of light propagating through the light modulation layer 74 is allowed to be reduced in proximity to the light source 20. Light and dark stripes caused by arrangement of the light source 20 are formed due to a large difference between the first scattering and the third scattering. Therefore, when the above-described anisotropic scattering is reduced in proximity to the light source 20, contrast of light and dark stripes caused by the arrangement of the light source 20 is allowed to be reduced. Moreover, in this embodiment, the above-described anisotropic scattering is reduced only in a region closer to the light source 20 of the light modulation layer 74; therefore, compared to a case where the above-described anisotropic scattering is reduced in the entire light modulation layer 74, high luminance is allowed to be obtained. Further, in this embodiment, since the second scattering is stronger than the third scattering, light from the light source 20 is preferentially scattered in a direction where light guide conditions are disrupted, and light extraction efficiency is increased. Thus, in this embodiment, while high luminance is maintained, contrast of light and dark stripes caused by the arrangement of the light source 20 is allowed to be reduced.

4. Fourth Embodiment

Figure 44:
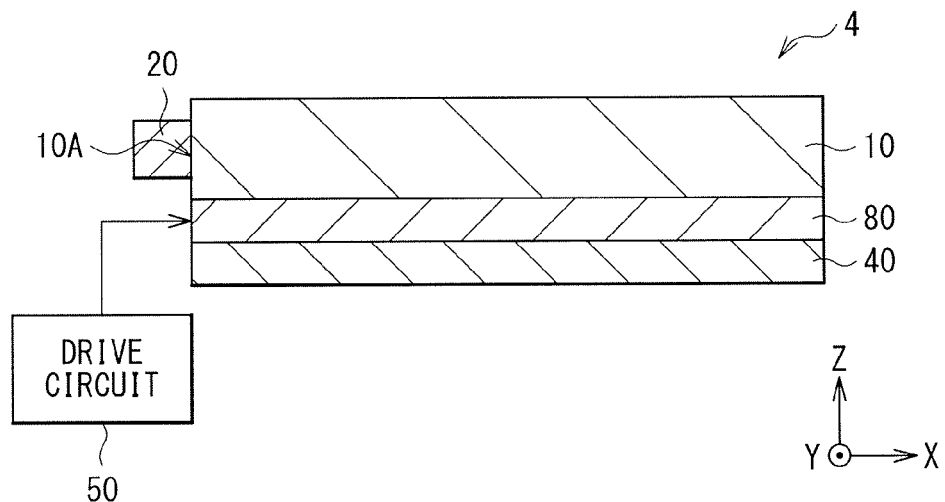
FIG. 44 is a diagram illustrating an example of a schematic configuration of an illumination unit according to a fourth embodiment of the present technology.

Next, an illumination unit 4 according to a fourth embodiment of the present technology will be described below. The illumination unit 4 according to this embodiment is different from the configuration of the illumination unit 1 according to the above-described embodiment in that, as illustrated in FIG. 44, a light modulation device 80 is provided instead of the light modulation device 30. Therefore, description will be given of, mainly, points different from the configuration of the above-described embodiment, and points common to the configuration of the above-described embodiment will not be further described as appropriate.

Figure 45:
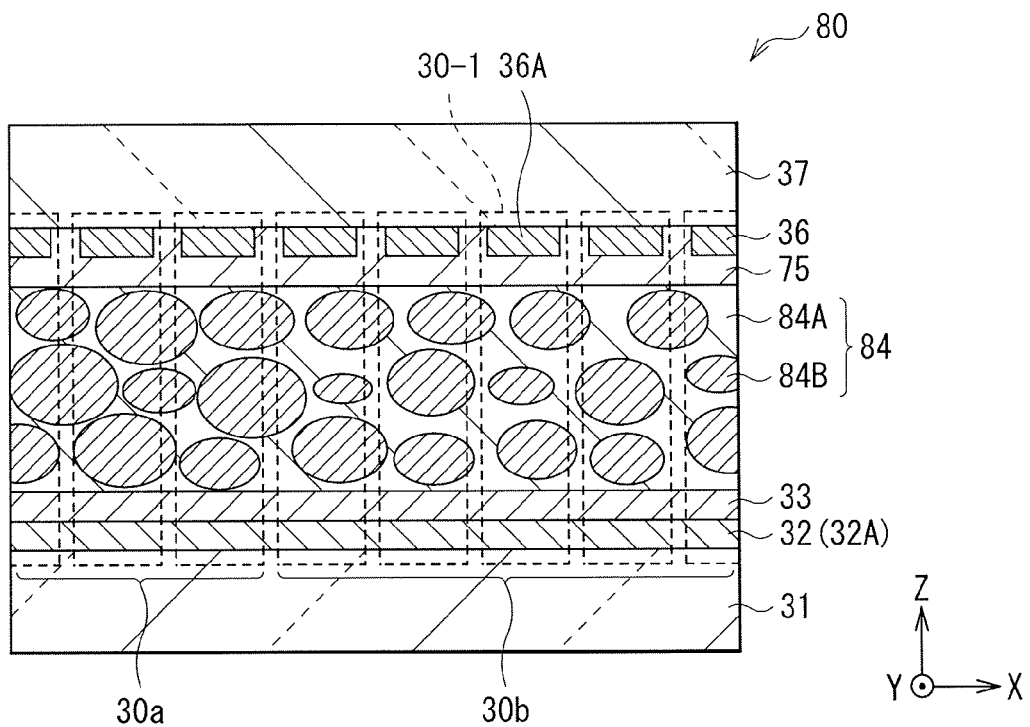
FIG. 45 is a diagram illustrating an example of a sectional configuration in an XZ plane of a light modulation device in FIG. 44.

FIG. 45 illustrates an example of a sectional configuration of the light modulation device 80. In the light modulation device 80, for example, the transparent substrate 31, the lower electrode 32, the alignment film 33, a light modulation layer 84, the alignment film 75, the upper electrode 36, and the transparent substrate 37 are arranged in order from the reflective plate 40.

Figure 46:
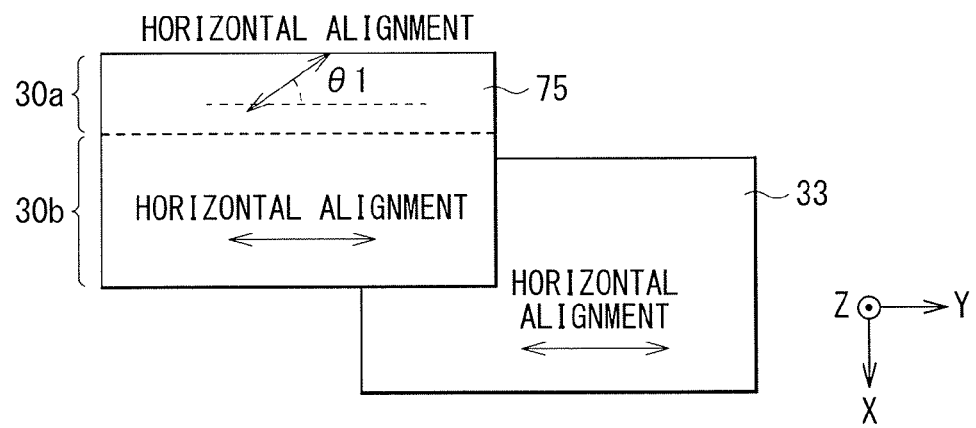
FIG. 46 is a plan view illustrating an example of alignment directions of alignment films in FIG. 45.
Figure 47:
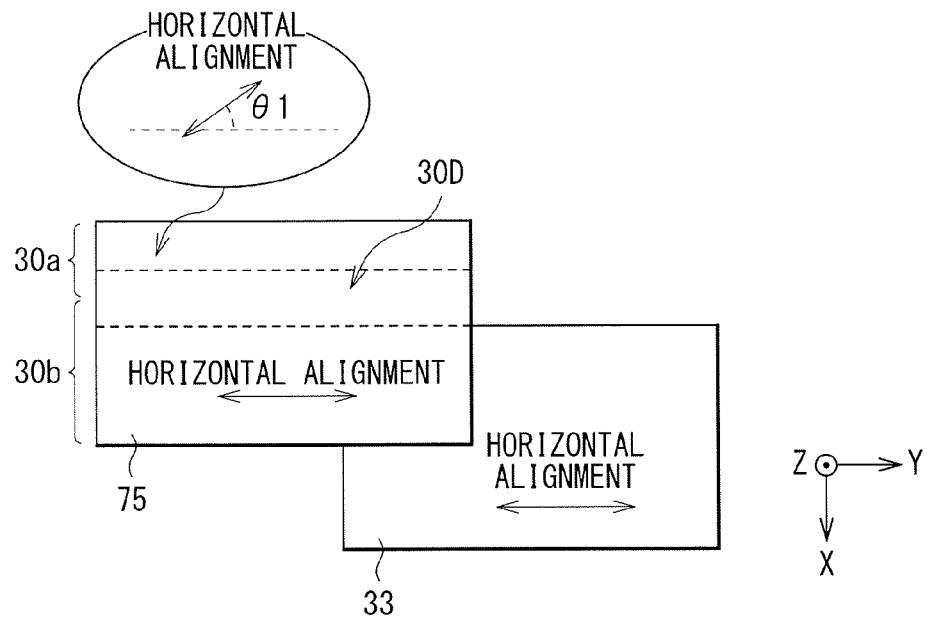
FIG. 47 is a plan view illustrating another example of the alignment directions of the alignment films in FIG. 45.

The alignment films 33 and 75 are so disposed as to sandwich the light modulation layer 84 therebetween. The alignment films 33 and 75 align, for example, a liquid crystal or a low-molecular monomer used in the light modulation layer 84. The alignment films 33 and 75 are configured to satisfy the following two expressions (A>B>C and A1/C1<A2/C2) when the light modulation layer 84 exhibits a scattering property. As with the above-described embodiment, as illustrated in FIG. 46, the alignment film 33 is a horizontal alignment film having an alignment direction in a direction parallel to the light incident surface 10A. On the other hand, as with the above-described embodiment, as illustrated in FIG. 46, the alignment film 75 is a composite film configured of two kinds of horizontal alignment films with alignment directions different from each other. More specifically, the alignment direction of the alignment film 75 is oriented in a direction intersecting with the light incident surface 10A at the angle θ1 in the close region 30a, and is oriented in a direction parallel or substantially parallel to the light incident surface 10A in the far region 30b. It is to be noted that, as with the above-described embodiment, for example, as illustrated in FIG. 47, the alignment film 75 may have, around a boundary between the close region 30a and the far region 30b, a transition region 30D of which the alignment direction is gradually changed to a direction parallel or substantially parallel to the light incident surface 10A with an increasing distance from the light source 20.

A part of the light modulation layer 84 or the entire light modulation layer 84 exhibits a scattering property or transparency with respect to light from the light source 20, depending on magnitude of an electric field. The light modulation layer 84 exhibits transparency with respect to light from the light source 20, for example, under no voltage application. Moreover, the light modulation layer 84 exhibits the scattering property with respect to light from the light source 20, for example, under voltage application. For example, as illustrated in FIG. 45, the light modulation layer 84 is a composite layer including a polymer region 84A and a plurality of liquid crystal regions 84B dispersed in the polymer region 84A. The polymer region 84A and the liquid crystal regions 84B have shape anisotropy, and further have optical anisotropy. It is to be noted that the liquid crystal region 84B corresponds to a specific example of "first region" in the present technology, and the polymer region 84A corresponds to a specific example of "second region" in the present technology.

(Shape Anisotropy)

Figure 48:
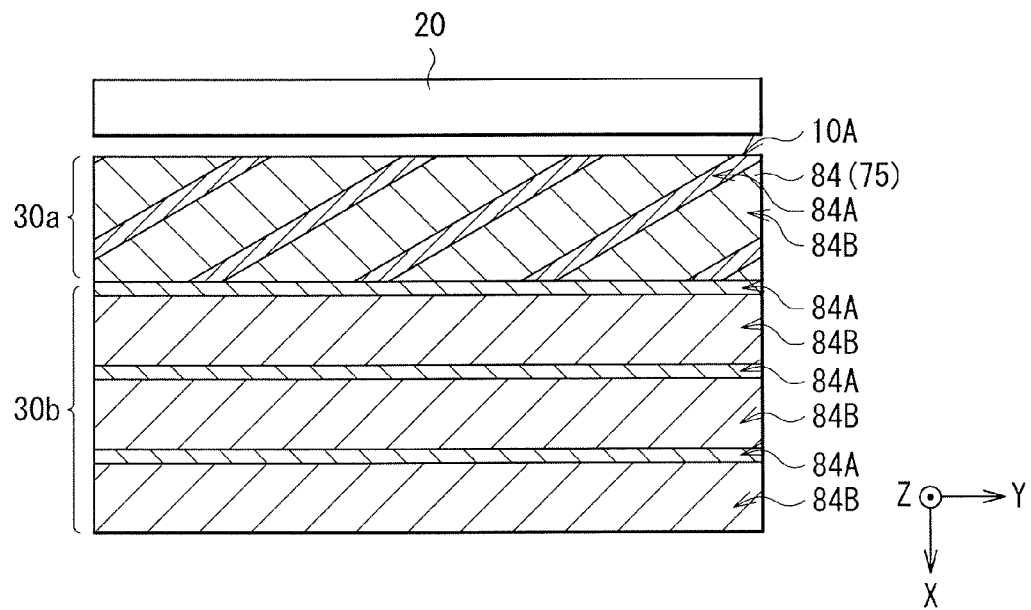
FIG. 48 is a diagram illustrating an example of a sectional configuration in an XY plane of a light modulation layer in FIG. 45.
Figure 49:
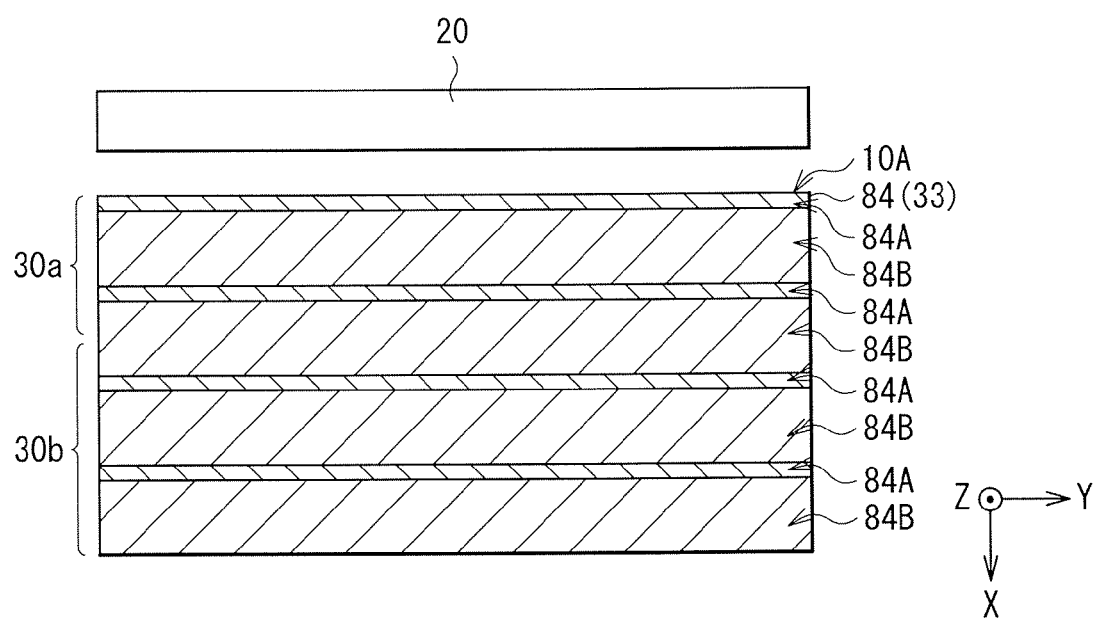
FIG. 49 is a diagram illustrating another example of the sectional configuration in the XY plane of the light modulation layer in FIG. 45.

FIG. 48 illustrates an example of a sectional configuration in an XY plane of a region located closer to the alignment film 75 of the light modulation layer 84. FIG. 49 illustrates an example of a sectional configuration in an XY plane of a region located closer to the alignment film 33 of the light modulation layer 84. The polymer region 84A and the liquid crystal regions 84B both extend in a direction intersecting with the light incident surface 10A at the angle θ1 and parallel or substantially parallel to the surface of the transparent substrate 31 in a region located closer to the alignment film 75 of the close region 30a. In other words, the polymer region 84A and the liquid crystal regions 84B both extend in a direction intersecting with the linear light source at the angle θ1 in the region located closer to the alignment film 75 of the close region 30a. Moreover, the polymer region 84A and the liquid crystal regions 84B both extend in a direction parallel or substantially parallel to the light incident surface 10A and parallel or substantially parallel to the surface of the transparent substrate 31 in a region located closer to the alignment film 33 of the close region 30a, and the far region 30b. In other words, the polymer region 84A and the liquid crystal regions 84B both extend in a direction parallel or substantially parallel to the linear light source in the region located closer to the alignment film 33 of the close region 30a, and the far region 30b.

The polymer region 84A and the liquid crystal regions 84B both may continuously or intermittently extend from one end to the other end of the light modulation layer 80, for example, in the close region 30a and the far region 30b. Moreover, the polymer region 84A and the liquid crystal regions 84B may be alternately arranged in a direction orthogonal to the direction intersecting with the light incident surface 10A at the angle θ1, for example, in the close region 30a. Moreover, the polymer region 34A and the liquid crystal regions 34B may be alternately arranged in a direction orthogonal to the light incident surface 10A in, for example, the far region 30b.

Figure 50A:
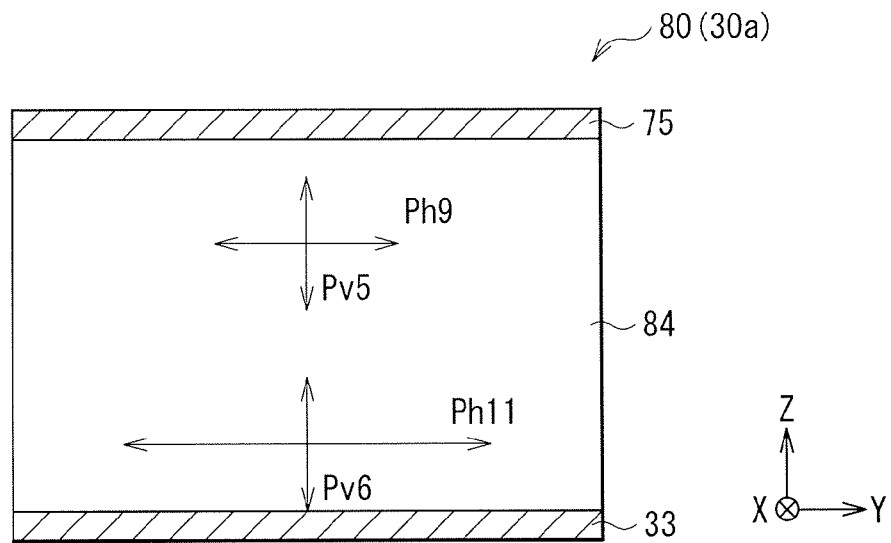
FIG. 50A is a diagram illustrating an example of structural periods in a close region of a light modulation layer in FIG. 45.
Figure 50B:
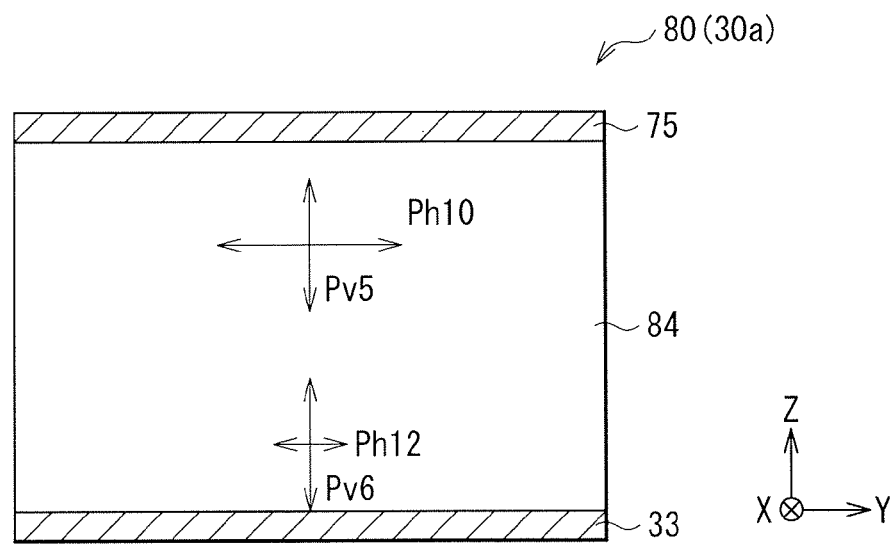
FIG. 50B is a diagram illustrating another example of the structural periods in the close region of the light modulation layer in FIG. 45.
Figure 51A:
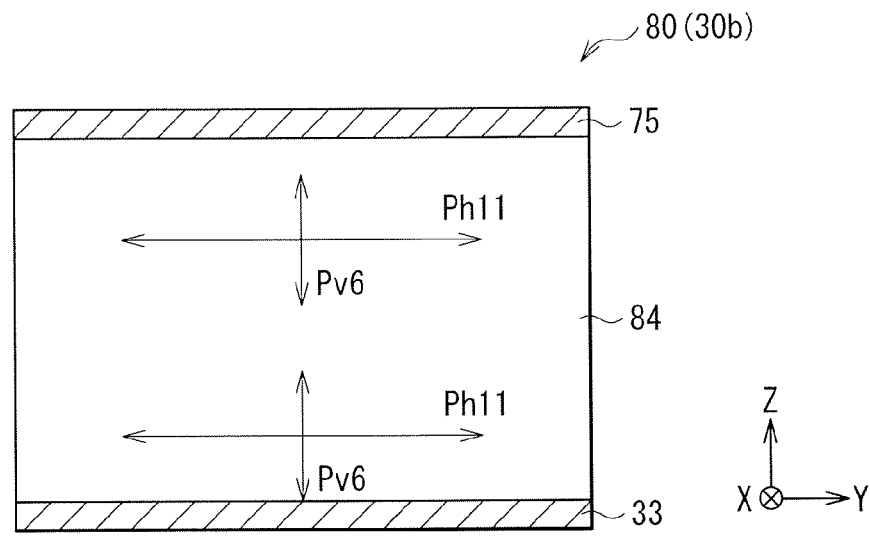
FIG. 51A is a diagram illustrating an example of structural periods in a far region of the light modulation layer in FIG. 45.
Figure 51B:
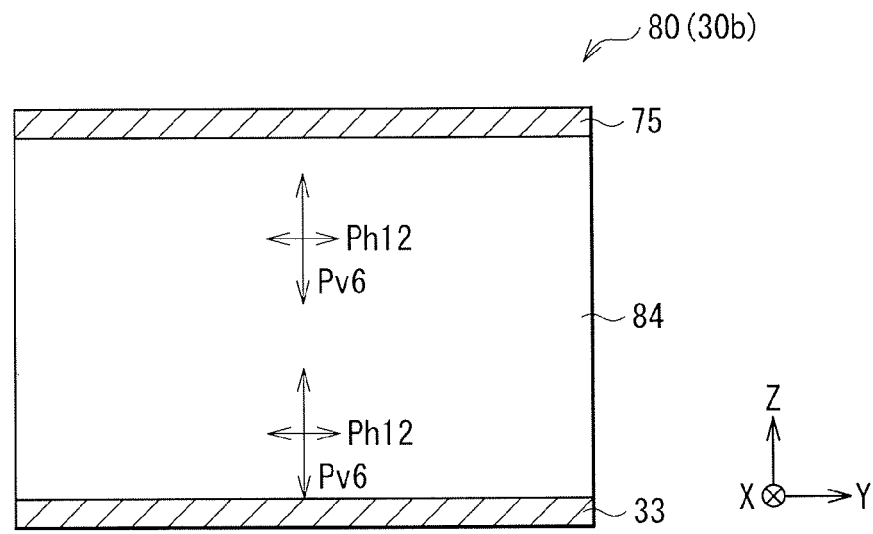
FIG. 51B is a diagram illustrating another example of the structural periods in the far region of the light modulation layer in FIG. 45.

FIGS. 50A and 50B illustrate structural periods in the X-axis direction, the Y-axis direction, and the Z-axis direction in the close region 30a of the light modulation layer 84. FIGS. 51A and 51B illustrate structural periods in the X-axis direction, the Y-axis direction, and the Z-axis direction in the far region 30b of the light modulation layer 84. For example, as illustrated in FIGS. 50A and 50B, the light modulation layer 84 has a regular structure with a period Ph10 in the X-axis direction, a period Ph9 in the Y-axis direction, and a period Pv5 in the Z-axis direction in the region located closer to the alignment film 75 of the close region 30a. As illustrated in FIGS. 50A and 50B, for example, the light modulation layer 84 has a regular structure with a period Ph12 in the X-axis direction, a period Ph11 in the Y-axis direction, and a period Pv6 in the Z-axis direction in the region located closer to the alignment film 33 of the close region 30a. Moreover, for example, as illustrated in FIGS. 51A and 51B, the light modulation layer 84 has a regular structure with a period Ph12 in the X-axis direction, a period Ph11 in the Y-axis direction, and a period Pv6 in the Z-axis direction in the far region 30b.

The polymer region 84A in the close region 30a is formed of a polymer material obtained by polymerizing the above-described low-molecular monomer in a state where the low-molecular monomer is aligned by functions of the close regions 30a of the alignment films 33 and 75. Therefore, in the region located closer to the alignment film 75 of the close region 30*a*, interfaces between the polymer region 84A and the liquid crystal regions 84B are formed densely in a direction orthogonal to the alignment direction of the alignment film 75, and are formed coarsely in the alignment direction of the alignment film 75. Therefore, the periods Pv5 and Ph10 are short, and the period Ph9 is long. Moreover, in the region located closer to the alignment film 33 of the close region 30*a*, interfaces between the polymer region 84A and the liquid crystal regions 84B are formed densely in a direction orthogonal to the alignment direction of the alignment film 33, and are formed coarsely in the alignment direction of the alignment film 33.

The polymer region 84A in the far region 30*b* is formed of a polymer material obtained by polymerizing the above-described low-molecular monomer in a state where the low-molecular monomer is aligned by functions of the far regions 30*b* of the alignment films 33 and 75. Therefore, in the far region 30*b*, interfaces between the polymer region 84A and the liquid crystal regions 84B are formed densely in a direction orthogonal to the alignment directions of the alignment films 33 and 75, and are formed coarsely in the alignment directions of the alignment films 33 and 75.

Figure 52:
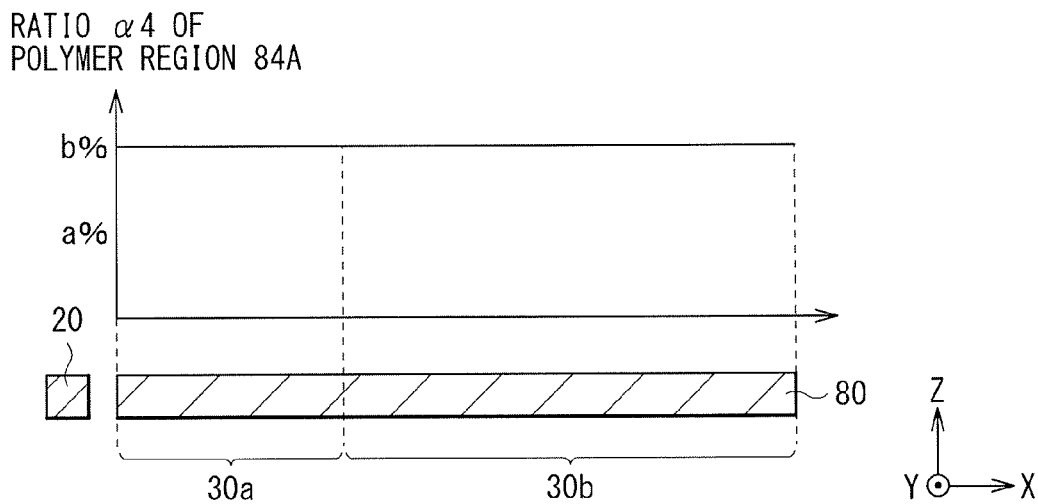
FIG. 52 is a diagram illustrating an example of a ratio of a polymer region in the light modulation layer in FIG. 45.

As illustrated in FIG. 52, a ratio α4 of the polymer region 84A in the light modulation layer 84 is fixed (uniform) or substantially fixed (substantially uniform), irrespective of a distance from the light source 20. The ratio α3 may be, for example, within a range from 50 wt % to 98 wt %, preferably within a range from 75 wt % to 95 wt %, and more preferably within a range of 85 to 92. The ratio α3 is adjustable by, for example, a weight ratio of a low-molecular monomer used as one of materials of the light modulation layer 84, intensity or a total dose of ultraviolet light applied to the low-molecular monomer, and/or the like.

The polymer region 84A and the liquid crystal regions 84B have different response speeds with respect to an electric field. The polymer region 84A has relatively low responsivity with respect to the electric field, and the liquid crystal regions 84B have relatively high responsivity with respect to the electric field. The polymer region 84A is configured to include a polymer material. The polymer region 84A has, for example, a streaky structure or a porous structure which does not respond to an electric field, or a rod-like structure having a response speed slower than that of the liquid crystal region 84B. The polymer region 84A is formed of a polymer material obtained by polymerizing a low-molecular monomer. The polymer region 84A is formed by polymerizing, by one or both of heat and light, a low-molecular monomer with orientation and polymerizability which are aligned along the alignment direction of the liquid crystal region 84B or the alignment directions of the alignment films 33 and 75.

The liquid crystal regions 84B are configured to include a liquid crystal material, and have a response speed sufficiently higher than that of the polymer region 84A. Examples of the liquid crystal material (liquid crystal molecules) included in the liquid crystal regions 84B include rod-like molecules. As liquid crystal molecules included in the liquid crystal regions 84B, liquid crystal molecules having positive dielectric constant anisotropy (a so-called positive type liquid crystal) may be preferably used.

(Optical Anisotropy)

Figure 53:
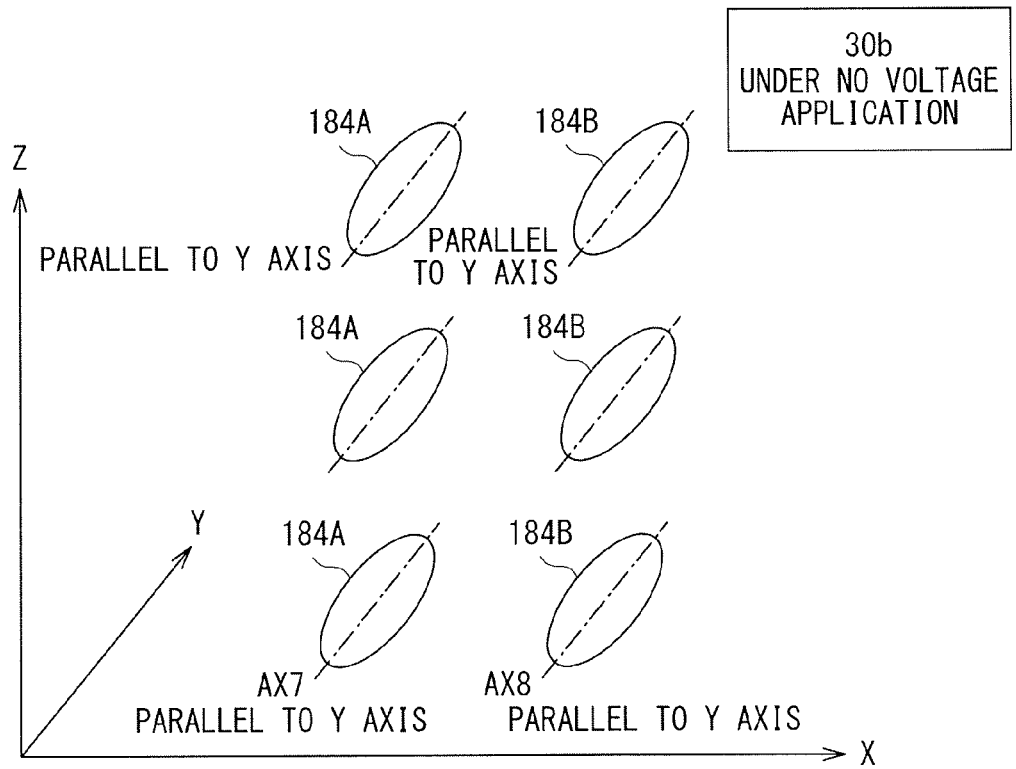
FIG. 53 is a diagram schematically illustrating an example of a function in a far region of the light modulation device in FIG. 44.

FIG. 53 schematically illustrates an example of an alignment state in the polymer region 84A and the liquid crystal regions 84B in the far region 30*b* under no voltage application. An ellipsoid 184A in FIG. 53 is an example of a refractive index ellipsoid exhibiting refractive index anisotropy of the polymer region 84A in the far region 30*b* under no voltage application. An ellipsoid 184B in FIG. 53 is an example of a refractive index ellipsoid exhibiting refractive index anisotropy of the liquid crystal region 84B in the far region 30*b* under no voltage application.

Figure 54:
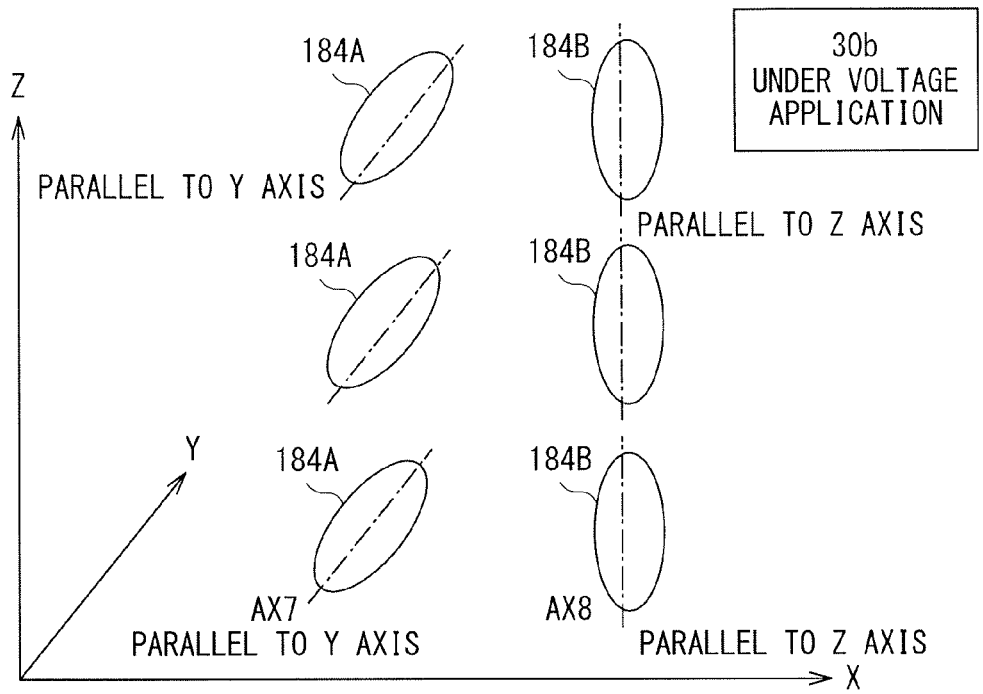
FIG. 54 is a diagram schematically illustrating another example of the function in the far region of the light modulation device in FIG. 44.

FIG. 54 schematically illustrates an example of an alignment state in the polymer region 84A and the liquid crystal regions 84B in the far region 30*b* under voltage application. The ellipsoid 184A in FIG. 54 is an example of a refractive index ellipsoid exhibiting refractive index anisotropy of the polymer region 84A in the far region 30*b* under voltage application. The ellipsoid 184B in FIG. 54 is an example of a refractive index ellipsoid exhibiting refractive index anisotropy of the liquid crystal region 84B in the far region 30*b* under voltage application.

Figure 55:
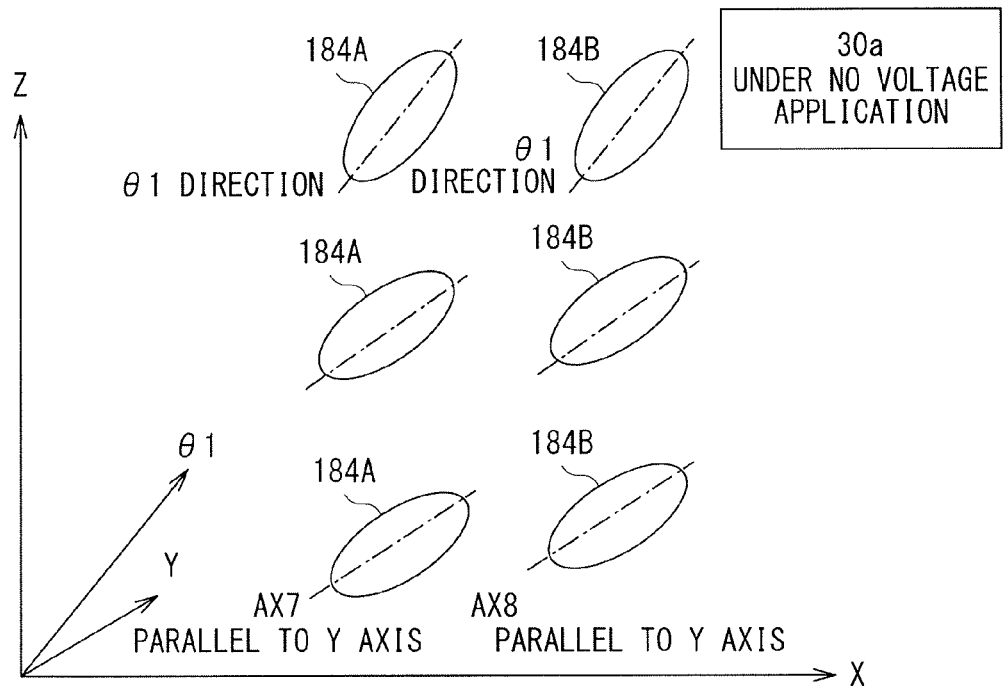
FIG. 55 is a diagram schematically illustrating an example of a function in a close region of the light modulation device in FIG. 44.

FIG. 55 schematically illustrates an example of an alignment state in the polymer region 84A and the liquid crystal regions 84B in the close region 30*a* under no voltage application. The ellipsoid 184A in FIG. 55 is an example of a refractive index ellipsoid exhibiting refractive index anisotropy of the polymer region 84A in the close region 30*a* under no voltage application. The ellipsoid 184B in FIG. 55 is an example of a refractive index ellipsoid exhibiting refractive index anisotropy of the liquid crystal region 84B in the close region 30*a* under no voltage application.

Figure 56:
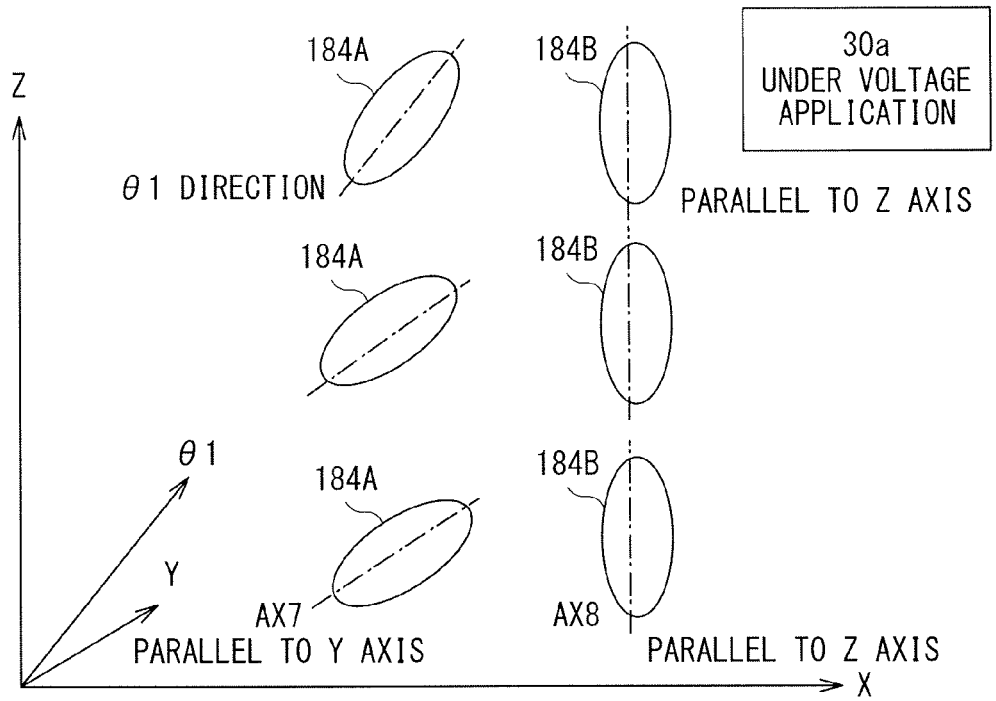
FIG. 56 is a diagram schematically illustrating another example of the function in the close region of the light modulation device in FIG. 44.

FIG. 56 schematically illustrates an example of an alignment state in the polymer region 84A and the liquid crystal regions 84B in the close region 30*a* under voltage application. The ellipsoid 184A in FIG. 56 is an example of a refractive index ellipsoid exhibiting refractive index anisotropy of the polymer region 84A in the close region 30*a* under voltage application. The ellipsoid 184B in FIG. 56 is an example of a refractive index ellipsoid exhibiting refractive index anisotropy of the liquid crystal region 84B in the close region 30*a* under voltage application.

For example, as illustrated in FIG. 53, the polymer region 84A and the liquid crystal region 84B are structured to allow the direction of an optical axis AX7 of the polymer region 84A (more specifically, a major axis of the ellipsoid 184A) and the direction of an optical axis AX8 of the liquid crystal region 84B (more specifically, a major axis of the ellipsoid 184B) in the far region 30*b* to coincide with (be parallel to) each other under no voltage application. It is to be noted that the optical axes AX7 and AX8 each indicate a line parallel to a travel direction of a light beam allowing a refractive index to have one value irrespective of polarization direction. Moreover, it is not necessary for the directions of the optical axis AX7 and the optical axis AX8 to consistently coincide with each other under no voltage application, and the directions of the optical axis AX7 and the optical axis AX8 may be slightly deviated from each other due to, for example, a manufacturing error.

In the liquid crystal region 84B, the optical axis AX8 is parallel or substantially parallel to the light incident surface 10A and parallel or substantially parallel to the surface of the transparent substrate 31 in the far region 30*b* under no voltage application. In a case where the alignment films 33 and 75 have a pretilt function, the optical axis AX8 is parallel or substantially parallel to the light incident surface 10A, and intersects with the surface of the transparent substrate 31 at a predetermined pretilt angle in the far region 30*b* under no voltage application.

On the other hand, in the polymer region 84A, the optical axis AX7 is fixed irrespective of whether or not a voltage is applied. More specifically, the optical axis AX7 is parallel or substantially parallel to the light incident surface 10A and parallel or substantially parallel to the surface of the transparent substrate 31 in the far region 30*b*. In other words, the optical axis AX7 is parallel or substantially parallel to the optical axis AX8 in the far region 30b under no voltage application. In a case where the alignment films 33 and 75 have a pretilt function, the optical axis AX7 is parallel or substantially parallel to the light incident surface 10A, and intersects with the surface of the transparent substrate 31 at a predetermined pretilt angle. In other words, also in this case, the optical axis AX7 is parallel or substantially parallel to the optical axis AX8 under no voltage application.

Ordinary refractive indices of the polymer region 84A and the liquid crystal region 84B may be preferably equal to each other, and extraordinary refractive indices of the polymer region 84A and the liquid crystal region 84B may be preferably equal to each other. In this case, for example, under no voltage application, there is little difference in refractive index in all directions, and high transparency is obtained. Therefore, for example, light from the light source 20 passes through the light modulation layer 84 without being scattered in the light modulation layer 84. As a result, for example, light from the light source 20 (light from an oblique direction) is totally reflected by an interface (an interface between air and the transparent substrate 31 or the light guide plate 10) of a region (transparent region 30A) that is transparent of the light modulation device 80, and luminance (luminance in black display) in the transparent region 30A is decreased, compared to a case where luminance is uniformized.

Moreover, for example, as illustrated in FIG. 54, the polymer region 84A and the liquid crystal regions 84B are structured to allow directions of the optical axes AX7 and AX8 to be different from (intersect with or be orthogonal to) each other in the far region 30b under voltage application. In the liquid crystal regions 84B, under voltage application, the optical axis AX8 is parallel or substantially parallel to the light incident surface 10A and parallel or substantially parallel to the normal to the transparent substrate 31 in the far region 30b.

Therefore, under voltage application, in the light modulation layer 84, a difference in refractive index in all directions is increased to obtain a high scattering property. Accordingly, for example, light from the light source 20 is scattered in the light modulation layer 84. As a result, for example, the light from the light source 20 (light from the oblique direction) passes through an interface of a region in a scattering state (scattering region 30B) in the light modulation device 80, and the light having passed to the reflective plate 40 is reflected by the reflective plate 40 to pass through the light modulation device 80. Therefore, luminance of the scattering region 30B is extremely higher than that in a case where the luminance is uniformized, and luminance in white display is partially increased (partial luminance enhancement) by a reduced amount of the luminance of the transparent region 30A.

It is to be noted that the ordinary refractive indices of the polymer region 84A and the liquid crystal region 84B may be slightly different from each other due to, for example, a manufacturing error, and may be preferably, for example, 0.1 or less, and more preferably 0.05 or less. Moreover, the extraordinary refractive indices of the polymer region 84A and the liquid crystal region 84B may be slightly different from each other due to, for example, a manufacturing error, and may be preferably, for example, 0.1 or less, and more preferably 0.05 or less.

Moreover, a refractive index difference (=extraordinary refractive index-ordinary refractive index) in the polymer region 84A and a refractive index difference (=extraordinary refractive index-ordinary refractive index) in the liquid crystal region 84B may be preferably as large as possible, and may be preferably 0.05 or over, more preferably 0.1 or over, and still more preferably 0.15 or over. It is because, in a case where the refractive index differences in the polymer region 84A and the liquid crystal region 84B are large, the scattering power of the light modulation layer 84 is enhanced to allow light guide conditions to be easily disrupted, thereby allowing light from the light guide plate 10 to be easily extracted.

For example, as illustrated in FIG. 55, the polymer region 84A and the liquid crystal region 84B are structured to allow the direction of the optical axis AX7 of the polymer region 84A and the direction of the optical axis AX8 of the liquid crystal region 84B in the close region 30a to coincide with (be parallel to) each other under no voltage application. It is to be noted that it is not necessary for the directions of the optical axis AX7 and the optical axis AX8 to consistently coincide with each other under no voltage application, and the directions of the optical axis AX7 and the optical axis AX8 may be slightly deviated from each other due to, for example, a manufacturing error.

In the liquid crystal region 84B in the close region 30a, the direction of the optical axis AX8 is changed in a twisting direction from the alignment film 33 side to the alignment film 75 side under no voltage application. More specifically, in the region located closer to the alignment film 33 of the close region 30a, the optical axis AX8 is parallel or substantially parallel to the light incident surface 10A and parallel or substantially parallel to the surface of the transparent substrate 31. In a case where the alignment films 33 and 75 have a pretilt function, in the region located closer to the alignment film 33 of the close region 30a, the optical axis AX8 is parallel or substantially parallel to the light incident surface 10A and intersects with the surface of the transparent substrate 31 at a predetermined pretilt angle under no voltage application. Moreover, in the region located closer to the alignment film 75 of the close region 30a, the optical axis AX8 is oriented in a direction parallel or substantially parallel to a direction (alignment direction) of the angle $\theta1$ under no voltage application. It is to be noted that, in a case where the alignment films 33 and 75 have a pretilt function, in the region located closer to the alignment film 33 of the close region 30a, the optical axis AX8 is oriented in a direction parallel or substantially parallel to the light incident surface 10A and is oriented in a direction intersecting with the surface of the transparent substrate 31 at a predetermined pretilt angle under no voltage application.

In the polymer region 84A, the direction of the optical axis AX7 is changed in a twisting direction from the alignment film 33 side to the alignment film 75 side, irrespective of whether or not a voltage is applied. More specifically, in the region located closer to the alignment film 33 of the close region 30a, the optical axis AX7 is parallel or substantially parallel to the light incident surface 10A and parallel or substantially parallel to the surface of the transparent substrate 31. In other words, in the region located closer to the alignment film 33 of the close region 30a, the optical axis AX7 is parallel or substantially parallel to the optical axis AX8 under no voltage application. It is to be noted that, in a case where the alignment films 33 and 75 have a pretilt function, the optical axis AX7 is parallel or substantially parallel to the light incident surface 10A and intersects with the surface of the transparent substrate 31 at a predetermined pretilt angle. In other words, also in this case, the optical axis AX7 is parallel or substantially parallel to the optical axis AX8 under no voltage application. Moreover, the optical axis AX7 is oriented in a direction parallel or substantially parallel to the direction (alignment direction) of the angle $\theta1$ in the region located closer to the alignment film 75 of the close region 30a. In other words, in the region located closer to the alignment film 75 of the close region 30a, the optical axis AX7 is parallel or the substantially parallel to the optical axis AX8 under no voltage application.

As illustrated in FIG. 56, in the polymer region 84A and the liquid crystal region 84B, for example, under voltage application, the directions of the optical axis AX7 and the optical axis AX8 are different from (intersect with or are orthogonal to) each other in the close region 30a. In the liquid crystal region 84Bd, the optical axis AX8 is parallel or substantially parallel to the light incident surface 10A and parallel or substantially parallel to the normal to the transparent substrate 31 in the close region 30a under voltage application.

Therefore, under voltage application, in the light modulation layer 84, a difference in refractive index in all directions is increased to obtain a high scattering property. Accordingly, for example, light from the light source 20 is scattered in the light modulation layer 84. As a result, for example, light from the light source 20 (light from the oblique direction) passes through an interface of a region in a scattering state (scattering region 30B) in the light modulation device 80, and the light having passed toward the reflective plate 40 is reflected by the reflective plate 40 to pass through the light modulation device 80. Therefore, luminance of the scattering region 30B is extremely higher than that in a case where the luminance is uniformized, and luminance in white display is partially increased (partial luminance enhancement) by a reduced amount of the luminance of the transparent region 30A.

In a case where the angle θ1 (for example, a rubbing angle) is within a range from 60 degrees to less than 90 degrees, contrast of light and dark stripes caused by arrangement of the light source 20 is largely reduced, and luminance unevenness in proximity to the light source 20 is allowed to be nearly eliminated. It is to be noted that, in a case where the light modulation layer 84 easily satisfies A>B>C and A1/C1<A2/C2 by adding a monofunctional monomer (a low-molecular monomer having both polymerizability and a liquid crystal property) to the material of the light modulation layer 84, or by reducing intensity or a total dose of ultraviolet light applied to the material of the light modulation layer 84, the angle θ1 (for example, a rubbing angle) may be preferably within a range from 30 degrees to less than 90 degrees. Moreover, in a case where the light modulation layer 84 more easily satisfies A>B>C and A1/C1<A2/C2 by adding a monofunctional monomer (a low-molecular monomer having both polymerizability and a liquid crystal property) to the material of the light modulation layer 84 and reducing intensity or the total dose of ultraviolet light applied to the material of the light modulation layer 84, the angle θ1 (for example, a rubbing angle) may be preferably within a range from 10 degrees to less than 90 degrees.

(Anisotropic Scattering)

Next, anisotropic scattering in this embodiment will be described below. In this embodiment, anisotropic scattering is caused by (a) nonuniformity of existence probability of interfaces (scattering interfaces) between the polymer region 84A and the liquid crystal regions 84B in the scattering region 30B, and (b) birefringence in the scattering region 30B. Therefore, nonuniformity of existence probability of the scattering interfaces in the scattering region 30B, and birefringence in the scattering region 30B will be described in detail below.

—Nonuniformity of Existence Probability of Scattering Interfaces—

In the scattering region 30B in the far region 30b, the interfaces between the polymer region 84A and the liquid crystal regions 84B are disposed densely in a direction orthogonal to the alignment direction of the alignment film 33, and are disposed coarsely in a direction parallel to the alignment direction of the alignment film 33. In the scattering region 30B in the close region 30a, in the region located closer to the alignment film 33, the interfaces between the polymer region 84A and the liquid crystal regions 84B are disposed densely in a direction orthogonal to the alignment direction of the alignment film 33, and are disposed coarsely in a direction parallel to the alignment direction of the alignment film 33. In the scattering region 30B in the close region 30a, in the region located closer to the alignment film 75, the interfaces between the polymer region 84A and the liquid crystal regions 84B are disposed densely in a direction orthogonal to the alignment direction of the close region 30a of the alignment film 75, and are disposed coarsely in a direction parallel to the alignment direction of the close region 30a of the alignment film 75.

The direction orthogonal to the alignment direction of the alignment film 33 indicates the first direction or the second direction. The direction parallel to the alignment direction of the alignment film 33 indicates the third direction. The direction orthogonal to the alignment direction of the close region 30a of the alignment film 75 indicates a direction orthogonal to a direction intersecting with the light incident surface 10A at the angle θ1 and parallel to the surface of the transparent substrate 31. The direction parallel to the alignment direction of the close region 30a of the alignment film 75 indicates a direction intersecting with the light incident surface 10A at the angle θ1 and parallel to the surface of the transparent substrate 31.

In the far region 30b, light propagating through the scattering region 30B in the first direction enters an interface in periods of an average streaky texture size in a minor-axis direction of the streaky structure in the polymer region 84A. Likewise, in the far region 30b, light propagating through the scattering region 30B in the second direction enters an interface in periods of the average streaky texture size in the minor-axis direction of the streaky structure in the polymer region 84A. Therefore, the light is largely scattered.

In the far region 30b, light propagating through the scattering region 30B in the third direction enters an interface in periods of an average streaky texture size in a major-axis direction of the streaky structure in the polymer region 84A. Therefore, scattering of this light is smaller than scattering of light propagating through the scattering region 30B in the first direction in the far region 30b.

In the region located closer to the alignment film 33 of the close region 30a, light propagating through the scattering region 30B in the first direction enters an interface in periods of the average streaky texture size in the minor-axis direction of the streaky structure in the polymer region 84A. Likewise, in the region located closer to the alignment film 33 of the close region 30a, light propagating through the scattering region 30B in the second direction enters an interface in periods of the average streaky texture size in the minor-axis direction of the streaky structure in the polymer region 84A. Therefore, the light propagating through the scattering region 30B in the first direction and the light propagating through the scattering region 30B in the second direction are largely scattered.

In the region located closer to the alignment film 75 of the close region 30a, light propagating through the scattering region 30B in the first direction enters an interface in periods between the period of the average streaky texture size in the minor-axis direction of the streaky structure in the polymer region 84A and the period of the average streaky texture size in the major-axis direction of the streaky structure in the polymer region 84A. Therefore, scattering of this light is smaller than scattering of light propagating through the scattering region 30B in the first direction in the far region 30b.

In the region located closer to the alignment film 75 of the close region 30a, light propagating through the scattering region 30B in the third direction enters an interface in periods between the period of the average streaky texture size in the minor-axis direction of the streaky structure in the polymer region 84A and the period of the average streaky texture size in the major-axis direction of the streaky structure in the polymer region 84A. Therefore, scattering of this light is smaller than scattering of light propagating through the scattering region 30B in the first direction in the far region 30b.

It is to be noted that a magnitude relationship between scattering of light propagating through the scattering region 30B in the first direction in the region located closer to the alignment film 75 of the close region 30a and scattering of light propagating through the scattering region 30B in the third direction in the region located closer to the alignment film 75 of the close region 30a is dependent on a magnitude relationship between a period of the interface between the polymer region 84A and the liquid crystal region 84B in travel directions of the light propagating through the scattering region 30B in the first direction and the light propagating through the scattering region 30B in the third direction in the region located closer to the alignment film 75 of the close region 30a.

—Birefringence—

In the far region 30b, light propagating through the scattering region 30B in the first direction propagates in periods of the average streaky texture size in the minor-axis direction of the streaky structure in the polymer region 84A while being influenced by a difference between an extraordinary light refractive index of the liquid crystal region 84B and an ordinary light refractive index of the polymer region 84A and a difference between an ordinary light refractive index of the liquid crystal region 84B and an extraordinary light refractive index of the polymer region 84A. Therefore, in the far region 30b, light propagating through the scattering region 30B in the first direction is largely scattered.

In the far region 30b, light propagating through the scattering region 30B in the third direction propagates in periods of the average streaky texture size in the major-axis direction of the streaky structure in the polymer region 84A while being influenced by only a difference between the extraordinary light refractive index of the liquid crystal region 84B and the ordinary light refractive index of the polymer region 84A. Therefore, scattering of light propagating through the scattering region 30B in the third direction in the far region 30b is smaller than scattering of light propagating through the scattering region 30B in the first direction in the far region 30b.

In the region located closer to the alignment film 33 of the close region 30a, light propagating through the scattering region 30B in the first direction propagates in periods of the average streaky texture size in the minor-axis direction of the streaky structure in the polymer region 84A while being influenced by a difference between the extraordinary light refractive index of the liquid crystal region 84B and the ordinary light refractive index of the polymer region 84A and a difference between the ordinary light refractive index of the liquid crystal region 84B and the extraordinary light refractive index of the polymer region 84A. Therefore, in the region located closer to the alignment film 33 of the far region 30b, light propagating through the scattering region 30B in the first direction is largely scattered.

In the region located closer to the alignment film 33 of the close region 30a, light propagating through the scattering region 30B in the third direction propagates in periods of the average streaky texture size in the major-axis direction of the streaky structure in the polymer region 84A while being influenced by only a difference between the extraordinary light refractive index of the liquid crystal region 84B and the ordinary light refractive index of the polymer region 84A. Accordingly, in the region located closer to the alignment film 33 of the close region 30a, scattering of light propagating through the scattering region 30B in the third direction is smaller than scattering of light propagating through the scattering region 30B in the first direction in the far region 30b.

In the region located closer to the alignment film 75 of the close region 30a, light propagating through the scattering region 30B in the first direction propagates in periods between the period of the average streaky texture size in the minor-axis direction of the streaky structure in the polymer region 84A and the period of the average streaky texture size in the major-axis direction of the streaky structure in the polymer region 84A while being influenced by a difference between the extraordinary light refractive index of the liquid crystal region 84B and the ordinary light refractive index of the polymer region 84A and a difference between the ordinary light refractive index of the liquid crystal region 84B and the extraordinary light refractive index of the polymer region 84A. Accordingly, scattering of light propagating through the scattering region 30B in the first direction in the close region 30a is smaller than scattering of light propagating through the scattering region 30B in the first direction in the far region 30b. However, the value of the extraordinary light refractive index in this case is close to that of the ordinary light refractive index by intersection at the angle $\theta 1$; therefore, a scattering property by polarization is weakened.

In the region located closer to the alignment film 75 of the close region 30a, light propagating through the scattering region 30B in the third direction propagates in periods between the period of the average streaky texture size in the minor-axis direction of the streaky structure in the polymer region 84A and the period of the average streaky texture size in the major-axis direction of the streaky structure in the polymer region 84A while being influenced by a difference between the extraordinary light refractive index of the liquid crystal region 84B and the ordinary light refractive index of the polymer region 84A and a difference between the ordinary light refractive index of the liquid crystal region 84B and the extraordinary light refractive index of the polymer region 84A. However, the value of the extraordinary light refractive index in this case is close to that of the ordinary light refractive index by intersection at the angle $\theta 1$; therefore, a scattering property by polarization is weakened.

In a case where the angle $\theta 1$ is within a range from more than 45 degrees to less than 90 degrees, the period of the interface between the polymer region 84A and the liquid crystal region 84B in the first direction is longer than the period of the interface between the polymer region 84A and the liquid crystal region 84B in the third direction. Therefore, in this case, scattering of light propagating through the scattering region 30B in the first direction in the close region 30a is smaller than scattering of light propagating through the scattering region 30B in the third direction in the close region 30a.

Moreover, in a case where the angle $\theta 1$ is within a range from more than 0 degrees to less than 45 degrees, the period of the interface between the polymer region 84A and the liquid crystal region 84B in the first direction is shorter than the period of the interface between the polymer region 84A and the liquid crystal region 84B in the third direction. Therefore, in this case, scattering of light propagating through the scattering region 30B in the first direction in the close region 30a is larger than scattering of light propagating through the scattering region 30B in the third direction in the close region 30a.

In other words, the light modulation layer 84 is configured to exhibit, in the far region 30b, anisotropic scattering in which scattering of light propagating in the first direction is larger than scattering of light propagating in the third direction. Moreover, in a case where the angle θ1 is within a range from more than 45 degrees to less than 90 degrees, the light modulation layer 84 is configured to exhibit, in the close region 30a, anisotropic scattering in which scattering of light propagating in the first direction is smaller than scattering of light propagating in the third direction. Further, in a case where the angle θ1 is within a range from more than 0 degrees to less than 45 degrees, the light modulation layer 84 is configured to exhibit, in the close region 30a, anisotropic scattering in which scattering of light propagating in the first direction is larger than scattering of light propagating in the third direction.

Next, magnitudes of anisotropic scattering in the close region 30a and the far region 30b will be described below.

A magnitude of scattering anisotropy indicates a quotient of three axes, i.e., a magnitude of scattering of light propagating in the first direction (the X-axis direction), a magnitude of scattering of light propagating in the third direction (the Y-axis direction), and a magnitude of scattering of light propagating in the second direction (the Z-axis direction). More specifically, the quotient of three axes indicates a total sum of the following three fractions ((A) to (C)). When the quotient of three axes is large, scattering anisotropy is large, and when the quotient of three axes is small, scattering anisotropy is small. It is to be noted that, in the following fractions (A) to (C), as a precondition, a value of a numerator is larger than a value of a denominator. Therefore, in a case where the value of the numerator is smaller than the value of the denominator, the numerator and denominator may preferably switch places in the following fractions (A) to (C).

(A) (Magnitude of scattering of light propagating in the first direction)/(magnitude of scattering of light propagating in the third direction)

(B) (Magnitude of scattering of light propagating in the second direction)/(magnitude of scattering of light propagating in the third direction)

(C) (Magnitude of scattering of light propagating in the first direction)/(magnitude of scattering of light propagating in the second direction)

The magnitude of scattering anisotropy is determined by (a) nonuniformity of existence probability of the interfaces (scattering interfaces) between the polymer region 84A and the liquid crystal regions 84B in the scattering region 30B, and (b) birefringence in the scattering region 30B. In the magnitude of scattering anisotropy, the above-described factor (a) is dominant. It is because, when existence probability of the scattering interfaces is considered, ideally, a same medium is continued in the third direction; therefore, light is not scattered in the third direction, and is scattered only in the first direction and the second direction. At this time, in a desk plan, scattering in the third direction is zero; therefore, a scattering ratio of the third direction to the first direction and the second direction is infinite. On the other hand, when birefringence is considered, while two polarization components are scattered in the first direction, only one polarization component is scattered in the second direction and the third direction. At this time, a scattering ratio of the first direction to the second direction and the third direction is twice as high at most. Accordingly, in the magnitude of scattering anisotropy, the above-described factor (a) is dominant. Therefore, a relationship between existence probability of the scattering interfaces and the magnitude of scattering anisotropy will be described below, and a relationship between birefringence and the magnitude of scattering anisotropy will not be described.

The magnitude of scattering anisotropy corresponds to a quotient of three axes, i.e., a period in the first direction in the light modulation layer 84, a period in the third direction in the light modulation layer 84, and a period in the second direction in the light modulation layer 84. The quotient of three axes indicates a total sum of the following three fractions ((D) to (F)). It is to be noted that, in the following fractions (D) to (F), as a precondition, a value of a numerator is larger than a value of a denominator. Therefore, in a case where the value of the numerator is smaller than the value of the denominator, the numerator and denominator may preferably switch places in the following (D) to (F).

(D) (Period in the third direction in the light modulation layer 84)/(period in the first direction in the light modulation layer 84)

(E) (Period in the third direction in the light modulation layer 84)/(period in the second direction in the light modulation layer 84)

(F) (Period in the second direction in the light modulation layer 84)/(period in the first direction in the light modulation layer 84)

A magnitude of scattering anisotropy in regions located closer to the alignment film 33 of the close region 30a and the far region 30b has a value corresponding to Ph11/Ph12+Ph11/Pv6+Pv6/Ph12. A magnitude of scattering anisotropy in the region located closer to the alignment film 75 of the close region 30a has a value corresponding to Ph9/Ph10+Ph9/Pv5+Pv5/Ph10. A magnitude of scattering anisotropy in the region located closer to the alignment film 75 of the far region 30b has a value corresponding to Ph11/Ph12+Ph11/Pv6+Pv6/Ph12. Herein, respective periods may have, for example, the following relationship.

$$Ph9/Ph10 < Ph11/Ph12$$

$$Ph9/Pv5 < Ph11/Pv6$$

Pv5/Ph10 is nearly equal to Pv6/Ph12.

Therefore, it can be said that, when the light modulation layer 84 exhibits the scattering property, the light modulation layer 84 is configured to satisfy A>B>C and A1/C1<A2/C2.

The magnitudes of scattering anisotropy in the close region 30a and the far region 30b are different from each other, because the alignment directions in the close region 30a and the far region 30b are different from each other. In this embodiment, as a method of allowing the alignment directions in the close region 30a and the far region 30b to be different from each other, a pair of alignment films 33 and 75 having alignment directions different from each other in the close region 30a are used. More specifically, as the alignment film 33 located closer to the transparent substrate 31, a horizontal alignment film in which the alignment direction is oriented at 0 degrees is used, and as the alignment film 75 located closer to the transparent substrate 37, a horizontal alignment film in which the alignment directions of the far region 30b and the close region 30a are oriented at 0 degrees and θ1 (0 degrees<θ1≤90 degrees), respectively, is used.

Thus, in this embodiment, the magnitude (A1/C1) of scattering anisotropy in the close region 30a closer to the light source 20 of the light modulation layer 84 is smaller than the magnitude (A2/C2) of scattering anisotropy in the far region 30b farther from the light source 20 of the light modulation layer 84. Accordingly, anisotropic scattering of light propagating through the light modulation layer 84 is allowed to be reduced in proximity to the light source 20. Light and dark stripes caused by arrangement of the light source 20 are formed due to a large difference between the first scattering and the third scattering. Therefore, when the above-described anisotropic scattering is reduced in proximity to the light source 20, contrast of light and dark stripes caused by the arrangement of the light source 20 is allowed to be reduced. Moreover, in this embodiment, the above-described anisotropic scattering is reduced only in a region closer to the light source 20 of the light modulation layer 84; therefore, compared to a case where the above-described anisotropic scattering is reduced in the entire light modulation layer 84, high luminance is allowed to be obtained. Further, in this embodiment, since the second scattering is stronger than the third scattering, light from the light source 20 is preferentially scattered in a direction where light guide conditions are disrupted, and light extraction efficiency is increased. Thus, in this embodiment, while high luminance is maintained, contrast of light and dark stripes caused by the arrangement of the light source 20 is allowed to be reduced.

5. Fifth Embodiment

Figure 57:
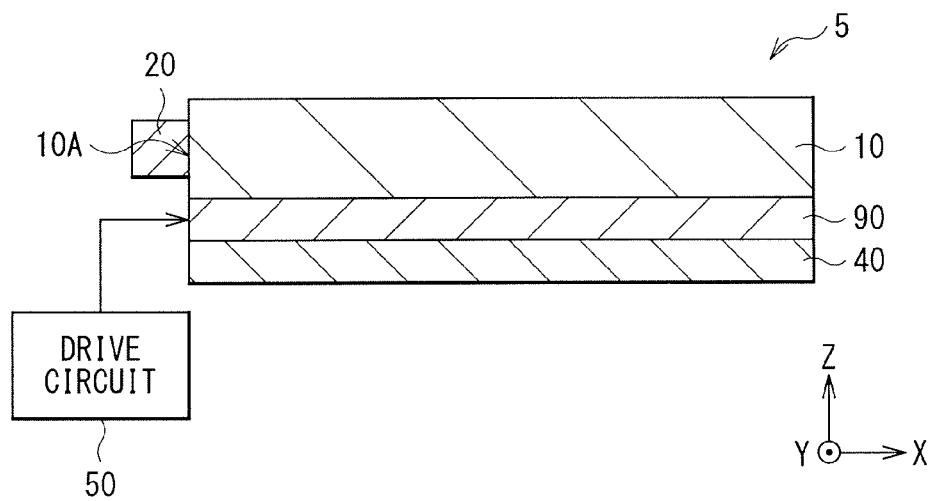
FIG. 57 is a diagram illustrating an example of a schematic configuration of an illumination unit according to a fifth embodiment of the present technology.

Next, an illumination unit 5 according to a fifth embodiment of the present technology will be described below. The illumination unit 5 according to this embodiment is different from the configuration of the illumination unit 1 according to the above-described embodiment in that, as illustrated in FIG. 57, a light modulation device 90 is provided instead of the light modulation device 30. Therefore, description will be given of, mainly, points different from the configuration of the above-described respective embodiments, and points common to the configuration of the above-described respective embodiments will not be further described.

Figure 58:
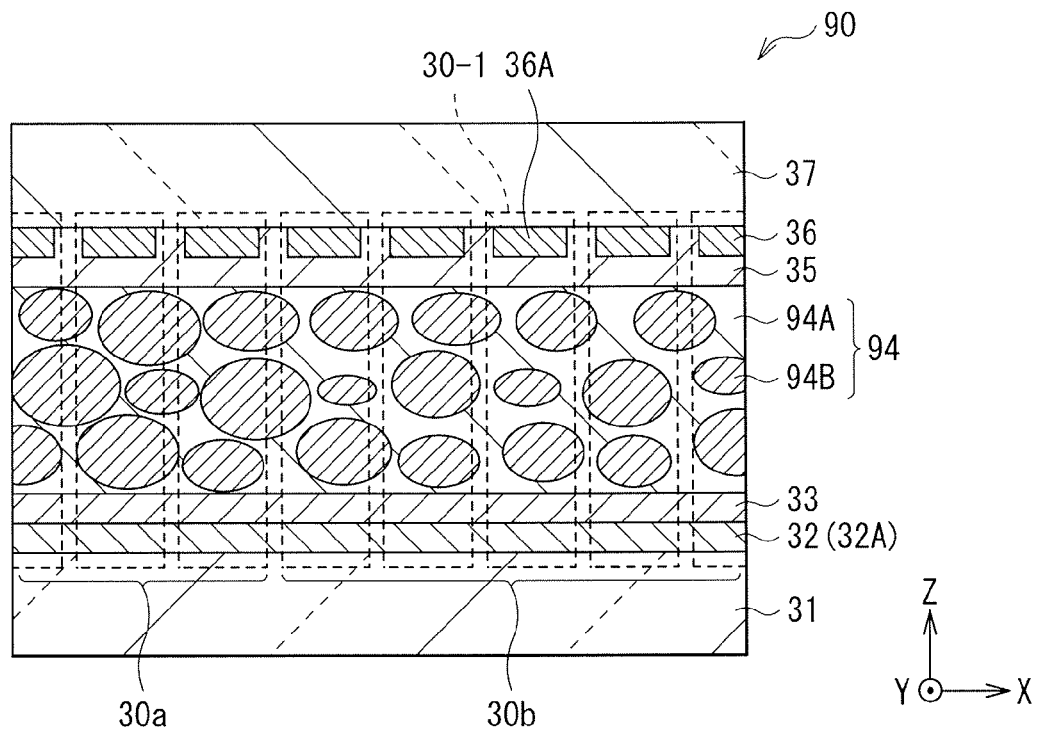
FIG. 58 is a diagram illustrating an example of a sectional configuration in an XZ plane of a light modulation device in FIG. 57.

FIG. 58 illustrates an example of a sectional configuration of the light modulation device 90. In the light modulation device 90, for example, the transparent substrate 31, the lower electrode 32, the alignment film 33, a light modulation layer 94, the alignment film 35, the upper electrode 36, and the transparent substrate 37 are arranged in order from the reflective plate 40. The alignment films 33 and 35 are so disposed as to sandwich the light modulation layer 94 therebetween. The light modulation layer 94 is configured to satisfy the following two expressions (A>B>C and A1/C1<A2/C2) when the light modulation layer 94 exhibits a scattering property.

A part of the light modulation layer 94 or the entire light modulation layer 94 exhibits a scattering property or transparency with respect to light from the light source 20, depending on magnitude of an electric field. The light modulation layer 94 exhibits transparency with respect to light from the light source 20, for example, under no voltage application. Moreover, the light modulation layer 94 exhibits the scattering property with respect to light from the light source 20, for example, under voltage application. For example, as illustrated in FIG. 58, the light modulation layer 94 is a composite layer including a polymer region 94A and a plurality of liquid crystal regions 94B dispersed in the polymer region 94A. The polymer region 94A and the liquid crystal regions 94B have optical anisotropy. It is to be noted that the liquid crystal region 94B corresponds to a specific example of "first region" in the present technology, and the polymer region 94A corresponds to a specific example of "second region" in the present technology.

The polymer region 94A and the liquid crystal regions 94B have different response speeds with respect to an electric field. The polymer region 94A has relatively low responsivity with respect to the electric field, and the liquid crystal regions 94B have relatively high responsivity with respect to the electric field. The polymer region 94A is configured to include a polymer material. The polymer region 94A has, for example, a streaky structure or a porous structure which does not respond to an electric field, or a rod-like structure having a response speed slower than that of the liquid crystal region 94B. The polymer region 94A is formed of a polymer material obtained by polymerizing a low-molecular monomer. The polymer region 94A is formed by polymerizing, by one or both of heat and light, a low-molecular monomer with orientation and polymerizability which are aligned along the alignment direction of the liquid crystal region 94B or the alignment directions of the alignment films 33 and 35.

The liquid crystal regions 94B are configured to include a liquid crystal material, and have a response speed sufficiently higher than that of the polymer region 94A. Examples of the liquid crystal material (liquid crystal molecules) included in the liquid crystal regions 94B include rod-like molecules. As liquid crystal molecules included in the liquid crystal regions 94B, liquid crystal molecules having positive dielectric constant anisotropy (a so-called positive type liquid crystal) may be preferably used.

The liquid crystal region 94B is made of the same material as that of the liquid crystal region 34B in the above-described embodiment. Also, the polymer region 94A is made of the same material as that of the polymer region 34A in the above-described embodiment. However, in the polymer region 94A, materials used for the close region 30a and the far region 30b are different from each other. More specifically, a weight ratio of a monomer (one or both of a monofunctional monomer and a multifunctional monomer) having both polymerizability and a liquid crystal property added to the material of the polymer region 94A is increased with a decreasing distance to the light source 20.

The polymer region 94A of the close region 30a is formed, for example, by polymerizing a bifunctional monomer as one of the above-described low-molecular monomer and one or both of a monofunctional monomer and a multifunctional monomer. On the other hand, the polymer region 94A of the far region 30b is formed, for example, by polymerizing a bifunctional monomer as one of the above-described low-molecular monomer, and is formed without adding the monofunctional or multifunctional monomer. It is to be noted that the polymer region 94A of the far region 30b may be formed, for example, by polymerizing a bifunctional monomer as one of the above-described low-molecular monomer and one or both of a monofunctional monomer and a multifunctional monomer having a smaller weight percent than that used to form the polymer region 94A included in the close region 30a.

It is to be noted that a transition region may be provided in proximity to a boundary between the close region 30a and the far region 30b. The transition region includes the polymer region 94A formed of a material with a weight ratio between a weight ratio of the material of the polymer region 94A in the close region 30a and a weight ratio of the material of the polymer region 94A in the far region 30b.

The bifunctional monomer contributes to an improvement in crosslink density, and is a material suitable to form a streaky structure. On the other hand, the multifunctional monomer contributes to an improvement in crosslink density more than the bifunctional monomer. The multifunctional monomer is a material suitable to form a more complicated three-dimensional structure than the streaky structure, and is an additive suitable to break the streaky structure. Moreover, the monofunctinoal monomer contributes to a reduction in crosslink density, and is an additive suitable to break the streaky structure. Therefore, as described above, since a weight ratio of a monomer added to the material of the polymer region 94A and having both polymerizability and the a liquid crystal property is increased with a decreasing distance to the light source 20, a ratio of the polymer region 94A in the light modulation layer 94 is relatively low in the close region 30a and relatively high in the far region 30b, for example, as with the distributions illustrated in FIGS. 5 to 7.

Therefore, in this embodiment, a magnitude (A1/C1) of scattering anisotropy in the close region 30a closer to the light source 20 of the light modulation layer 94 is smaller than a magnitude (A2/C2) of scattering anisotropy in the far region 30b farther from the light source 20 of the light modulation layer 94. Accordingly, anisotropic scattering of light propagating through the light modulation layer 94 is allowed to be reduced in proximity to the light source 20. Light and dark stripes caused by arrangement of the light source 20 are formed due to a large difference between the first scattering and the third scattering. Therefore, when the above-described anisotropic scattering is reduced in proximity to the light source 20, contrast of light and dark stripes caused by the arrangement of the light source 20 is allowed to be reduced. Moreover, in this embodiment, the above-described anisotropic scattering is reduced only in a region closer to the light source 20 of the light modulation layer 94; therefore, compared to a case where the above-described anisotropic scattering is reduced in the entire light modulation layer 94, high luminance is allowed to be obtained. Further, in this embodiment, since the second scattering is stronger than the third scattering, light from the light source 20 is preferentially scattered in a direction where light guide conditions are disrupted, and light extraction efficiency is increased. Thus, in this embodiment, while high luminance is maintained, contrast of light and dark stripes caused by the arrangement of the light source 20 is allowed to be reduced.

6. Sixth Embodiment

Figure 59:
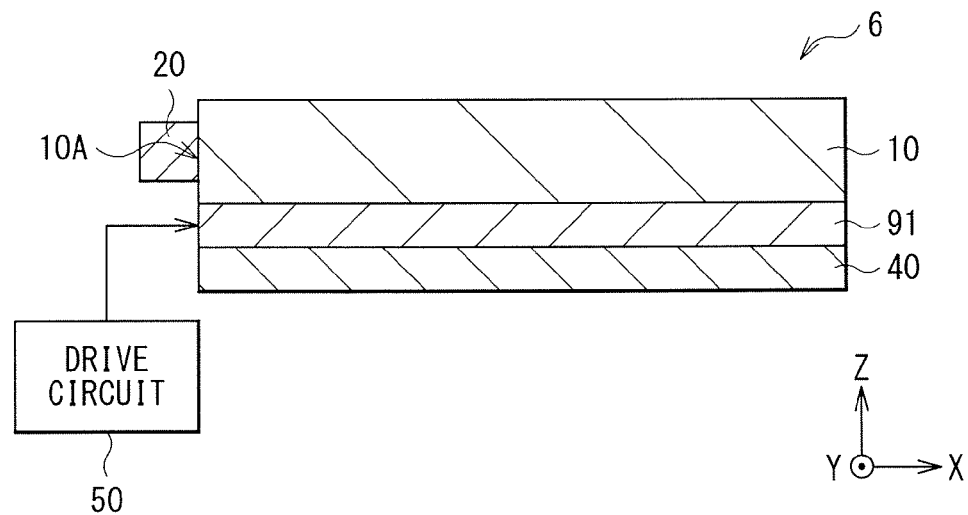
FIG. 59 is a diagram illustrating an example of a schematic configuration of an illumination unit according to a sixth embodiment of the present technology.

Next, an illumination unit 6 according to a sixth embodiment of the present technology will be described below. The illumination unit 6 according to this embodiment is different from the configuration of the illumination unit 1 according to the above-described embodiment in that, as illustrated in FIG. 59, a light modulation device 91 is provided instead of the light modulation device 30. Therefore, description will be given of, mainly, points different from the configuration of the above-described respective embodiments, and points common to the configuration of the above-described respective embodiments will not be further described as appropriate.

Figure 60:
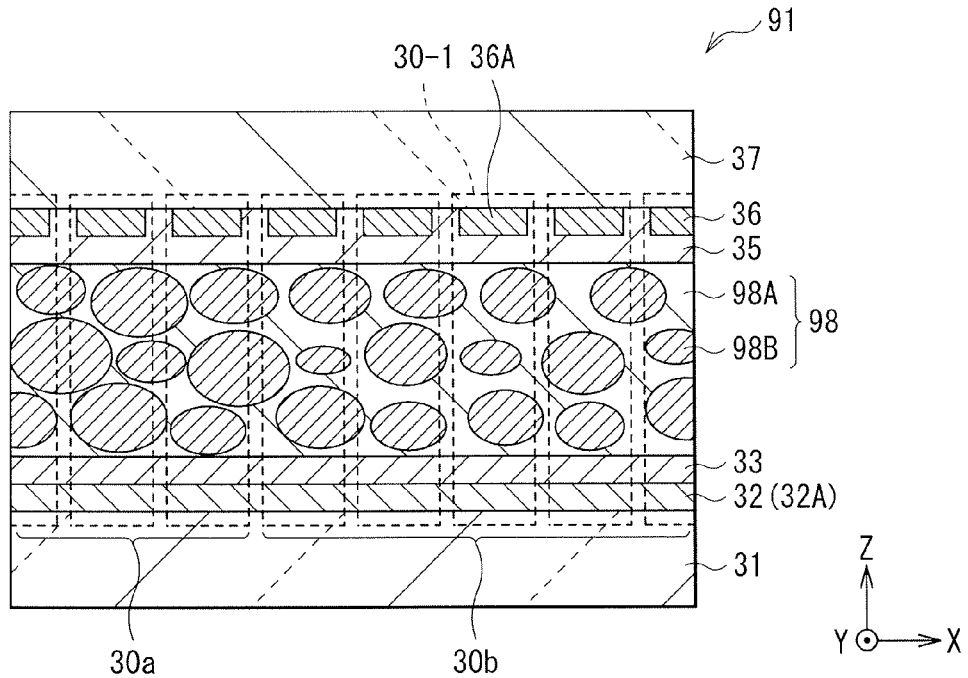
FIG. 60 is a diagram illustrating an example of a sectional configuration in an XZ plane of a light modulation device in FIG. 59.

FIG. 60 illustrates an example of a sectional configuration of the light modulation device 91. In the light modulation device 91, for example, the transparent substrate 31, the lower electrode 32, the alignment film 33, a light modulation layer 98, the alignment film 35, the upper electrode 36, and the transparent substrate 37 are arranged in order from the reflective plate 40. The modulation layer 98 is configured to satisfy the following A>B>C and A1/C1<A2/C2 when the light modulation layer 98 exhibits a scattering property.

A part of the light modulation layer 98 or the entire light modulation layer 98 exhibits a scattering property or transparency with respect to light from the light source 20, depending on magnitude of an electric field. The light modulation layer 98 exhibits transparency with respect to light from the light source 20, for example, under no voltage application. Moreover, the light modulation layer 98 exhibits the scattering property with respect to light from the light source 20, for example, under voltage application. For example, as illustrated in FIG. 60, the light modulation layer 98 is a composite layer including a polymer region 98A and a plurality of liquid crystal regions 98B dispersed in the polymer region 98A. The polymer region 98A and the liquid crystal regions 98B have optical anisotropy. It is to be noted that the liquid crystal region 98B corresponds to a specific example of "first region" in the present technology, and the polymer region 98A corresponds to a specific example of "second region" in the present technology.

The polymer region 98A and the liquid crystal regions 98B have different response speeds with respect to an electric field. The polymer region 98A has relatively low responsivity with respect to the electric field, and the liquid crystal regions 98B have relatively high responsivity with respect to the electric field. The polymer region 98A has, for example, a streaky structure or a porous structure which does not respond to an electric field, or a rod-like structure having a response speed slower than that of the liquid crystal region 98B. The polymer region 98A is formed of a polymer material obtained by polymerizing a low-molecular monomer. The polymer region 98A is formed by polymerizing, by one or both of heat and light, a low-molecular monomer with orientation and polymerizability which are aligned along the alignment direction of the liquid crystal region 98B or the alignment directions of the alignment films 33 and 35.

The liquid crystal regions 98B are configured to include a liquid crystal material, and have a response speed sufficiently higher than that of the polymer region 98A. Examples of the liquid crystal material (liquid crystal molecules) included in the liquid crystal regions 98B include rod-like molecules. As liquid crystal molecules included in the liquid crystal regions 98B, liquid crystal molecules having positive dielectric constant anisotropy (a so-called positive type liquid crystal) may be preferably used.

Figure 61:
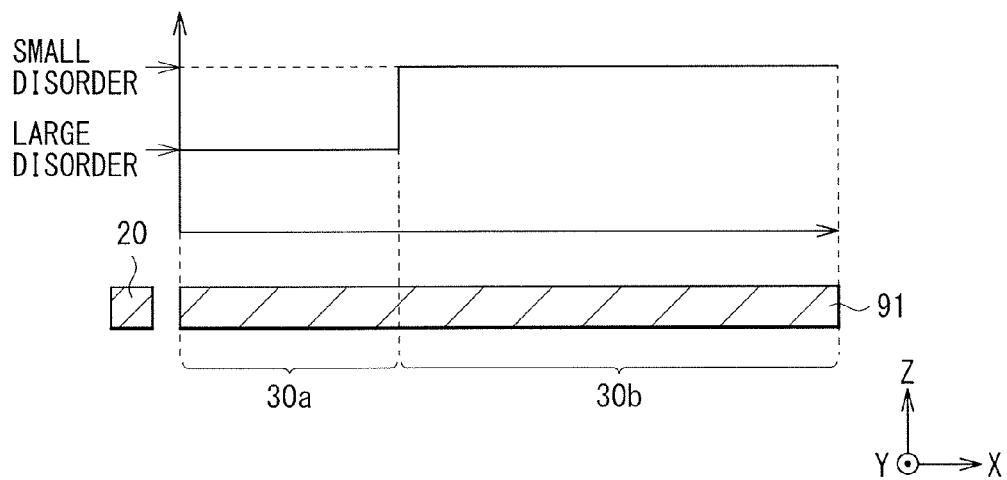
FIG. 61 is a diagram illustrating an example of orientation of a polymer region.
Figure 62:
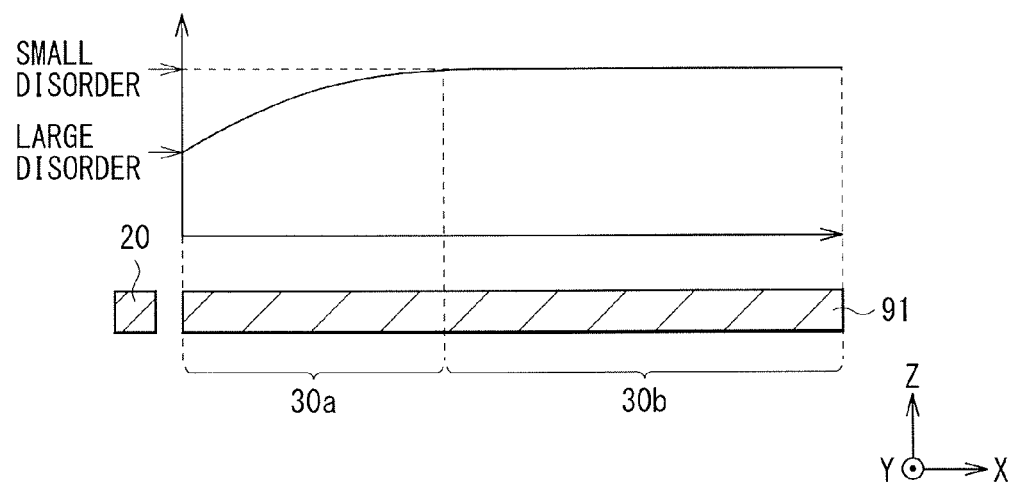
FIG. 62 is a diagram illustrating another example of orientation of the polymer region.
Figure 63:
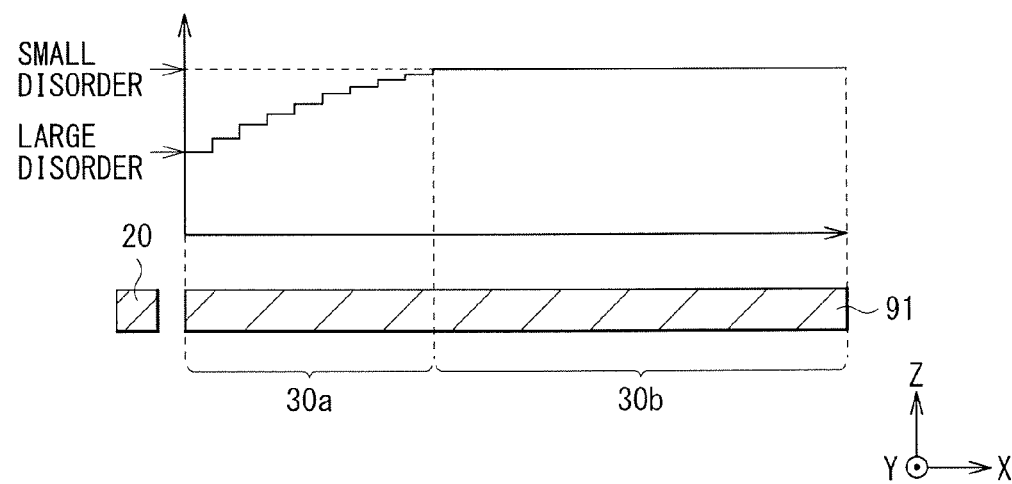
FIG. 63 is a diagram illustrating still another example of orientation of the polymer region.

The liquid crystal region 98B is made of the same material as that of the liquid crystal region 34B in the above-described embodiment. Also, the polymer region 98A is made of the same material as that of the polymer region 34A in the above-described embodiment. However, in the polymer region 98A, the close region 30a and the far region 30b are different from each other in a way of structural disorder (collapse) in the streaky structure, the porous structure, or the rod-like structure. More specifically, as illustrated in FIGS. 61, 62, and 63, the above-described disorder (collapse) is relatively large in the close region 30a of the polymer region 94A, and is relatively small in the far region 30b of the polymer region 94A. It is to be noted that, FIG. 55 illustrates, as an example, a case where the above-described disorder (collapse) is fixed in the close region 30a and is fixed also in the far region 30b. Moreover, FIG. 56 illustrates, as an example, a case where the above-described disorder (collapse) is smoothly reduced with an increasing distance from the light source 20 in the close region 30a. Further, FIG. 57 illustrates, as an example, a case where the above-described disorder (collapse) is intermittently (in a stepwise way) reduced with an increasing distance from the light source 20 in the close region 30a.

The above-described disorder (collapse) being small means that the polymer region 98A has high orientation, and the above-described disorder (collapse) being large means that the polymer region 98A has low orientation. Therefore, as described above, when the structural disorder (collapse) in the polymer region 94A is increased with a decreasing distance to the light source 20, anisotropic scattering in the close region 30a is allowed to be reduced more than anisotropic scattering in the far region 30b.

Examples of a method of inducing the above-described disorder (collapse) include adjusting intensity or a total dose of ultraviolet light when manufacturing the light modulation layer 98.

The intensity of ultraviolet light is adjustable, for example, by using a gray mask. For example, the disorder (collapse) is allowed to be induced by applying ultraviolet light to a mixture of a liquid crystal material and a low-molecular monomer having both polymerizability and a liquid crystal property through a gray mask in which transmittance of ultraviolet light in a region farther from the light source 20 is higher than that in a region closer to the light source 20. Therefore, the light modulation layer 98 may be formed by applying ultraviolet light through the gray mask in which transmittance of ultraviolet light in the region farther from the light source 20 is higher than that in the region closer to the light source 20.

The intensity of ultraviolet light is adjustable, for example, by using an LED emitting ultraviolet light. The above-described disorder (collapse) is allowed to be induced by applying LED light in an ultraviolet region to a mixture of a liquid crystal material and a low-molecular monomer having both polymerizability and a liquid crystal property so as to allow the intensity of ultraviolet light applied to the region farther from the light source 20 to be larger than that applied to the region closer to the light source 20. Therefore, the light modulation layer 98 may be formed by applying LED light in an ultraviolet region so as to allow the intensity of ultraviolet light applied to the region farther from the light source 20 to be higher than that applied to the region closer to the light source 20.

The total dose of ultraviolet light is adjustable, for example, by using an LED emitting ultraviolet light. For example, the above-described disorder (collapse) is allowed to be induced by applying pulses of LED light in an ultraviolet region to a mixture of a liquid crystal material and a low-molecular monomer having both polymerizability and a liquid crystal property so as to allow the total dose of ultraviolet light applied to the region farther from the light source 20 to be larger than that applied to the region located closer to the light source 20. Therefore, the light modulation layer 98 may be formed by applying pulses of LED light in an ultraviolet region so as to allow the total dose of ultraviolet light applied to the region farther from the light source 20 to be larger than that applied to the region closer to the light source 20. Moreover, in a case where the above-described mixture is exposed to light while being transported with use of a conveyor belt for transport in a manufacturing process, speed of the conveyor belt may be adjusted so as to allow the total dose of ultraviolet light applied to the region farther from the light source 20 to be larger than that that applied to the region closer to the light source 20.

In this embodiment, the magnitude (A1/C1) of scattering anisotropy in the close region 30a closer to the light source 20 of the light modulation layer 98 is smaller than the magnitude (A2/C2) of scattering anisotropy in the far region 30b farther from the light source 20 of the light modulation layer 98. Accordingly, anisotropic scattering of light propagating through the light modulation layer 98 is allowed to be reduced in proximity to the light source 20. Light and dark stripes caused by arrangement of the light source 20 are formed due to a large difference between the first scattering and the third scattering. Therefore, when the above-described anisotropic scattering is reduced in proximity to the light source 20, contrast of light and dark stripes caused by the arrangement of the light source 20 is allowed to be reduced. Moreover, in this embodiment, the above-described anisotropic scattering is reduced only in a region closer to the light source 20 of the light modulation layer 98; therefore, compared to a case where the above-described anisotropic scattering is reduced in the entire light modulation layer 98, high luminance is allowed to be obtained. Further, in this embodiment, since the second scattering is stronger than the third scattering, light from the light source 20 is preferentially scattered in a direction where light guide conditions are disrupted, and light extraction efficiency is increased. Thus, in this embodiment, while high luminance is maintained, contrast of light and dark stripes caused by the arrangement of the light source 20 is allowed to be reduced.

7. Modification Examples

Modification Example 1

Figure 64:
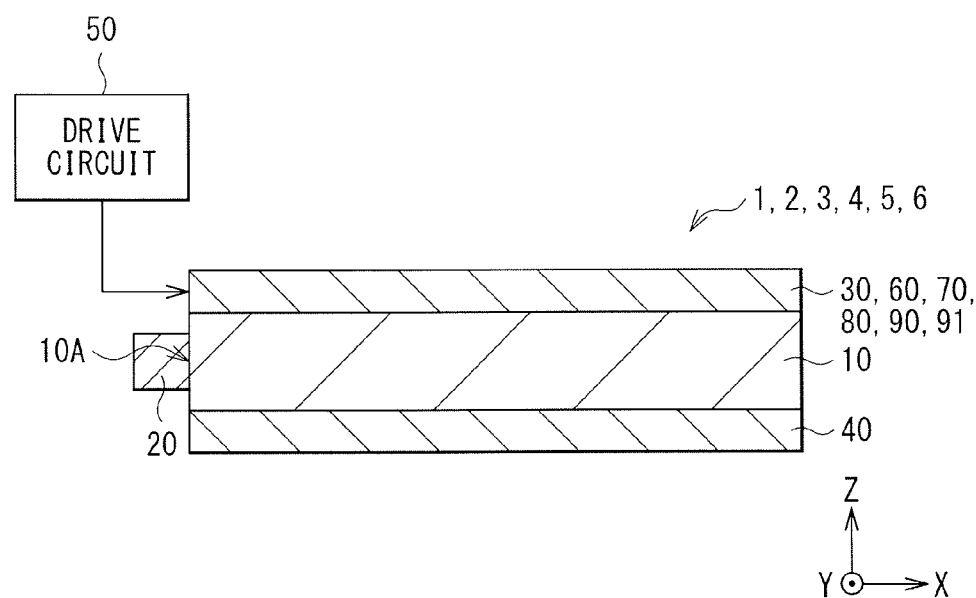
FIG. 64 is a diagram illustrating a first modification example of any of the schematic configurations of the illumination units in FIGS. 1, 19, 32, 44, 57, and 59.
Figure 65:
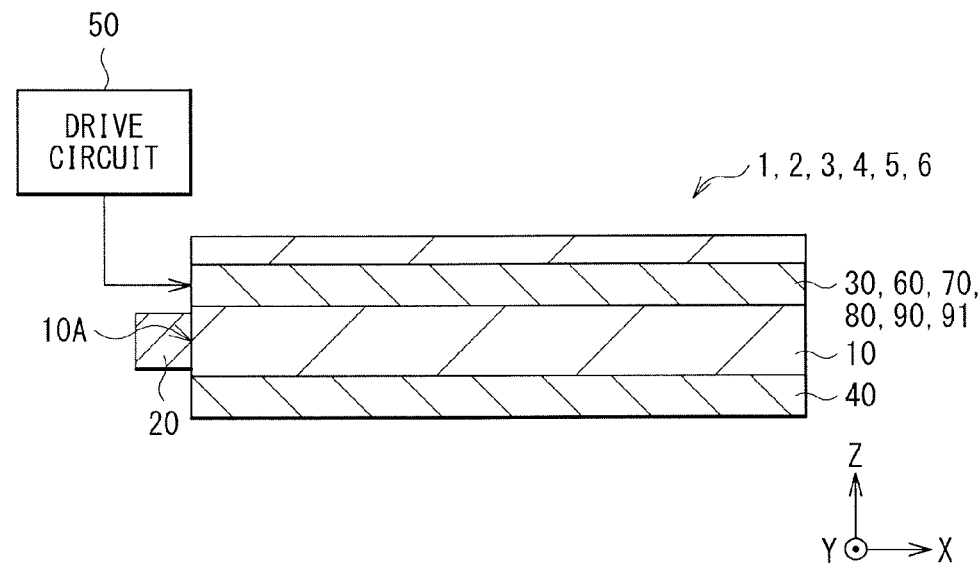
FIG. 65 is a diagram illustrating a second modification example of any of the schematic configurations of the illumination units in FIGS. 1, 19, 32, 44, 57, and 59.

In the above-described embodiments, the light modulation devices 30, 60, 70, 80, 90, and 91 are each in close contact with and are bonded to a back side (a bottom surface) of the light guide plate 10 without an air layer in between; however, for example, as illustrated in FIG. 64, the light modulation devices 30, 60, 70, 80, 90, and 91 each may be in close contact with and bonded to a top surface of the light guide plate 10 without an air layer in between. Moreover, for example, as illustrated in FIG. 65, the light modulation devices 30, 60, 70, 80, 90, and 91 each may be disposed in the light guide plate 10. However, also in this case, it is necessary for the light modulation devices 30, 60, 70, 80, 90, and 91 to be in close contact with and bonded to the light guide plate 10 without an air layer in between.

Modification Example 2

Figure 66:
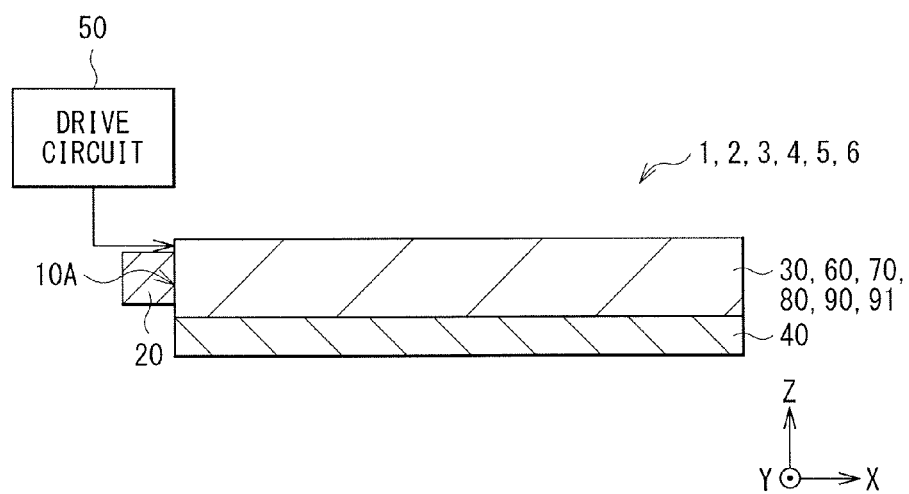
FIG. 66 is a diagram illustrating a third modification example of any of the schematic configurations of the illumination units in FIGS. 1, 19, 32, 44, 57, and 59.

In the above-described embodiments and modification examples thereof, the light guide plate 10 is provided; however, as illustrated in FIG. 66, the light guide plate 10 may not be provided. However, in this case, the transparent substrate 31 and the transparent substrate 37 serve as the light guide plate 10. Therefore, the light source 20 is disposed on a side surface of the transparent substrate 31 or the transparent substrate 37.

Modification Example 3

Figure 67:
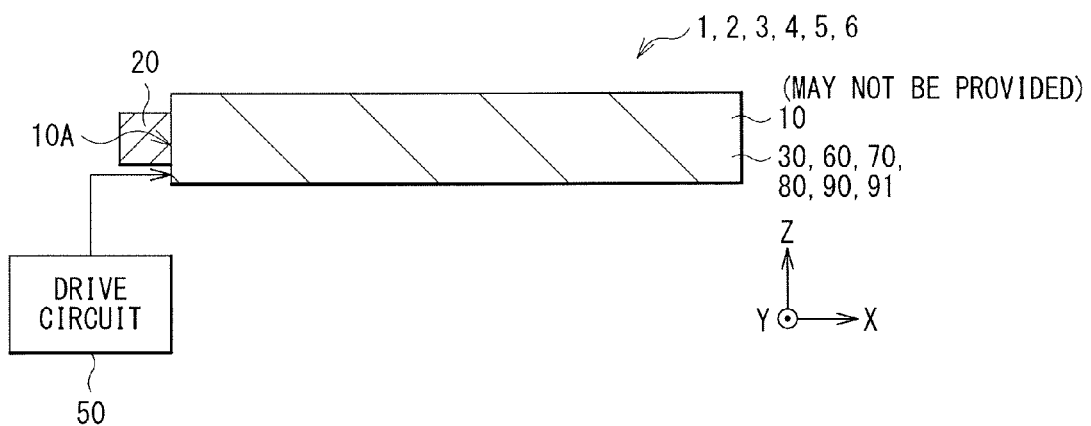
FIG. 67 is a diagram illustrating a fourth modification example of any of the schematic configurations of the illumination units in FIGS. 1, 19, 32, 44, 57, and 59.

In the above-described embodiments and modification examples thereof, the reflective plate 40 is provided; however, as illustrated in FIG. 67, the reflective plate 40 may not be provided. However, in this case, the lower electrode 32 may be preferably made of not a transparent material but, for example, metal. In a case where the lower electrode 32 is made of metal, as with the reflective plate 40, the lower electrode 32 also has a function of reflecting light incident on the light modulation device 30 from a back of the light guide plate 10. It is to be noted that, in this modification example, as with the above-described Modification Example 2, the light guide plate 10 may not be provided.

Modification Example 4

Figure 68:
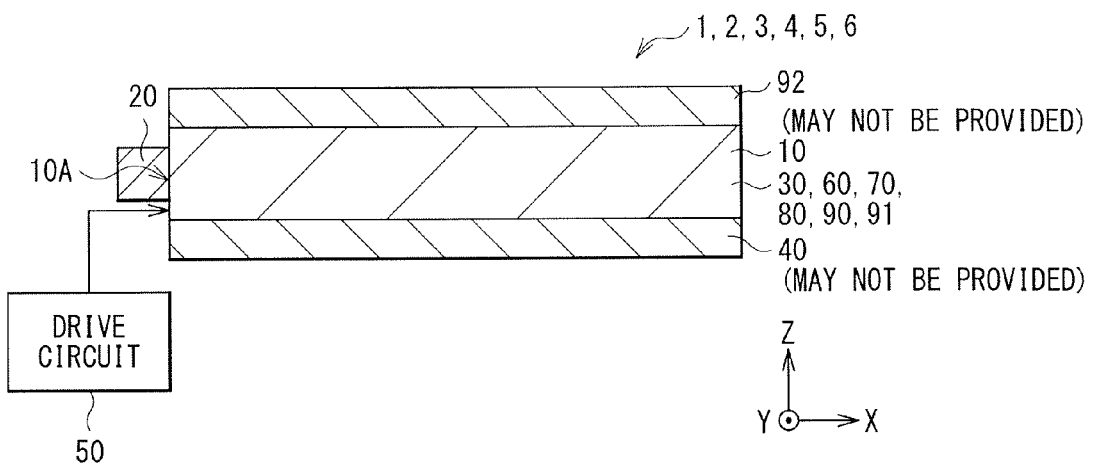
FIG. 68 is a diagram illustrating a fifth modification example of any of the schematic configurations of the illumination units in FIGS. 1, 19, 32, 44, 57, and 59.

In the above-described embodiments and modification examples thereof, no optical sheet is provided on a light exit surface; however, for example, as illustrated in FIG. 68, an optical sheet 92 (for example, a diffuser plate, a diffuser sheet, a lens film, a polarization splitter sheet, or the like) may be provided. In such a case, a part of light emitted from the light guide plate 10 in an oblique direction rises in the front direction; therefore, a modulation ratio is allowed to be effectively improved. It is to be noted that, in this modification example, as with the above-described Modification Example 2, the light guide plate 10 may not be provided. Moreover, in this modification example, as with the above-described Modification Example 3, the reflective plate 40 may not be provided. Further, in this modification example, the light guide plate 10 and the reflective plate 40 both may not be provided.

Modification Example 5

Figure 69:
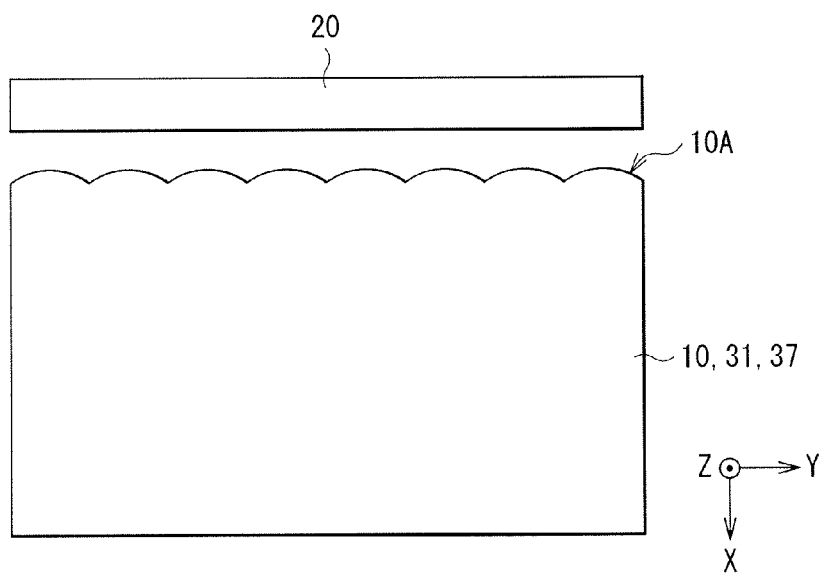
FIG. 69 is a diagram illustrating a first modification example of a light guide plate or a transparent substrate in any of the illumination units in FIGS. 1, 19, 32, 44, 57, and 59.

In the above-described embodiments and modification examples thereof, for example, as illustrated in FIG. 69, an end surface (the light incident surface 10A) of the light guide plate 10, the transparent substrate 31, or the transparent substrate 37 may have a three-dimensional shape expanding a divergent angle of light from the light source 20. For example, the light incident surface 10A may have a cylindrical shape, a prism shape, or a convex shape corresponding to arrangement of the light source 20. When the light incident surface 10A has the above-described shape, the divergent angle of light incident on the light modulation device 30, 60, or 70 is allowed to be expanded. Therefore, anisotropic scattering of light propagating through the light modulation layer 34, 64, 74, 84, 94, or 98 is allowed to be reduced in proximity to the light source 20 by expansion of the divergent angle. As a result, while high luminance is maintained, contrast of light and dark stripes caused by the arrangement of the light source 20 is allowed to be reduced.

Modification Example 6

Figure 70:
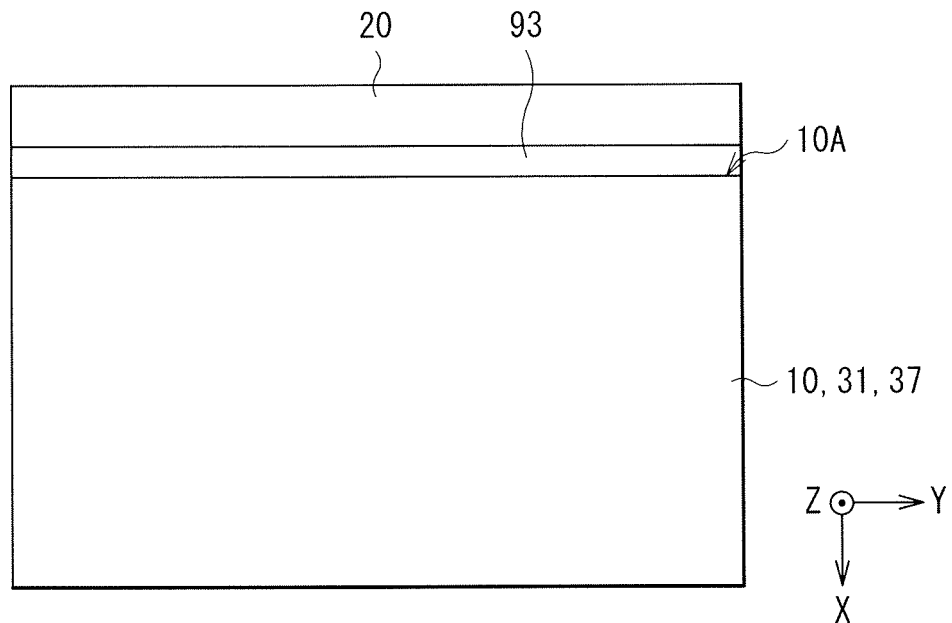
FIG. 70 is a diagram illustrating a second modification example of the light guide plate or the transparent substrate in any of the illumination units in FIGS. 1, 19, 32, 44, 57, and 59.

In the above-described embodiments and modification examples thereof, for example, as illustrated in FIG. 70, a matching oil 93 (an oil for refractive index matching) filled in a gap between the light incident surface 10A and the light source 20 may be provided. When the matching oil 93 is provided to the gap between the light incident surface 10A and the light source 20 in such a manner, the divergent angle of light incident on the light modulation device 30, 60, 70, 80, 90, or 91 is allowed to be expanded. Therefore, anisotropic scattering of light propagating through the light modulation layer 34, 64, 74, 84, 94, or 98 is allowed to be reduced in proximity to the light source 20 by expansion of the divergent angle. As a result, while high luminance is maintained, contrast of light and dark stripes caused by the arrangement of the light source 20 is allowed to be reduced.

Modification Example 7

Figure 71:
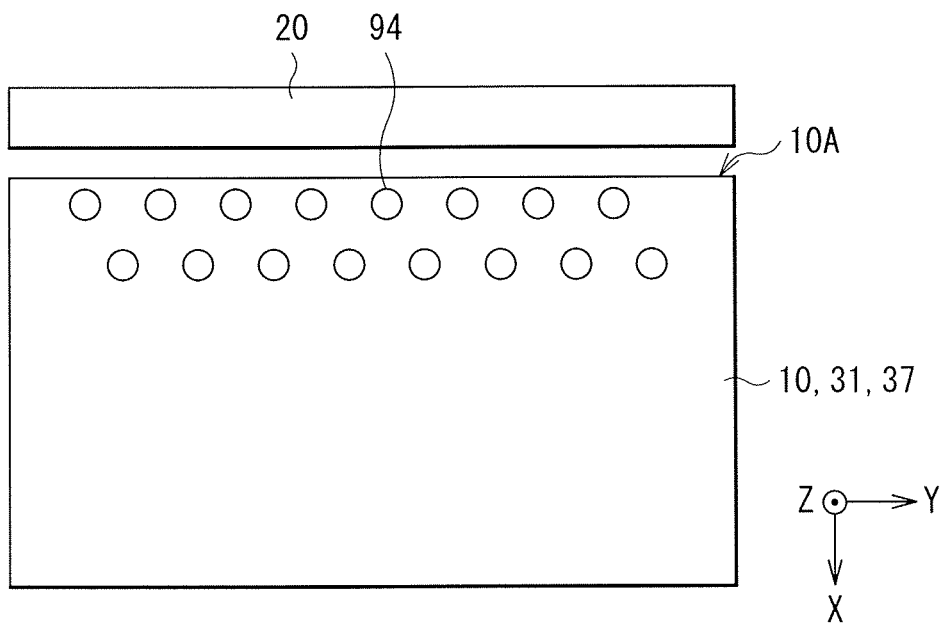
FIG. 71 is a diagram illustrating a third modification example of the light guide plate or the transparent substrate in any of the illumination units in FIGS. 1, 19, 32, 44, 57, and 59.

In the above-described embodiments and modification examples thereof, for example, as illustrated in FIG. 71, spacers 94 formed of a material with a refractive index different from that of the light guide plate 10, the transparent substrate 31, or the transparent substrate 37 may be provided to at least a region in proximity to the light source 20 of the light guide plate 10, the transparent substrate 31, or the transparent substrate 37. When spacers 82 are provided to at least the region in proximity to the light source 20 of the transparent substrate 31 or the transparent substrate 37 in such a manner, at least light propagating through the region in proximity to the light source 20 of the light guide plate 10, the transparent substrate 31, or the transparent substrate 37 is refracted or scattered by the spacers 82. Therefore, anisotropic scattering of light propagating through the light modulation layer 34, 64, 74, 84, 94, or 98 is allowed to be reduced in proximity to the light source 20 by refraction or scattering by the spacers 82. As a result, while high luminance is maintained, contrast of light and dark stripes caused by the arrangement of the light source 20 is allowed to be reduced.

8. Seventh Embodiment

Figure 72:
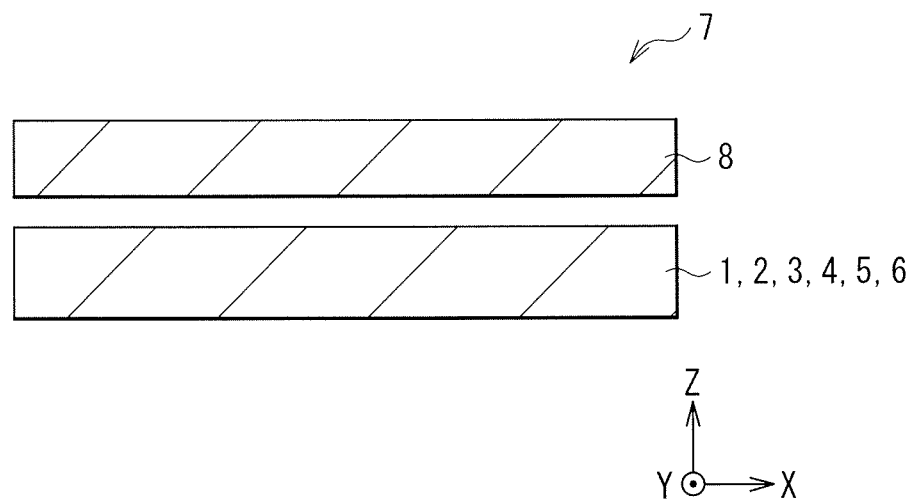
FIG. 72 is a diagram illustrating an example of a display unit according to a seventh embodiment of the present technology.

Next, a display unit 7 according to a seventh embodiment of the present technology will be described below. As illustrated in FIG. 72, the display unit 7 according to this embodiment includes a display panel 8 displaying an image by modulating light, the illumination unit 1, 2, 3, 4, 5, or 6 applying light from a back of the display panel 8, and a drive circuit (not illustrated) driving the display panel 8 and the illumination unit 1, 2, 3, 4, 5, or 6.

The display panel 8 includes a plurality of pixels which are arranged in a matrix, and displays an image by driving the plurality of pixels based on an image signal. The display panel 8 is, for example, a transmissive display panel in which respective pixels are driven based on an image signal, and has a configuration in which a liquid crystal layer is sandwiched between a pair of transparent substrates. More specifically, the display panel 8 includes, for example, a polarizer, a transparent substrate, pixel electrodes, an alignment film, a liquid crystal layer, an alignment film, a common electrode, a color filter, a transparent substrate, and a polarizer in order from the illumination unit 1, 2, 3, 4, 5, or 6.

The transparent substrates are configured of substrates transparent to visible light, for example, plate glass. It is to be noted that an active drive circuit (not illustrated) including TFTs (thin film transistors), wiring, and the like electrically connected to the pixel electrodes is formed on the transparent substrate located closer to a backlight 211. The pixel electrodes and the common electrode are made of, for example, indium tin oxide (ITO). The pixel electrodes are two-dimensionally arranged on the transparent substrate, and function as electrodes for respective pixels. On the other hand, the common electrode is formed on an entire surface of the color filter, and functions as a common electrode facing the respective pixel electrodes. The alignment films are made of a polymer material such as polyimide, and perform an alignment process on a liquid crystal.

The liquid crystal layer is made of, for example, a VA (Vertical Alignment) mode, TN (Twisted Nematic) mode, or STN (Super Twisted Nematic) mode liquid crystal, and has a function of changing the direction of a polarizing axis of light emitted from the illumination unit 1, 2, 3, 4, 5, or 6 in each pixel by a voltage applied from the drive circuit (not illustrated). It is to be noted that liquid crystal alignment is changed in a stepwise manner to adjust the direction of a transmission axis of each pixel in a stepwise manner. In the color filter, color filters separating light having passed through the liquid crystal layer into, for example, three primary colors of red (R), green (G), and blue (B), or four colors such as R, G, B, and white (W) are arranged corresponding to the arrangement of the pixel electrodes.

The polarizing plates are optical shutters of one kind, and allow only light (polarized light) in a certain vibration direction to pass therethrough. It is to be noted that the polarizers may be absorption polarizers absorbing light (polarized light) in a vibration direction other than a transmission axis, but the polarizers may be preferably reflective polarizers reflecting light toward the illumination unit 1, 2, 3, 4, 5, or 6 in terms of an improvement in luminance. Two polarizers are disposed to allow their polarizing axes to be different by 90 degrees from each other, thereby allowing light emitted from the illumination unit 1, 2, 3, 4, 5, or 6 to pass therethrough via the liquid crystal layer, or to be shielded.

Incidentally, the optical axes AX1, AX3, AX5, and AX7 may be parallel to a transmission axis of the polarizing plate located closer to the illumination unit 1, 2, 3, 4, 5, or 6. In particular, in a case where the illumination unit 1 outputting backlight light with more polarization components is used as a backlight, use efficiency of backlight light in the display panel 8 is allowed to be enhanced.

Moreover, the present technology may have the following configurations.

(1) An illumination unit including:

a first transparent substrate and a second transparent substrate disposed to be separated from and to face each other;

a light source configured to emit light to an end surface of the first transparent substrate; and a light modulation layer disposed in a gap between the first transparent substrate and the second transparent substrate and configured to exhibit a scattering property or transparency with respect to light from the light source, depending on magnitude of an electric field, in which the light modulation layer includes a first region and a second region, the first region having optical anisotropy and relatively high responsivity with respect to the electric field, and the second region having optical anisotropy and relatively low responsivity with respect to the electric field, and the light modulation layer is configured to satisfy following expressions when the light modulation layer exhibits the scattering property:

$$A > B > C$$

$$A1/C1 < A2/C2$$

where A is a magnitude of first scattering of light propagating in a first direction perpendicular to the light incident surface, B is a magnitude of second scattering of light propagating in a second direction perpendicular to the first transparent substrate, C is a magnitude of third scattering of light propagating in a third direction parallel to the light incident surface and parallel to a surface of the first transparent substrate, A1 is a magnitude of the first scattering in a third region closer to the light source of the light modulation layer, C1 is a magnitude of the third scattering in the third region, A2 is a magnitude of the first scattering in a fourth region farther from the light source of the light modulation layer, and C2 is a magnitude of the third scattering in the fourth region.

(2) The illumination unit according to (1), in which the first region is configured to include a liquid crystal material, the second region is configured to include a polymer material, and a ratio of the second region in the light modulation layer is relatively low in the third region and relatively high in the fourth region.

(3) The illumination unit according to (2), in which the first region and the second region are formed by applying ultraviolet light to a mixture of a liquid crystal material and a monomer having both polymerizability and a liquid crystal property to allow intensity or a total dose of the ultraviolet light applied to the fourth region to be larger than intensity or a total dose of the ultraviolet light applied to the third region.

(4) The illumination unit according to (3), in which the first region and the second region are formed by applying ultraviolet light to the mixture of the liquid crystal material and the monomer having both the polymerizability and the liquid crystal property with use of a gray mask in which transmittance of ultraviolet light in the fourth region is higher than transmittance of ultraviolet light in the third region.

(5) The illumination unit according to (3), in which the first region and the second region are formed by applying LED light in an ultraviolet region to the mixture of the liquid crystal material and the monomer having both the polymerizability and the liquid crystal property to allow the intensity or the total dose of ultraviolet light applied to the fourth region to be larger than the intensity or the total dose of ultraviolet light applied to the third region.

(6) The illumination unit according to (1), in which the first region and the second region are formed by applying polarized ultraviolet light to the mixture of a liquid crystal material and a monomer having both polymerizability and a liquid crystal property to allow more ultraviolet polarization components to be applied to the fourth region than to the third region.

(7) The illumination unit according to any one of (1) to (6), including a first alignment film and a second alignment film sandwiching the light modulation layer therebetween, in which alignment directions of the first alignment film and the second alignment film are oriented in a direction parallel to the end surface.

(8) The illumination unit according to (1), including a first alignment film and a second alignment film sandwiching the light modulation layer therebetween, in which the first alignment film and the second alignment film are formed to allow the light modulation layer to satisfy A>B>C and A1/C1<A2/C2.

(9) The illumination unit according to (8), in which the first alignment film is configured of a vertical alignment film in the third region and a horizontal alignment film in the fourth region, and the second alignment film is a horizontal alignment film.

(10) The illumination unit according to (8), in which alignment directions of the first alignment film and the second alignment film are oriented in a direction intersecting with the end surface in the third region and is oriented in a direction parallel to the end surface in the fourth region.

(11) The illumination unit according to (10), in which the alignment directions in the third region of the first alignment film and the second alignment film are equal to or larger than 60 degrees and smaller than 90 degrees with respect to the end surface.

(12) The illumination unit according to (11), in which the alignment directions of the first alignment film and the second alignment film are equal to each other in the third region.

(13) The illumination unit according to (8), in which an alignment direction of the first alignment film is oriented in a direction intersecting with the end surface in the third region and is oriented in a direction parallel to the end surface in the fourth region, and an alignment direction of the second alignment film is oriented in the direction parallel to the end surface.

(14) The illumination unit according to (13), in which the alignment direction in the third region of the first alignment film is equal to or larger than 60 degrees and smaller than 90 degrees with respect to the end surface.

(15) The illumination unit according to any one of (8) to (14), in which the first region is configured to include a liquid crystal material, the second region is configured to include a polymer material, and a ratio of the first region in the light modulation layer is uniform throughout the light modulation layer.

(16) The illumination unit according to (1), in which
the first region is configured to include a liquid crystal material,
the second region included in the third region is formed by polymerizing a bifunctional monomer and one or both of a monofunctional monomer and a multifunctional monomer, and
the second region included in the fourth region is formed by polymerizing a bifunctional monomer, or is formed by polymerizing a bifunctional monomer and one or both of a monofunctional monomer and a multifunctional monomer that have a smaller weight percent than weight percent of the monofunctional monomer and the multifunctional monomer used to form the second region included in the third region.

(17) The illumination unit according to (1), in which
the first region and the second region included in the third region are formed by mixing a liquid crystal material and a monomer having both polymerizability and a liquid crystal property at a weight ratio of 98:2 to 75:25 both inclusive to form a mixture, and applying ultraviolet light to the mixture to cure the monomer, and
the first region and the second region included in the fourth region are formed by mixing, at a weight ratio from 95:5 to 50:50 both inclusive, a liquid crystal material and a monomer having both polymerizability and a liquid crystal property and having a larger weight percent than weight percent of the monomer in a close region 30a to form a mixture, and applying ultraviolet light to the mixture to cure the monomer.

(18) The illumination unit according to any one of (1) to (17), in which the end surface has a three-dimensional shape expanding a divergent angle of the light from the light source.

(19) The illumination unit according to any one of (1) to (17), including an oil for refractive index matching filled in a gap between the end surface and the light source.

(20) A display unit including:
a display panel displaying an image by modulating light; and
an illumination unit applying light from a back of the display panel,
in which the illumination unit includes
a first transparent substrate and a second transparent substrate disposed to be separated from and to face each other;
a light source configured to emit light to an end surface of the first transparent substrate; and
a light modulation layer disposed in a gap between the first transparent substrate and the second transparent substrate and configured to exhibit a scattering property or transparency with respect to light from the light source, depending on magnitude of an electric field,
the light modulation layer includes a first region and a second region, the first region having optical anisotropy and relatively high responsivity with respect to the electric field, and the second region having optical anisotropy and relatively low responsivity with respect to the electric field, and
the light modulation layer is configured to satisfy following expressions when the light modulation layer exhibits the scattering property:

$$A>B>C$$

$$A1/C1<A2/C2$$

where A is a magnitude of first scattering of light propagating in a first direction perpendicular to the light incident surface,
B is a magnitude of second scattering of light propagating in a second direction perpendicular to the first transparent substrate,
C is a magnitude of third scattering of light propagating in a third direction parallel to the light incident surface and parallel to a surface of the first transparent substrate,
A1 is a magnitude of the first scattering in a third region closer to the light source of the light modulation layer,
C1 is a magnitude of the third scattering in the third region,
A2 is a magnitude of the first scattering in a fourth region farther from the light source of the light modulation layer, and
C2 is a magnitude of the third scattering in the fourth region.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:
1. An illumination unit comprising:
a first transparent substrate and a second transparent substrate disposed to be separated from and to face each other;
a light source configured to emit light to an end surface of the first transparent substrate; and
a light modulation layer disposed in a gap between the first transparent substrate and the second transparent substrate and configured to exhibit a scattering property or transparency with respect to light from the light source, depending on magnitude of an electric field,
wherein the light modulation layer includes a first region and a second region, the first region having optical anisotropy and relatively high responsivity with respect to the electric field, and the second region having optical anisotropy and relatively low responsivity with respect to the electric field, and
the light modulation layer is configured to satisfy following expressions when the light modulation layer exhibits the scattering property:

$$A>B>C$$

$$A1/C1<A2/C2$$

where A is a magnitude of first scattering of light propagating in a first direction perpendicular to a light incident surface,
B is a magnitude of second scattering of light propagating in a second direction perpendicular to the first transparent substrate,
C is a magnitude of third scattering of light propagating in a third direction parallel to the light incident surface and parallel to a surface of the first transparent substrate,
A1 is a magnitude of the first scattering in a third region,
C1 is a magnitude of the third scattering in the third region,
A2 is a magnitude of the first scattering in a fourth region farther from the light source of the light modulation layer than the third region, and
C2 is a magnitude of the third scattering in the fourth region, and
wherein a ratio of the second region to the first region in the light modulation layer is lower in the third region than in the fourth region, and the ratio of the second region to the first region in the fourth region is constant.

2. The illumination unit according to claim 1, comprising a first alignment film and a second alignment film sandwiching the light modulation layer therebetween, wherein the first alignment film and the second alignment film are formed to allow the light modulation layer to satisfy A>B>C and A1/C1<A2/C2.

3. The illumination unit according to claim 2, wherein alignment directions of the first alignment film and the second alignment film are oriented in a direction intersecting with the end surface in the third region and is oriented in a direction parallel to the end surface in the fourth region.

4. The illumination unit according to claim 3, wherein the alignment directions in the third region of the first alignment film and the second alignment film are equal to or larger than 60 degrees and smaller than 90 degrees with respect to the end surface.

5. The illumination unit according to claim 4, wherein the alignment directions of the first alignment film and the second alignment film are equal to each other in the third region.

6. The illumination unit according to claim 2, wherein
an alignment direction of the first alignment film is oriented in a direction intersecting with the end surface in the third region and is oriented in a direction parallel to the end surface in the fourth region, and
an alignment direction of the second alignment film is oriented in the direction parallel to the end surface.

7. The illumination unit according to claim 6, wherein the alignment direction in the third region of the first alignment film is equal to or larger than 60 degrees and smaller than 90 degrees with respect to the end surface.

8. The illumination unit according to claim 2, wherein
the first alignment film is configured of a vertical alignment film in the third region and a horizontal alignment film in the fourth region, and
the second alignment film is a horizontal alignment film.

9. The illumination unit according to claim 2, wherein
the first region is configured to include a liquid crystal material, and
the second region is configured to include a polymer material.

10. The illumination unit according to claim 1, wherein
the first region is configured to include a liquid crystal material, and
the second region is configured to include a polymer material.

11. The illumination unit according to claim 10, wherein the first region and the second region are formed by applying ultraviolet light to a mixture of a liquid crystal material and a monomer having both polymerizability and a liquid crystal property to allow intensity or a total dose of the ultraviolet light applied to the fourth region to be larger than intensity or a total dose of the ultraviolet light applied to the third region.

12. The illumination unit according to claim 11, wherein the first region and the second region are formed by applying the ultraviolet light to the mixture of the liquid crystal material and the monomer having both the polymerizability and the liquid crystal property with use of a gray mask in which transmittance of the ultraviolet light in the fourth region is higher than transmittance of the ultraviolet light in the third region.

13. The illumination unit according to claim 11, wherein the first region and the second region are formed by applying LED light in an ultraviolet region to the mixture of the liquid crystal material and the monomer having both the polymerizability and the liquid crystal property to allow the intensity or the total dose of the ultraviolet light applied to the fourth region to be larger than the intensity or the total dose of the ultraviolet light applied to the third region.

14. The illumination unit according to claim 1, wherein the first region and the second region are formed by applying polarized ultraviolet light to a mixture of a liquid crystal material and a monomer having both polymerizability and a liquid crystal property to allow more ultraviolet polarization components to be applied to the fourth region than to the third region.

15. The illumination unit according to claim 1, comprising a first alignment film and a second alignment film sandwiching the light modulation layer therebetween,
wherein alignment directions of the first alignment film and the second alignment film are oriented in a direction parallel to the end surface.

16. The illumination unit according to claim 1, wherein
the first region is configured to include a liquid crystal material,
the second region included in the third region is formed by polymerizing a bifunctional monomer and one or both of a monofunctional monomer and a multifunctional monomer, and
the second region included in the fourth region is formed by polymerizing a bifunctional monomer, or is formed by polymerizing a bifunctional monomer and one or both of a monofunctional monomer and a multifunctional monomer that have a smaller weight percent than a weight percent of the monofunctional monomer and the multifunctional monomer used to form the second region included in the third region.

17. The illumination unit according to claim 1, wherein
the first region and the second region included in the third region are formed by mixing a liquid crystal material and a monomer having both polymerizability and a liquid crystal property at a weight ratio of 98:2 to 75:25 both inclusive to form a mixture, and applying ultraviolet light to the mixture to cure the monomer, and
the first region and the second region included in the fourth region are formed by mixing, at a weight ratio from 95:5 to 50:50 both inclusive, a liquid crystal material and a monomer having both polymerizability and a liquid crystal property and having a larger weight percent than a weight percent of the monomer in the third region to form a mixture, and applying ultraviolet light to the mixture to cure the monomer.

18. The illumination unit according to claim 1, wherein the end surface has a three-dimensional shape expanding a divergent angle of the light from the light source.

19. The illumination unit according to claim 1, comprising an oil for refractive index matching filled in a gap between the end surface and the light source.

20. A display unit comprising:
a display panel displaying an image by modulating light; and
an illumination unit applying light from a back of the display panel,
wherein the illumination unit includes
a first transparent substrate and a second transparent substrate disposed to be separated from and to face each other;
a light source configured to emit light to an end surface of the first transparent substrate; and
a light modulation layer disposed in a gap between the first transparent substrate and the second transparent substrate and configured to exhibit a scattering property or transparency with respect to light from the light source, depending on magnitude of an electric field,
the light modulation layer includes a first region and a second region, the first region having optical anisotropy and relatively high responsivity with respect to the electric field, and the second region having optical anisotropy and relatively low responsivity with respect to the electric field, and the light modulation layer is configured to satisfy following expressions when the light modulation layer exhibits the scattering property:

$A > B > C$ $A1/C1 < A2/C2$ where A is a magnitude of first scattering of light propagating in a first direction perpendicular to a light incident surface, B is a magnitude of second scattering of light propagating in a second direction perpendicular to the first transparent substrate, C is a magnitude of third scattering of light propagating in a third direction parallel to the light incident surface and parallel to a surface of the first transparent substrate, A1 is a magnitude of the first scattering in a third region, C1 is a magnitude of the third scattering in the third region, A2 is a magnitude of the first scattering in a fourth region farther from the light source of the light modulation layer than the third region, and C2 is a magnitude of the third scattering in the fourth region, and wherein a ratio of the second region to the first region in the light modulation layer is lower in the third region than in the fourth region, and the ratio of the second region to the first region in the fourth region is constant.

* * * * *